United States Patent [19]
Dimolitsas et al.

[11] Patent Number: 5,963,621
[45] Date of Patent: *Oct. 5, 1999

[54] SECURE COMMUNICATION SYSTEM

[75] Inventors: Spiros Dimolitsas, Gaithersburg; Roderick James Ragland, Bethesda; Farhad Hemmati, Darnestown, all of Md.

[73] Assignee: Comsat Corporation, Bethesda, Md.

[ * ] Notice: This patent is subject to a terminal disclaimer.

[21] Appl. No.: 08/743,746

[22] Filed: Nov. 7, 1996

Related U.S. Application Data

[63] Continuation of application No. 08/324,480, Oct. 17, 1994, Pat. No. 5,724,414, which is a continuation-in-part of application No. 08/065,017, May 24, 1993, Pat. No. 5,404,394.

[51] Int. Cl.$^6$ .................................................. H04M 11/00
[52] U.S. Cl. ..................................... 379/93.08; 379/93.02; 379/93.15; 379/100.17; 358/442; 455/12.1
[58] Field of Search .............................. 379/93.02, 93.05, 379/93.08, 93.09, 100.01, 100.15, 100.16, 100.17, 102.02

[56] References Cited

U.S. PATENT DOCUMENTS

| | | |
|---|---|---|
| 4,800,439 | 1/1989 | Yoshino . |
| 4,805,208 | 2/1989 | Schwartz . |
| 4,815,128 | 3/1989 | Malek . |
| 4,920,567 | 4/1990 | Malek . |
| 4,931,250 | 6/1990 | Greszczuk . |
| 4,985,919 | 1/1991 | Naruse et al. . |
| 5,001,750 | 3/1991 | Kato et al. . |
| 5,117,453 | 5/1992 | Piasecki et al. . |
| 5,150,401 | 9/1992 | Ashby, III et al. . |
| 5,166,977 | 11/1992 | Ross . |
| 5,282,238 | 1/1994 | Berland . |
| 5,392,357 | 2/1995 | Bulfer et al. . |
| 5,404,394 | 4/1995 | Dimolitsas et al. . |
| 5,515,178 | 5/1996 | Dimolitsas et al. . |
| 5,590,406 | 12/1996 | Bayley et al. ..................... 379/100.16 |

OTHER PUBLICATIONS

STU–III/TR45.3 Digital Cellular Standards Activities, Al Levesquqe and Dave Weissman, dated May 4, 1992.
TR 45, Cellular Bearer Service Description, Async Data Service, Feb. 6, 1992.
Future Secure Voice System Terminal Performance Specification, FSVS–220, Rev. B, dated Feb. 26, 1988.
Future Secure Voice System Terminal Performance Specification, FSVS–220, Rev. C, dated Mar. 31, 1992.
Future Secure Voice System Signaling Plan—Interoperable Modes, FSVS–210, Rev. E, dated Feb. 26, 1988.
Future Secure Voice System Signaling Plan—Interoperable Modes, FSVS–210, Rev. F, dated Mar. 31, 1992.
Ilex Model 550 Series STU–III Digital Gateway Unit Product Bulletin.
Ilex Digital Gateway Unit Model 550 and 550–AES Installation and User's Manual dated May, 1995.
Stanford Telecom STEL 9610 and 9620 Digital Link Interface Units brochure, dated 1990.
Stanford Telecom STEL 9610A and 9620A Digital Link Interface Units brochure, dated 1993.

(List continued on next page.)

*Primary Examiner*—Stella Woo
*Attorney, Agent, or Firm*—Sughrue, Mion, Zinn, Macpeak & Seas, PLLC

[57] ABSTRACT

A communication system including: a first secure communication terminal for providing analog voiceband data; a first processing circuit connected to receive the secure data from the first secure communication terminal and for converting the received data into secure baseband data, the first processing circuit transmitting the baseband data; a second processing circuit connected to receive—the transmitted baseband data from the first processing circuit, and for converting the received baseband data into analog voiceband data; and a second secure communication terminal for receiving the analog voiceband data from the second processing circuit. The communication system is especially applicable for handling secure data transmitted by a STU-III.

68 Claims, 33 Drawing Sheets

OTHER PUBLICATIONS

Stanford Telecom STEL 9618 Suitcase STU III/LST–5/MISTE II/MST–20 Interface brochure, dated 1993.
Stanford Telecom STEL 9640 Secure Voice Gateway and Conferencing Unit brochure, dated 1992(?).
Stanford Telecom Secure Voice Products brochure, dated 1991–92(?).
Stanford Telecom STEL 9640 Secure Voice Gateway and Conferencing Unit (Preliminary) brochure dated 1991.
Stanford Telecom MSE/TRI–TAC STU III Interface Preliminary brochure, dated 1992.
STEL 9610A and 9620A Digital Link Interface Units overhead, undated.
STEL 9620 User Manual Version 4.0, dated Dec. 12, 1991.
Stanford Telecommunications, Inc. Training Course for 9610 and 9620 STU III Telephone Data Link Interface, dated Apr. 3, 1992.
STEL 9640 Secure Voice Gateway and Conferencing Unit User Manual (Draft) Version 1.1,dated Jun. 12, 1991.
STEL 9610 User Manual Version 4.3, dated Apr. 9, 1993.
STEL 9620 User Manual Version 5.0, dated Jun. 29, 1994.
STEL Proposal for Digital Link Interface Units to E–Systems, INc. for the Airborne Leadership Program, dated Jun. 14, 1991.
STU III Ditigal Link Interface brochure from STEL, dated 1990.
JPL Test Report: Evaluation of Secure Communications Equipment over a Mobile Satellite Link, dated Nov. 30, 1989.
JPL Test Report (Final Draft): Laboratory Testing of STU III Telephones over a Simulated Mobile Satellite Link (Using STEL Adapters), dated Jul., 1991.
Advanced Communications Technology Satellite, Mobile Secure Experiments (prepared by JPL), dated Mar. 15, 1995.
GTE STU–III Telephone Line Termination Unit (STLTU) brochure, undated.
GTE Presentation: STU–III/MSAT Interoperabilty, dated Mar. 5, 1991.
Secure Voice for Mobile Satellite Applications, International Mobile Satellite Conference, Ottawa, 1990.
Transitioning from Analog to Digital Communications: An Information Security Perspective, International Mobile Satellite Conference, Ottawa, 1990.
CRC STU–III Digital Interface, single sheet of paper, undated.
A Discussion Paper On The Transmission of STU–III Signaling Over The North American Mobile Satellite System, prepared by CRC, undated (probably Dec. 1992).
Transitioning from Analog to Digital Communications: An INFOSEC Perspective, prepared by NSA, dated Feb., 1990.
A Plan for Future Interoperable Secure Voice Communication in the Evolving Communication Environment prepared by NSA, dated Sep., 1992.
Enhancing Digital Data Services for North American Mobile Users (from NSA), dated Jan. 24, 1991.
Matrix Inputs for STU–III Teleservice (from NSA), dated Feb. 26, 1991.
Implementation of Secure Voice (STU–III) Into The Land Mobile Satellite System, dated Jun. 1, 1992.
ETS–V Engineering Test Satellite V [Kiku–5] HTML document printed Jan. 27, 1998.
Army Leadership Secure Communications, Part III Technical Proposal, prepared by ARINC Research Corp., undated.

Extract from "Digital Signal Processing Applications Using the ADSP–2100 Family", Ed. Amy Mar, 1990, Prentice–Hall, ISBN 0–13–212978–7.
Applied Cryptography, Second Edition, John Wiley & Sons, Inc. (date unknown).
Cryptography: A New Dimension In Computer Data Security: "A Guide for the Design and Implementation of Secure Systems", Carl H. Meyer and Stephen M. Matyas, Cryptography Competency Center, IBM Corporation, Kingston, New York, John Wiley & Sons (1982).
The Theory and Practice of Modem Design by John A.C. Bingham, John Wiley and Sons, 1988, ISBN 0–471–85–108–6.
Theory and Application of Digital Signal Processing, Lawrence R. Rabiner and bernard Gold, Prentice–Hall, 1975, ISBN 0–13–914101–4.
Digital Communications, Fundamental and Applications, Bernard Skelar, Prentice–Hall 1998, ISBN 0–13–212713–X.
Integrated Electronics: Analog and Digital Circuits and Systems, Jacob Millman and Christos C. Halkias, 1972, McGraw–Hill Kogakusha.
Digital Signal Processing Applications using the ADSP–2100 Family, Ed, Amy Mar, 1990, Prentice–Hall, ISBN 0–13–212978–7.
Digital Signal Processing Applications with the TMS320 Family, Theory, Algorithms and Implementations, vol. 1, Editor Kun–Shan Lin, 1989, Texas Instruments.
Digital Signal Processing Applications with the TMS320 Family, Theory, Algorithms and Implementations, vol. 2, Editor Panos Papamichalis, 1990, Texas Instruments.
Digital Signal Processing Applications with the TMS320 Family, Theory, Algorithms and Implementations, vol. 3, Editor Panos Papamichalis, 1990, Texas Instruments.
Application of Digital Signal Processing, Alan V. Oppenheim, 1978, Prentice–Hall, ISBN 0–13–039115–8.
Designing Digital Filters, Charles S. Williams, 1986, Prentice–Hall, ISBN 0–13–201831–4.
"Test results–evaluation of secure communication equipment over a mobile satellite link", by J. Berner and A. Vaisnys, Jet Propulsion Laboratory, circa Nov., 1989, Jet Propulsion Laboratory, USA.
"The MSAT–X (AUSSAT Land–Mobile Satellite Experiment: An Overview", by T.C. Jedrey and Dr. W. Rafferty MSAT–X Quarterly, Jet Propulsion Laboratory, No. 22, Jan. 1990.
"The Terminal Processor—The Heart of the Mobile Terminal", by C. Cheetham, MSAT–X Quarterly, No. 12, JPL 410–13–12, Oct. 1987.
"Mobilesat—Specifications and Performance" by K. Dinh, Nick Hart, Ian Jorgensen, IREECON–91.
"Mobile Services in Australia", by Nick Hart, Paul Robertson and Paul Bartells, IEEE Communication Magazine, Nov. 1991.
MPR Service Discriminating Unit.
"Field Trials of a NASA–Developed Mobile Satellite Terminal", by K. Dessouky, R.F. Emerson, L. Ho, and T.C. Jedrey, International Mobile Satellite Conference, Ottawa, 1990.
"CEPT Echo Canceller Module Technical Manual", EC–6300 Features technical description.
"DTX–240F general description", ECI Telecom Copyright date of 1993.

TR45.3.3/90.11.07—TIA Subcommittee TR45.3, Working Group II & III, TF IV Support for Special Data Service Mode, NSA, Washington, DC, Nov. 7, 1990 (Author & Contact: Richard Dean).

Recommendations and Issues for Mobile Data, Richard Dean, NSA, Jun. 24, 1991.

Matrix Inputs for STU–III Teleservice, Richard Dean, NSA, Feb. 26, 1991.

Stel 9620 User Manual Version 4.0; Stel–MAN–90715; Document No. 9610–015–121486–02; Stanford Telecom; Dec. 12, 1991.

Stel 9610A User Manual Version 2.1; Stel–MAN–94705; Stanford Telecom; Apr. 21, 1994.

Stel 9620A User Manual Version 2.1; Stel–MAN–93712; Stanford Telecom; Apr. 21, 1994.

Jeff Berner, JPL Apr. 21, 1989 Memo to Arv Vaisnys re Apr. 19, 1989 Trip to Electrospace, Inc. w/att. Report on trip to ESI.

Arvydas Vaisnys, JPL Apr. 15, 1992 letter to John O'Connor, National Communications Systems re Mid–Term Technical Progress Report (Ref: DCA MIPR HC1001–9–40014, Contract NAS7–918—Task Order Amendment Re 182–566).

Mid–Term Technical Progress Report for Jan. 1, 1992 through Apr. 15, 1992 (FY 92 Effort)—Mobile Satellite Applications to National Security Emergency Preparedness (NSEP) Requirements Task for the National Communications System, Apr. 15, 1992 (submitted by Arvydas Vaisnys, JPL).

National Communications System (NCS) Advanced Communications Technology Satellite (ACTS) Low Burst Rate (LBR–2) Terminal Experiments to National Communications Systems, Arlington, VA; JPL Task Plan No. ???, Apr. 10, 1992 (Prepared by JPL and CA Inst. of Technology).

Draft Acts Mobile Terminal Interface Design Issues for the STU–III Secure Voice Experiment, Norman E. Lay.

Topics for Meeting on NCS Work; Jan. 10, 1991.

James K. Young, The Aerospace Corporation Dec. 9, 1991 letter to Lt. Col. Gary Olson, NCS re Critical Design Review conducted by JPL on the NASA Acts Mobile Terminal task on Dec. 4–5, 1991.

Mobile Terminal Block Diagram.

Fixed Terminal Block Diagram.

AMT Terminal Controller Hardware Interface Diagram.

Figure 1—MET Functional Block Diagram and Figure 4—STU III Functional Block Diagram.

Russell D. Raymond, The Aerospace Corporation Feb. 12, 1991 letter to Major Lloyd Harris, NCS re Preliminary Design Review conducted by JPL on the NASA Acts Mobile Terminal Task on Feb. 7–8, 1991.

Stel–MAN–90714; Stel 9610 User Manual Version 3.0; May 20, 1991; Document No. 9610–015–121485–02; Stanford Telecommunications, Inc.

Ilex Systems, Inc. Bulletin; STU–III Digital Gateway Unit.

Stanford Telecom; STEL 9610 and 9620 Digital Link Interface Units; pp. G000167–G000215.

GTE Government Systems; STU–III Telephone Line Termination Unit (STLTU), pp. G000216–G000218.

History of the Ilex DGU; pp. G000132–G000147.

FIG. 15(a)

| PACKET NUMBER | PACKET DESCRIPTION (PURPOSE) | PACKET DESIGNATION |
|---|---|---|
| CALL EST. 1 | END-TO-END SECURE TRANSMISSION ESTABLISHMENT - FORWARD (FULL-DUPLEX) | CEP(FDX/fwd) |
| CALL EST. 2 | END-TO-END SECURE TRANSMISSION ESTABLISHMENT - RETURN (FULL-DUPLEX) | CEP(FDX/rtn) |
| CALL EST. 3 | END-TO-END SECURE TRANSMISSION ESTABLISHMENT (HALF-DUPLEX) | CEP(HDX/fwd) |
| CALL EST. 4 | HALF-DUPLEX ESTABLISHMENT CONFIRMED | CEP(HDX/Conf) |
| 0 | START OF BELL 103 MODEM TRANSMISSION | SPC(Bell 103/s) |
| 1 | END OF BELL 103 MODEM TRANSMISSION | SPC(Bell 103/e) |
| 2 | INITIATE (START) TRANSMISSION of 1800 Hz CARRIER | SPC(1800/s) |
| 3 | START TRANSMISSION OF V.26bis SCRAMBLED "ONES" | SPC(SCR1) |
| 4 | TERMINATION OF SIGNAL ACTIVITY | SPC(IDLE) |
| 5 | 2100 Hz DETECTED DURING PHASE ST-C | SPC(2100) |
| 6 | START OF MESSAGE (DATA) TRANSMISSION | SPC(DATA) |

FIG. 15(b)

| PACKET NUMBER | PACKET DESCRIPTION (PURPOSE) | PACKET DESCRIPTION |
|---|---|---|
| 7 | V.32 MODEM TRAINING PACKET | SPC(V.32/R1,AC/s) |
| 8 | V.32 MODEM TRAINING PACKET | SPC(V.32/R1,AC/e) |
| 9 | V.32 MODEM TRAINING PACKET | SPC(V.32/R1,CA/e) |
| 10 | V.32 MODEM TRAINING PACKET | SPC(V.32/R2,S/s) |
| 11 | V.32 MODEM TRAINING PACKET | SPC(V.32/R2,TRN/s) |
| 12 | V.32 MODEM TRAINING PACKET | SPC(V.32/R2,TRN/e) |
| 13 | V.32 MODEM TRAINING PACKET | SPC(V.32/R2,R1/e) |
| 14 | V.32 MODEM TRAINING PACKET | SPC(V.32/R3,S/s) |
| 15 | V.32 MODEM TRAINING PACKET | SPC(V.32/R3,TRN/s) |
| 16 | V.32 MODEM TRAINING PACKET | SPC(V.32/R3,TRN/e) |
| 17 | V.32 MODEM TRAINING PACKET | SPC(V.32/R3,R3/e) |
| 18 | V.32 MODEM TRAINING PACKET | SPC(V.32/R3,B1/e) |
| 19 | V.32 MODEM TRAINING PACKET | SPC/V.32I1,AA/s) |
| 20 | V.32 MODEM TRAINING PACKET | SPC(V.32I1,AA/e) |
| 21 | V.32 MODEM TRAINING PACKET | SPC(V.32/I1,CC/e) |
| 22 | V.32 MODEM TRAINING PACKET | SPC(V.32/I2,S/s) |
| 23 | V.32 MODEM TRAINING PACKET | SPC(V.32/I2,TRN/s) |
| 24 | V.32 MODEM TRAINING PACKET | SPC(V.32/I2,TRN/e) |
| 25 | V.32 MODEM TRAINING PACKET | SPC(V.32/I2,R2/e) |
| 26 | V.32 MODEM TRAINING PACKET | SPC(V.32/I2,B1/e) |
| 27 | SPARE | |
| TO | SPARE | |
| 63 | SPARE | |

BITS 7,6 = 00  RESERVED
      = 01  PACKET NO. 1
      = 10  PACKET NO. 2
      = 11  PACKET NO. 3
BITS 5-0 = xxxxx SPC PACKET NO'S (0-63)

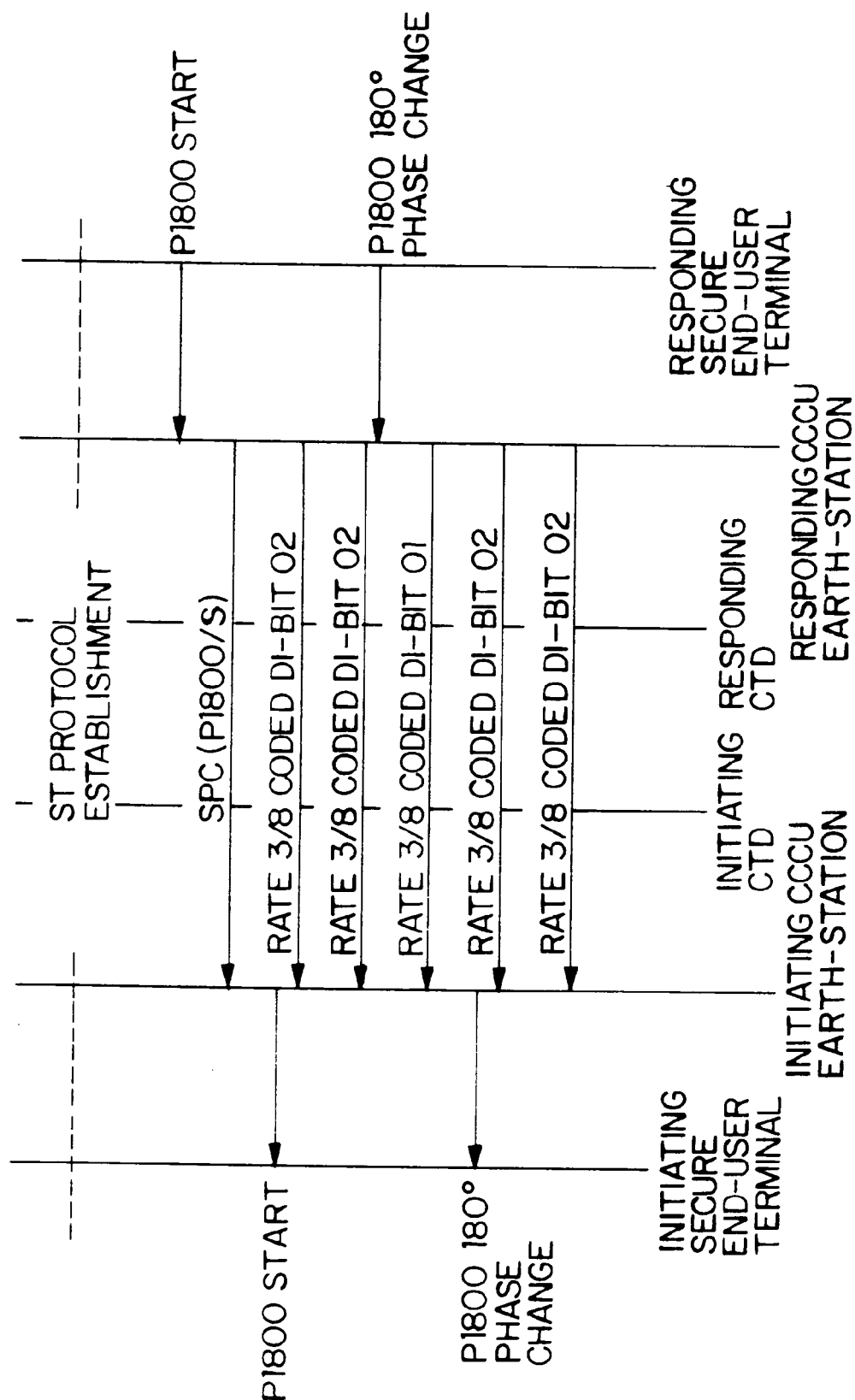

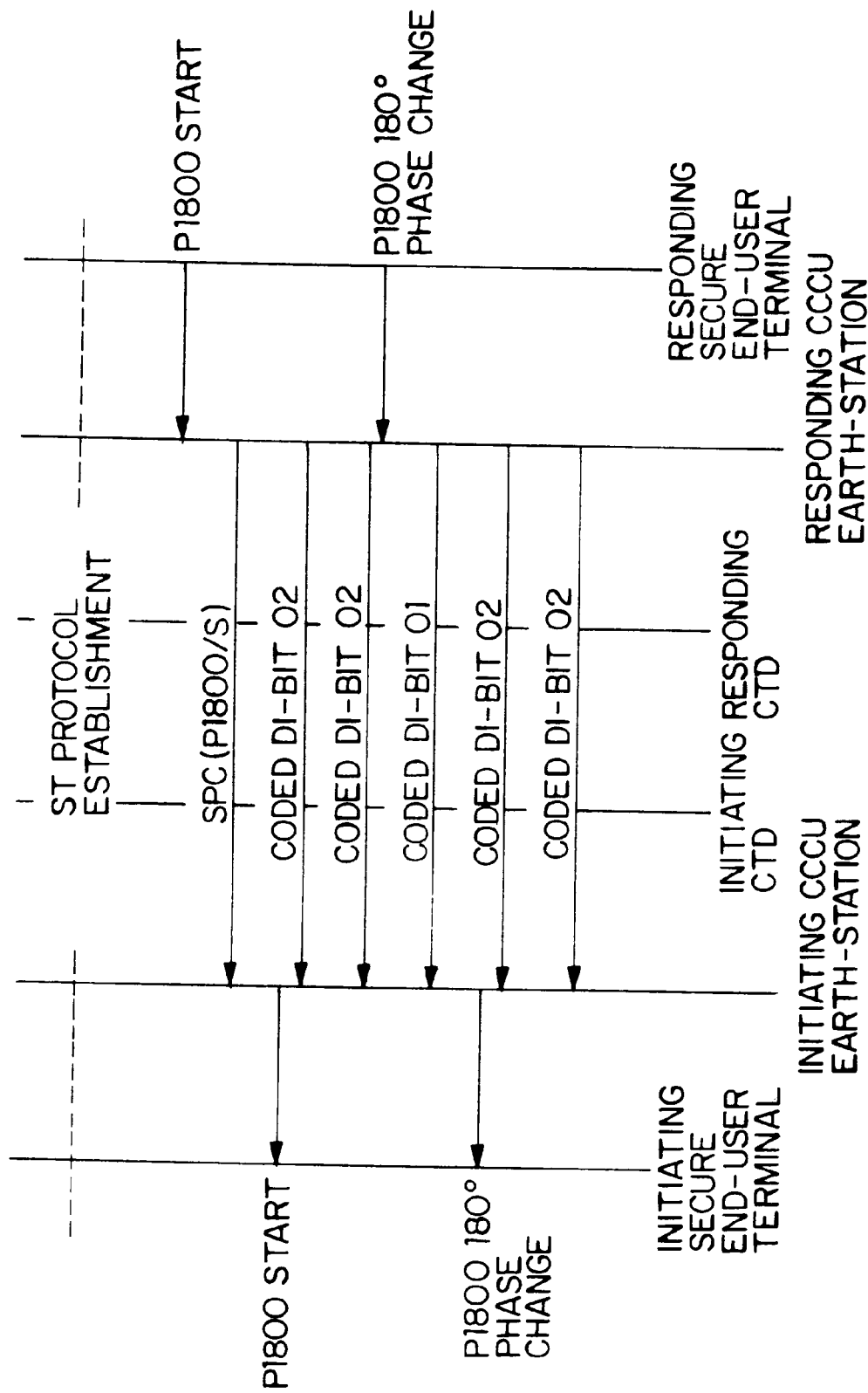

FIG. 19(a)

| BIT NUMBER | SIU ACTION | COMMENT |
|---|---|---|
| B7 | NONE | |
| B6 | NONE | |
| B5 | NONE | |
| B4 | NONE | |
| B3 | SET TO 0 | DISABLE AT&T RESERVED MODE |
| B2 | SET TO 0 | DISABLE EXTENDED ECHO RANGING |
| B1 | SET TO 0 | DISABLE MOTOROLA RESERVED MODE |
| B0 | NONE | |

FIG. 19(b)

| BIT NUMBER | SIU ACTION | COMMENT |
|---|---|---|
| B7 | NONE | |
| B6 | NONE | |
| B5 | SET TO 0 | DISABLE 9600 BIT/s CAPABILITIES |
| B4 | NONE | |
| B3 | NONE | |
| B2 | NONE | |
| B1 | NONE | |
| B0 | NONE | |

FIG. 19(c)

| BIT NUMBER | SIU ACTION | COMMENT |
|---|---|---|
| B7 | SET TO 0 | PROVISIONAL, ACTION UNDER STUDY |
| B6 | SET TO 0 | PROVISIONAL, ACTION UNDER STUDY |
| B5 | SET TO 0 | DISABLE MOTOROLA PROPRIETARY MODES |
| B4 | NONE | |
| B3 | SET TO 0 | DISABLE 9600 BIT/s TRANSMISSION |
| B2 | SET TO 0 | DISABLE 9600 BIT/s TRANSMISSION |
| B1 | NONE | |
| B0 | NONE | |

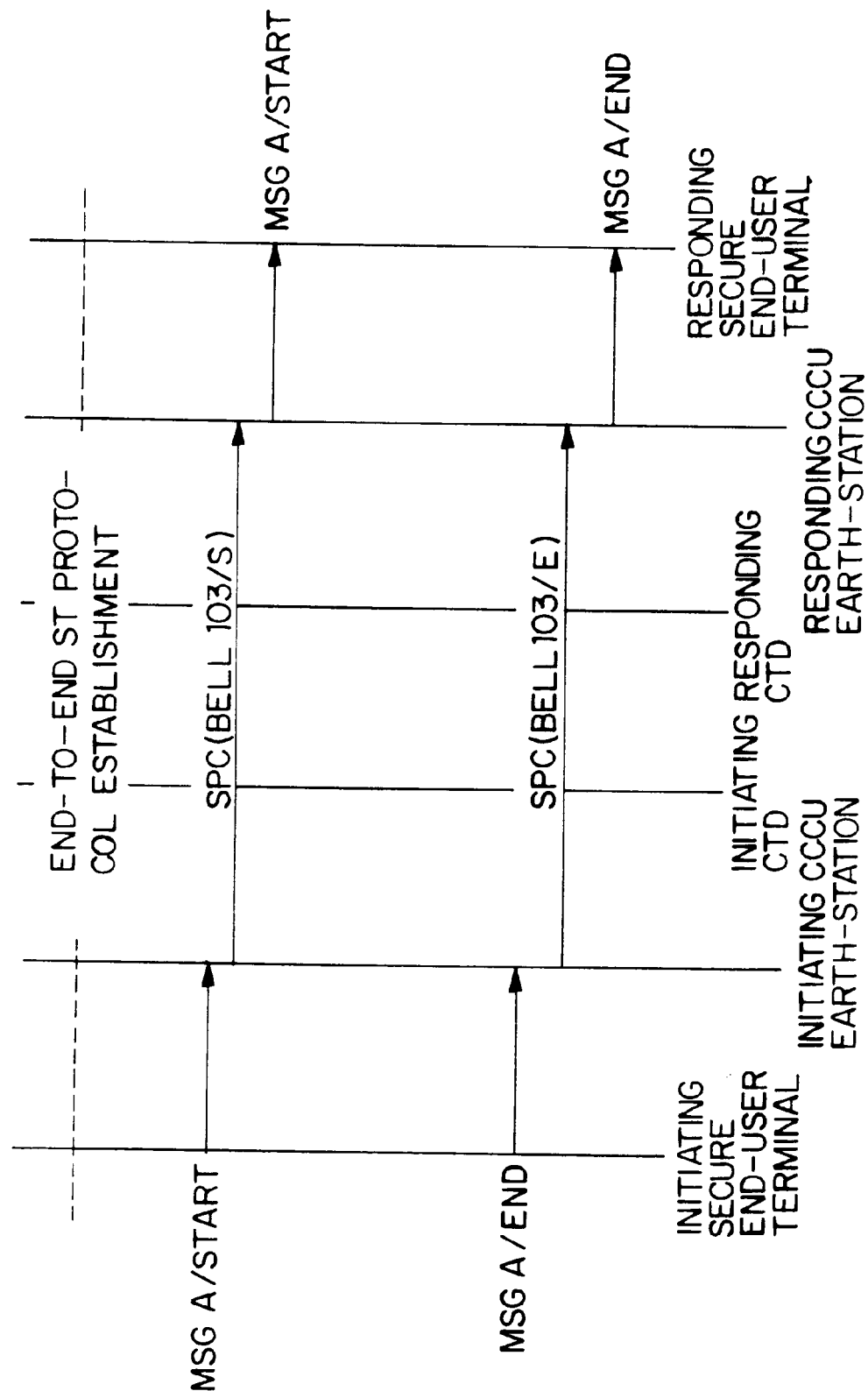

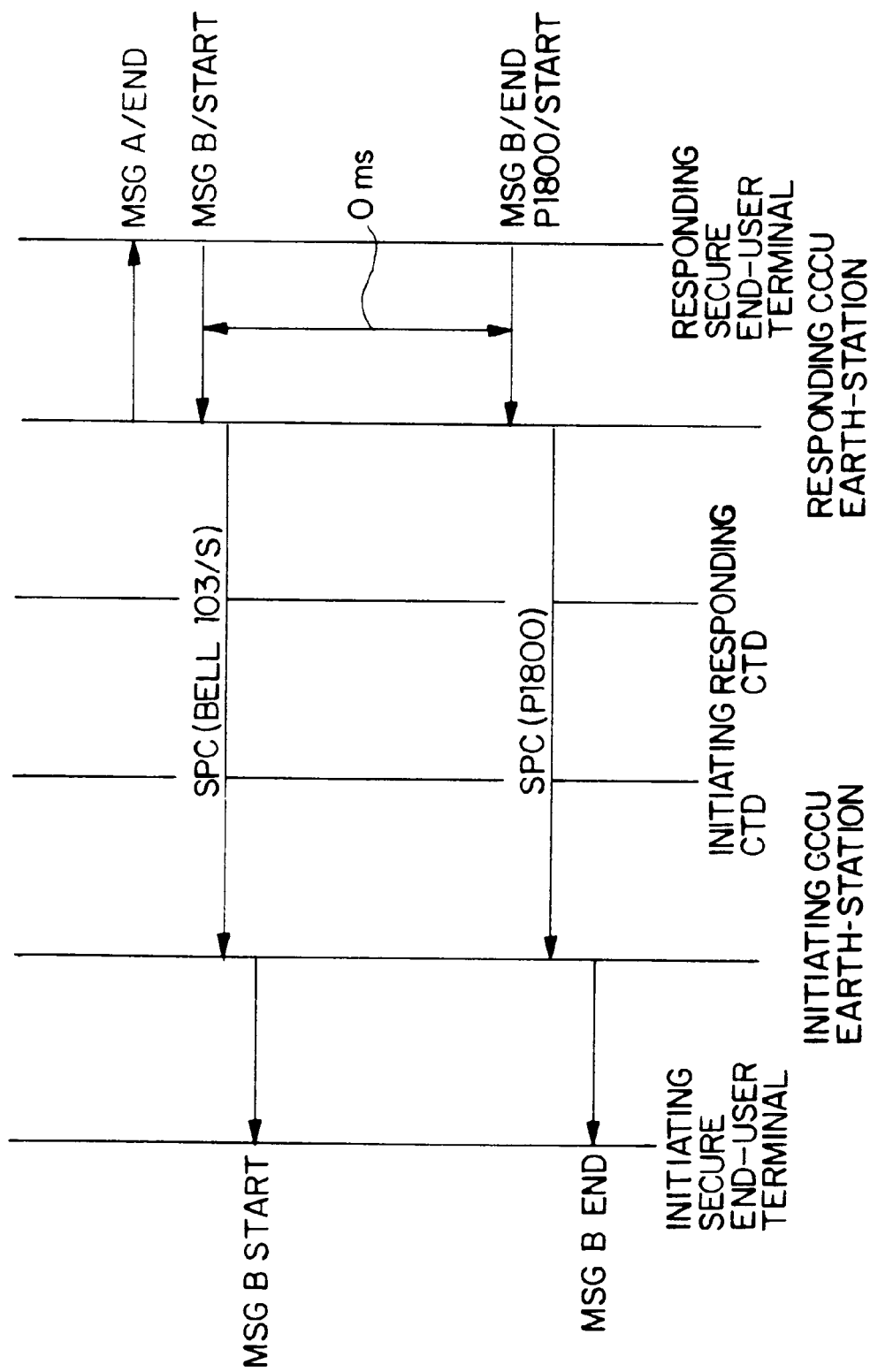

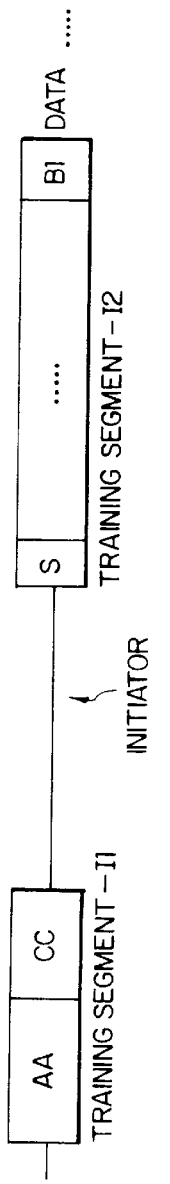
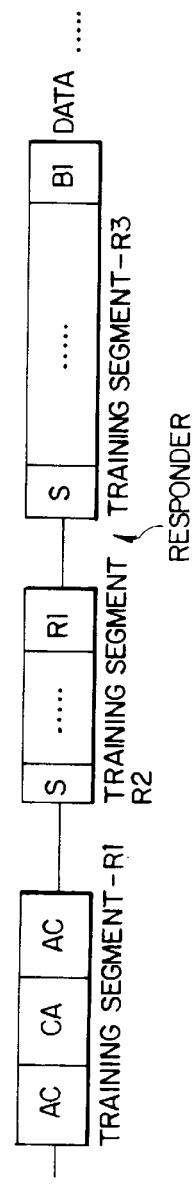
FIG. 22
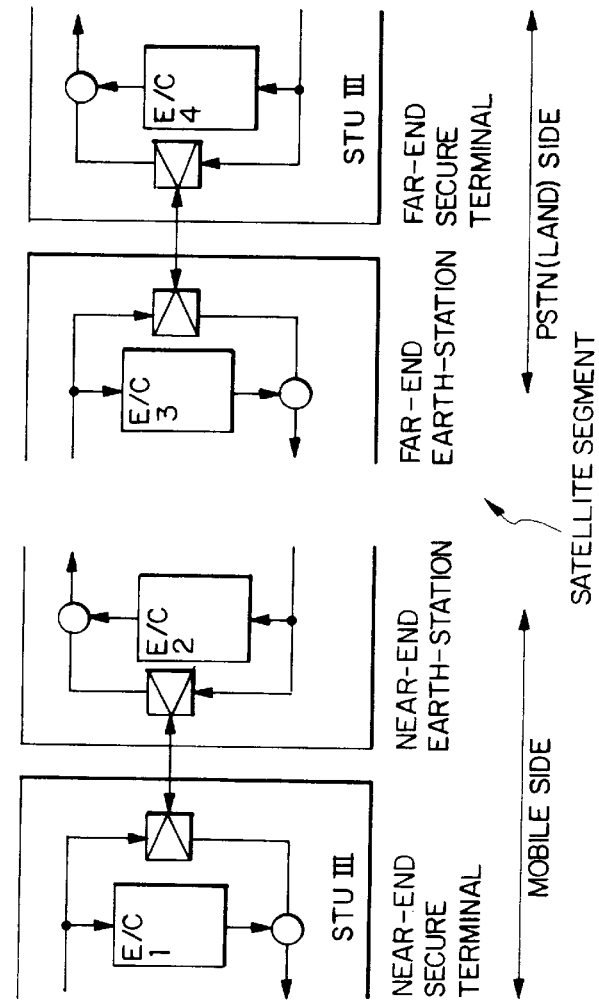
FIG. 30

FIG. 24

| BIT NUMBER | CODING | COMMENT |
|---|---|---|
| B0 | 0 | SYNCHRONIZATION BIT |
| B1 | 0 | SYNCHRONIZATION BIT |
| B2 | 0 | SYNCHRONIZATION BIT |
| B3 | 0 | SYNCHRONIZATION BIT |
| B4 | 0 | DISABLE 2400 BIT/s |
| B5 | 1 | ENABLE 4800 BIT/s |
| B6 | 0 | DISABLE 9600 BIT/s |
| B7 | 1 | SYNCHRONIZATION BIT |
| B8 | 0 | DISABLE TRELLIS CODING |
| B9 | 0 | DISABLE SPECIAL OPERATIONAL MODES |
| B10 | 0 | DISABLE SPECIAL OPERATIONAL MODES |
| B11 | 1 | DISABLE SPECIAL OPERATIONAL MODES |
| B12 | 0 | DISABLE SPECIAL OPERATIONAL MODES |
| B13 | 0 | DISABLE SPECIAL OPERATIONAL MODES |
| B14 | 0 | DISABLE SPECIAL OPERATIONAL MODES |
| B15 | 1 | SYNCHRONIZATION BIT |

FIG. 31(a)

| VECTOR $u_0$ BIT # | BINARY VALUE | COMMENT |
|---|---|---|
| 0 | 1 | DECIMAL 48, TONE IDENTIFIER |
| 1 | 1 | DECIMAL 48, TONE IDENTIFIER |
| 2 | 0 | DECIMAL 48, TONE IDENTIFIER |
| 3 | 0 | DECIMAL 48, TONE IDENTIFIER |
| 4 | 1 | DECIMAL 48, TONE IDENTIFIER |
| 5 | 0 | DECIMAL 48, TONE IDENTIFIER |
| 6 | $G_D, 7$ | GAIN BIT 7 (MSB) |
| 7 | $G_D, 6$ | GAIN BIT 6 |
| 8 | $G_D, 5$ | GAIN BIT 5 |
| 9 | 0 | PARITY CHECK FOR BITS 0,1,& 2 |
| 10 | 1 | PARITY CHECK FOR BITS 3,4,& 5 |
| 11 | $G_D, 7 + G_D, 6 + G_D, 5$ | PARITY CHECK FOR BITS 6,7,& 8 |

FIG. 31(b)

| VECTOR $u_1$ BIT # | BINARY VALUE | COMMENT |
|---|---|---|
| 0 | $G_D, 4$ | GAIN BIT 4 |
| 1 | $G_D, 3$ | GAIN BIT 3 |
| 2 | $G_D, 2$ | GAIN BIT 2 |
| 3 | $G_D, 1$ | GAIN BIT 1 |
| 4 | $G_D, 0$ | GAIN BIT 0 (LSB) |
| 5 | $T_i, 3$ | TONE INDEX BIT # 3 (MSB) |
| 6 | $T_i, 2$ | TONE INDEX BIT # 2 |
| 7 | $T_i, 1$ | TONE INDEX BIT # 1 |
| 8 | $T_i, 0$ | TONE INDEX BIT # 0 (LSB) |
| 9 | 0 | PARITY CHECK FOR BITS 0,1,& 2 |
| 10 | 0 | PARITY CHECK FOR BITS 3,4,& 5 |
| 11 | 0 | PARITY CHECK FOR BITS 6,7,& 8 |

FIG. 31(c)

| VECTORS $u_2-u_6$ BIT # | BINARY VALUE | COMMENT |
|---|---|---|
| 0 | $T_i,3$ | TONE INDEX BIT # 3 (MSB) |
| 1 | $T_i,2$ | TONE INDEX BIT # 2 |
| 2 | $T_i,1$ | TONE INDEX BIT # 1 |
| 3 | $T_i,0$ | TONE INDEX BIT # 0 (LSB) |
| 4 | 0 | RESERVED |
| 5 | 0 | RESERVED |
| 6 | 0 | RESERVED |
| 7 | 0 | RESERVED |
| 8 | 0 | RESERVED |
| 9 | 0 | RESERVED |
| 10 | 0 | RESERVED |

FIG. 32

| TONE INDEX $T_i$ (DECIMAL) | TONE INDEX $T_i$ (BINARY) | INTERPRETATION |
|---|---|---|
| 0 | 0000 | 2100 Hz TONE |
| 1 | 0001 | 1800 Hz TONE |
| 2 | 0010 | RESERVED |
| 3 | 0011 | RESERVED |
| 4 | 0100 | RESERVED |
| 5 | 0101 | RESERVED |
| 6 | 0110 | RESERVED |
| 7 | 0111 | RESERVED |
| 8 | 1000 | RESERVED |
| 9 | 1001 | RESERVED |
| 10 | 1010 | RESERVED |
| 11 | 1011 | RESERVED |
| 12 | 1100 | RESERVED |
| 13 | 1101 | RESERVED |
| 14 | 1110 | RESERVED |
| 15 | 1111 | RESERVED |

SECURE COMMUNICATION SYSTEM

This is a continuation of application Ser. No. 08/324,480 filed Oct. 17, 1994, now U.S. Pat. No. 5,784,414, which is a continuation-in-part of application Ser. No. 08/065,017 filed May 24, 1993 now U.S Pat. No. 5,404,394.

FIELD OF THE INVENTION

The present invention relates in general to a system for supporting the direct interfacing of secure communication services, and in particular, to a system for supporting the direct interfacing of the U.S. Government's Secure Terminal Unit-III (STU-III) over low-rate digital mobile systems.

BACKGROUND OF THE INVENTION

The rapid increase in the popularity and use of cellular and satellite communications systems has highlighted the impeding congestion of mobile communications spectrum. Concurrently, rapid advances in digital signal processing technology have made possible the transmission of voice signals at ever decreasing encoding rates. This latter development is permitting the transmission of speech to be realized over much narrower channel bandwidths, thus promising to increase the system's subscriber capacity proportionally to the potential bandwidth requirements reduction (e.g., five-fold). These two developments have permitted mobile networks to be converted from analog-based systems to digital-based systems.

Unfortunately, the digitization of new mobile networks has made the transparent support of non-voice traffic impossible without the development of specialized interworking functions, which are tailored to specific end-user applications.

SUMMARY OF THE INVENTION

It is a general object of the present invention to provide a system for supporting a secure system over a digital system.

It is another object of the invention to provide a system for supporting the Secure Terminal Unit Version-III (STU-III) over low-rate digital systems including mobile systems.

These and other objects are realized by the present secure communication system.

In the above-mentioned U.S. application Ser. No. 08/065,017, a secure communication system is described for solving the problem of enabling customers of STU-III terminals operating over the analog public switched telephone network (PSTN) the ability to communicate over, for example, the Inmarsat-M digital satellite network. In particular, the secure communication system defines an inter-working specification which provides interoperability of analog STU-III equipment for use, for example, over the Inmarsat-M network.

As with Inmarsat-M channels, the Inmarsat-B is an all-digital system. The advantages of providing all-digital services is that satellite service providers are able to offer additional capacity to accommodate more subscribers and higher traffic levels than with analog satellite channels. This means that the digital service offered through Inmarsat-B (as with Inmarsat-M) terminals will be more efficient in their use of spectrum, providing better quality services in a more cost-effective manner. The primary difference between Inmarsat-M and Inmarsat-B systems is that the Inmarsat-M is a smaller, less cost effective terminal than the Inmarsat-B. Inmarsat-M services are designed for smaller craft and mobile vehicles which also have a need to communicate with shore-side points but do not have the means or need for larger Inmarsat-B terminals.

Unlike the Inmarsat-M system, Inmarsat-B service is capable of directly passing the required narrow-band tones through the voice coder. The exchange of narrow-band tones between STU-III terminals is essential for secure call establishment. In Inmarsat-M, the voice codec is able to repeatedly detect whether the incoming signal is either voice or a narrow-band tone. When a narrow-band tone is detected, a special bit sequence is transmitted which corresponds to an invalid voice signal. At the receiving earth-station, when an invalid voice is detected, the decoder regenerates the narrow-band tone as designated by the special bit sequence. However, for the Inmarsat-B system, since the channel voice coder is capable of accurately passing narrow-band signals directly (e.g., P1800 and 2100 Hz), it is unnecessary to modify the voice coder to enable the passage of such tones.

Similar to the Inmarsat-M system, Inmarsat-B employs the same type of channel transport mechanism for both voice and secure traffic. However, since the Inmarsat-B system channel format is significantly different from the Inmarsat-M system, a different channel structure has been defined for error coding and rate adaptation. Likewise, since the voice field channel structure and error characteristics for the Inmarsat-B system are notably different, a different error coding scheme has been designed for the two currently supported secure data rates.

Similar to the Inmarsat-M system, the Inmarsat-B secure protocol uses secure protocol packets to convey information regarding the initiation and termination of signal activity. However, in the Inmarsat-B architecture, all secure protocol packets are transmitted in triplicate for reliability.

DETAILED DESCRIPTION OF THE INVENTION

According to the present invention, the interworking functionality and architecture are defined for supporting the direct interfacing of the U.S. Government's Secure Terminal Unit-III (STU-III) over low-rate digital mobile systems. Although this functionality is presented from a particular system perspective, it is applicable to other low-rate digital mobile systems.

The functionality is described by means of a Secure Interface Unit (SIU) architecture and a Secure Communications (SC) protocol.

The primary function of the SIU architecture is the demodulation of secure traffic in the secure terminal-to-satellite direction and the re-modulation (or regeneration) of signals in the mobile- or fixed-station-to-secure terminal direction. In addition to the secure modems, the SIU incorporates a rate adaptation and protocol packetization mechanism, a channel encoding process, an elastic buffer, and an echo canceller.

This SC protocol is based on a packetized structure that interfaces with the voice channel to provide secure-to-clear and clear-to-secure communication in a seamless manner. In addition, this functionality provides for the controlled and synchronized call establishment to occur on an end-to-end basis, while it provisions for double satellite hop conditions. The SC protocol enhances the voice channel coding by using an error code to provide high-quality end-user communications even under low link-margin conditions.

The SIU is located at, for example, mobile and fixed stations, where it interfaces with the end-user secure terminals via 2-wire connections. The SIU is able to support a number of STU-III features including full and half-duplex operation at 2400 bit/s (interoperable) and 4800 bit/s (alternate) autosecure on receive and plan-text inhibit; and synchronous secure data.

The packetization approach, error-coding scheme, channel structure and handling of the call during its establishment and clearing are some of the features of the communication system according to the present invention.

BRIEF DESCRIPTION OF THE DRAWINGS

FIGS. 15(a) and 15(b) show a table for explaining packet types and designations according to the invention.

FIGS. 18(A) and 18(B) are diagrams for explaining Secure Transmission Protocol Processing of P1800 Signal according to embodiments of the invention.

FIGS. 19(a)–19(c) are tables for explaining the processing by an Initiating Secure Interface Unit according to the invention.

FIG. 20 is a diagram for explaining the Secure Transmission Protocol Processing of an MSG A Signal according to the invention.

FIG. 21 is a diagram for explaining the Secure Transmission Protocol Processing of an MSG B Signal according to the invention.

FIG. 22 is a block diagram for explaining Modem Training Sequence according to the invention.

FIG. 24 is a table for explaining coding according to a feature of the present invention.

FIG. 30 is a circuit diagram for explaining the Echo Control Configuration according to the invention.

FIGS. 31(a)–31(c) are tables for explaining the format of Data Vectors according to the invention.

FIG. 32 is a table for describing the Tone Index according to the invention.

DETAILED DESCRIPTION OF THE PREFERRED EMBODIMENTS

Figure 1:
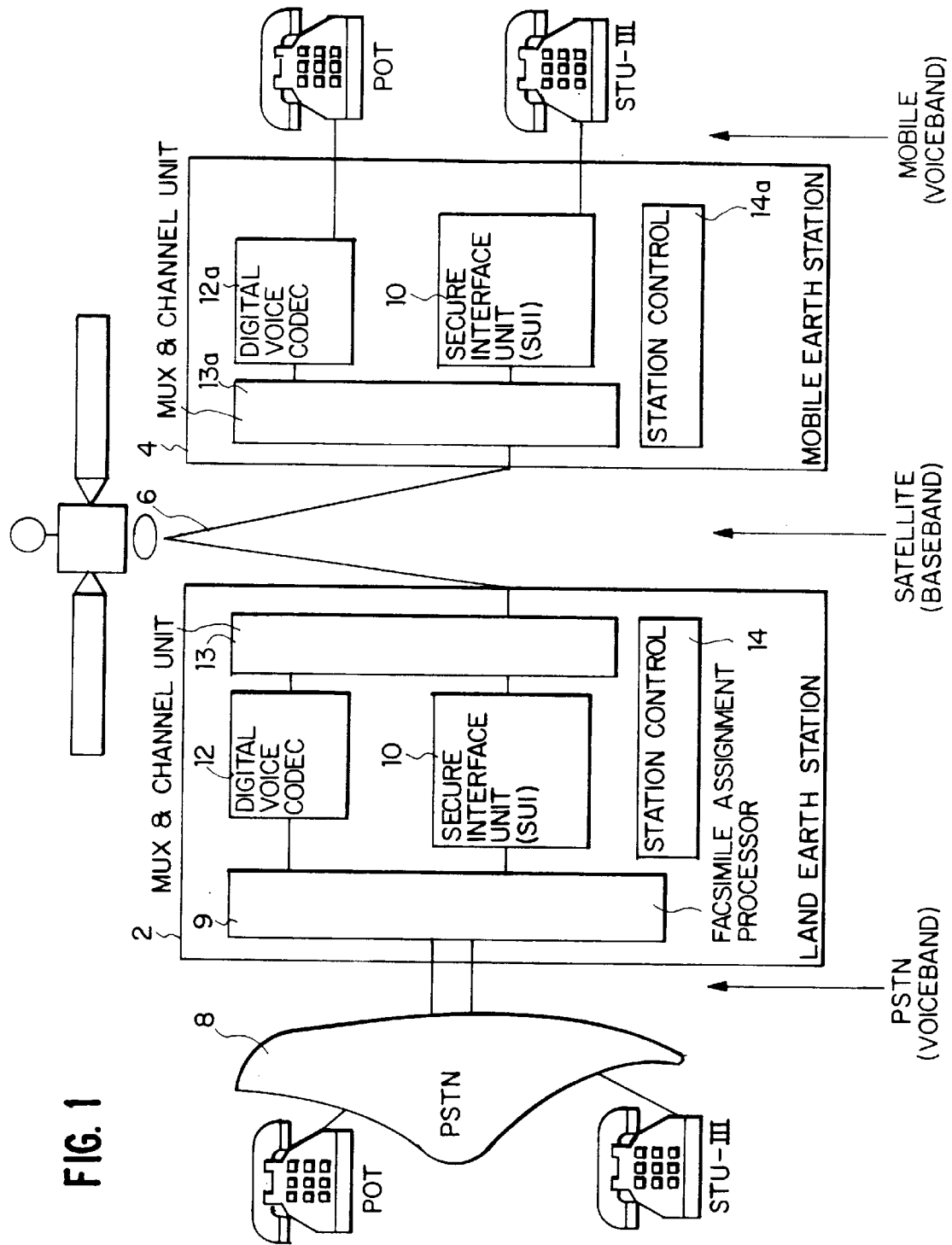
FIG. 1 is a general block diagram showing a network configuration according to the present invention.

FIG. 1 shows a general network configuration according to an embodiment of the present invention. As shown in FIG. 1, the network includes a Land Earth Station 2, and a Mobile Earth Station 4 which is connected to the Land Earth Station 2 via a satellite communication link 6. As shown in FIG. 1, a Public Switched Telephone Network (PSTN) 8 connects POTs (Plain old Telephones) and STU-III terminals to the Land Earth Station 2. On the other hand, POTs and STU-III terminals are directly connected to the Mobile Earth Station 4 which may be for example, a ship.

As shown in FIG. 1, the Land Earth Station 2 includes a Facilities Assignment Processor 9, a Secure Interface Unit (SIU) 10, a Digital Voice Codec 12, a Mux & Channel Unit 13 and a Station Control unit 14. The Facilities and Assignment Processor 9 is coupled between the PSTN 8, and the SIU 10 and the Digital Voice Codec 12, and functions to assign the various elements of the Land Earth Station 2 to the type of phone service requested. For example, the Facilities Assignment Processor 9 would assign the Digital Voice Codec when POT service is requested, and would assign the SIU 10 when a secure phone service is requested. The Mux & channel Unit 13 controls the transfer of data to and from the satellite link 6 which includes the modulation of the baseband data to IF frequencies and the demodulation of the IF frequencies to baseband data. The Station Control 14 controls and coordinates the communications activities of the Land Earth station 2.

The Mobile Earth station 4 includes a Mux & Channel Unit 13a, a SIU 10a, a Digital Voice Codec 12a and a Station Control 14a as in the Land Earth Station 2. The Mobile Earth Station does not include a Facilities Assignment Processor since, as indicated above, the STU-III terminals and POTs are directly connected to SIU 10a and Digital Voice Codec 12a, respectively.

Each of the Land Earth Station 2 and Mobile Earth Station 4 includes a Secure Interface Unit (SIU) 10, 10a whose primary function is the demodulation and remodulation of secure traffic for transmission over the low-rate mobile satellite circuits. The SIU is located at mobile and land earth stations, where it directly, or indirectly, interfaces with the end-user secure terminals via a 2-wire connection.

Secure communications, as supported by the network system of the present invention, are addressed in the Future Secure Voice System: Signaling Plan-Interoperable Modes, FSVS-210, Revision F, Mar. 31, 1992, National Security Agency and in Future Secure Voice System: Terminal Performance Specification. FSVS-220, Revision B, Feb. 26, 1988, National Security Agency which references are incorporated herein by reference. In the network system of the present invention, only the non-encrypted parts of the Secure Terminal unit-version III (STU-III) FSVS signaling plan are dealt with. Encrypted traffic is fully provisioned, but neither interfered nor decrypted in the system.

Figure 2:
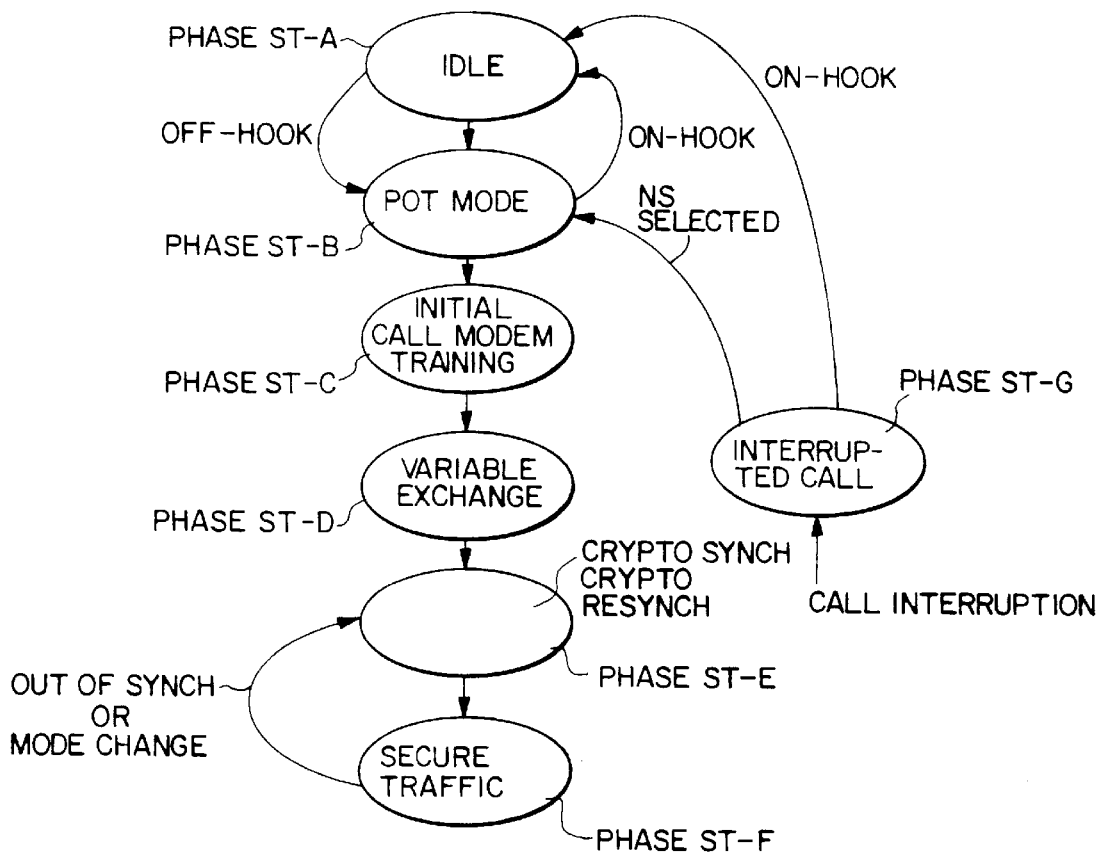
FIG. 2 is a state transition diagram for explaining the operation of a STU-III Terminal.

The overall system can be better understood if reference is made to the state transition diagram (FIG. 2) of a secure (STU-III) call comprising seven phases which may be defined as follows:

Phase ST-A: Idle (terminal is on-hook)
Phase ST-B: Clear (plain old telephone) mode;
Phase ST-C: Initial call modem training
Phase ST-D: Variable exchange
Phase ST-E: Crypto synchronization and/or resynchronization;
Phase ST-F: Secure traffic; and
Phase ST-G: Call interruption.

During phases ST-D, ST-E, and ST-F, a transparent digital connection (digital pipe) is provided by the SIU 10, 10a to the STU-III signals for the end-to-end exchange of crypto-synchronization and secure traffic. Only during phase ST-G is the non-encrypted control information (optionally) monitored by the SIU 10, 10a in order to detect call interruption conditions.

Figure 3:
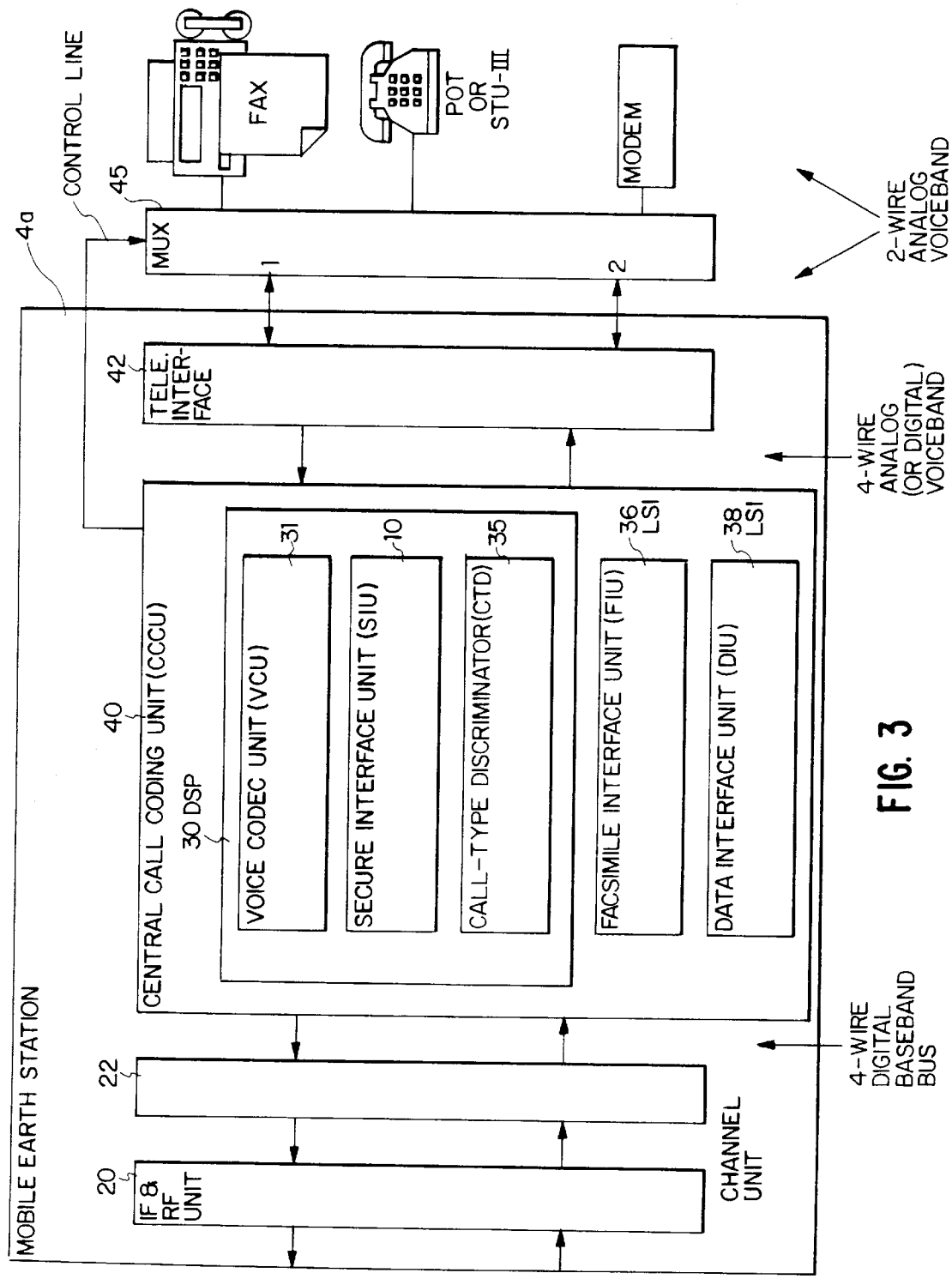
FIG. 3 is a block diagram of a Mobile Earth Station for Voice and Non-Voice Services according to an embodiment of the invention.

FIG. 3 shows a configuration for implementing a Mobile Earth Station (MES) 4a according to an embodiment of the invention which supports secure voice or data calls. The configuration shown in FIG. 3 is applicable to a wide variety of MES terminal implementations irrespective of the actual manufacturer.

As shown in FIG. 3, the MES 4a includes IF & RF units 20, a Channel Unit 22, a Central Call Coding Unit (CCCU) 40, and a Telephone Interface 42. The CCCU 40 includes a programmable Digital Signal Processor 30 which includes a Voice Codec Unit 31, a SIU 10 and a Call-Type Discriminator 35. The CCCU 40 further includes a Facsimile Interface Unit 36 and a Data Interface Unit 38. Facsimile Interface Units are discussed in detail in U.S. application Ser. Nos. 07/754,785 filed Sep. 4, 1991, Ser. No. 07/935,787 filed Aug. 27, 1992 and Ser. No. 07/720,990 filed Jun. 26, 1991, which applications are incorporated herein by reference.

Referring to FIG. 3, the IF and RF units 20 and the channel units 22 receive the satellite radio frequency signals and then perform the necessary frequency translation and demodulation of the received signal to the baseband. After this translation and demodulation, the baseband signal is passed to the CCCU 40 for further processing.

The CCCU 40 may be placed in its entirety within a programmable Digital Signal Processing (DSP) device, however, the CCCU may be partitioned into several discrete components. Furthermore, because some of the secure modes are custom specified, these are likely to be best implemented in the same digital signal processor as the voice functions.

For speech signals (plain old telephone, or POT, calls) in the Inmarsat-B system, the CCCU 40 activates the digital Voice Codec Unit (VCU) 31 with its input being the analog (or 64 kbit/s PCM digital) voiceband signal and its output being a 16 kbit/s uncoded, parametrically represented baseband signal. For the Inmarsat-M system, the output is a 6.4 kbit/s encoded, parametrically represented baseband signal.

For facsimile signals, the CCCU 40 activates the facsimile interface unit (FIU) 36 whose purpose is the demodulation of facsimile signals and protocol handling. Its input is the analog voiceband data facsimile signal and its output is an error protected baseband data facsimile signal. Any rate adaptation, which may be required due to the many different modems employed during a facsimile transmission, is performed by the FIU 36.

For voiceband data signals, the CCCU 40 takes a form similar to that of the facsimile interface: its input is an analog voiceband data signal and its output is a (optionally error protected) baseband data signal. Data are, thus, handled by the Data Interface Unit (DIU) function 38, which may reside within one or more Large Scale Integrated (LSI) components.

For secure calls, the CCCU 40 activates the Secure Interface Unit (SIU) 10 whose input is the analog voiceband data signal and its output is an error protected (coded) 16 kbit/s baseband data signal. When secure voice (e.g., STU-III) terminals operate in the POT mode, only the Voice Codec Unit 31 of the CCCU 40 is active (the SIU 10 is thus disabled). The SIU 10 may reside within the same programmable component as the Voice Codec 31 because of the programmability of that component, as well as the possible alternation between the secure and clear modes of communication. Some implementations may, however, partition the SIU 10 over several physical components.

The interworking between the different units of the CCCU 40 is controlled by the call-type discriminator (CTD) 35. This discriminator monitors and analyzes the status of the incoming and outgoing signals continuously so as to detect changes in the type or spectral characteristics of signals being transmitted while a call is in progress. That is, POT, facsimile, data and secure voice have unique characteristics which allows the CTD to discriminate a call in order to activate the appropriate one of the Voice Codec Unit 31, Secure Interface Unit 10, Facsimile Interface Unit 36 and Data interface Unit 38. Unlike other elements of the CCCU 40 that only operate one at a time (i.e. their operation is mutually exclusive), the CTD 35 always operates in parallel with one of the units. The CTD 35 may be implemented within the programmable VCU/SIU function, or may be implemented as a separate element.

The digital signal that has been processed by one of the units VCU 31, SIU 10, FIU 36 or DIU 38 of the CCCU 40 will then be converted into an analog signal at an output interface (not shown) of the CCCU 40.

The converted analog signal will then be placed on the four-wire analog voiceband bus which is sent to the Telephone Interface 42 which converts that signal to a two-wire interface which will then be connected to the telephone, STU-III terminal, modem or a piece of fax equipment (i.e., any component that is compatible for connection to a standard telephone circuit).

As shown in FIG. 3, the output of the Telephone Interface 42 is coupled to a FAX machine, POT, STU-III or Modem via a Multiplexer 45. The Multiplexer 45 facilitates detection of which service is supposed to be operating at any one point of time. In other words, since for example, a fax call and a voice conversation can not occur simultaneously on the same channel, the Multiplexer 45 selects only one of those calls at any given time. In the embodiment shown in FIG. 3, the Multiplexer 45 includes first and second ports for connecting end-user terminals. The first port 1 will be used for normal telephony, facsimile, and secure voice. The second port 2 will be used for voiceband data. Additional ports may be provided for voiceband data, if necessary, in order to permit the reliable detection and accommodation of more types of voiceband data modems. This access separation into two ports is considered desirable because of the great variety that exists between the call set-up signaling used by different types of voiceband data modems (thus distinguishing between different modem types and secure/facsimile is a considerable problem by itself and should be handled separately). By separating the ports into two, the secure voice terminal problem can thus be confined into a problem of distinguishing between voice, facsimile and secure traffic only.

For the voice/facsimile/secure voice port 1, it is possible to assign separate service addresses to each type of terminal. This may, in fact, occur for facsimile (at least during the initial phases of the service provisioning). In this case, the call discrimination problem reduces to one of distinguishing between POT voice and secure transmissions only. Such a solution does not conflict with the approach taken here; it is merely a sub-set.

For voiceband data, sophisticated signal discrimination techniques known in the art may be necessary to distinguish between different voiceband data types. This is because voiceband data modems use partially common call set-up signaling procedures which complicates the reliable detection of different types of modulation schemes. One approach is to assign separate physical MES entry ports to each type of modem. Another approach is to use separate service addresses. Neither of these approaches is very desirable, however, and the use of sophisticated signal discrimination techniques may thus be inevitable. In all cases, however, separation of modem traffic from voice, facsimile, and secure transmissions is highly desirable in order to eliminate possible adverse interactions. Although this differentiation appears to be somewhat restrictive, it may lead to significantly simpler implementations, particularly if support of additional types of voiceband data terminals is required in the future. Furthermore, further study may identify voiceband modem types which can be guaranteed not to interfere with voice/facsimile/secure voice call detection, in which case selected modem types can be allowed to access port 1.

In the various embodiments it is assumed that voice, facsimile, and secure voice are addressed by a single access code (terminal number). All traffic, facsimile and secure calls are thus routed to port 1, by an optional private branch exchange (PBX) or multiplexer 45, as shown in FIG. 3. Voiceband data are routed to a separate port for the reasons mentioned above.

The Multiplexer 45 selects one of the two ports in accordance with a control line from the CCCU 40. For example, the CTD 35 would monitor the characteristics of the data that is being received by the CCCU 40, and if those characteristics indicate that data is being supplied, then this determination by the CTD 35 would cause the CCU 30 to activate the DIU 38 and to cause Multiplexer 45 via the control line to select port 2 for connection to the Modem.

The configuration shown in FIG. 3 assumes that each mobile earth station includes at least a Central Call Coding Unit (CCCU) whose function is to encode input signals and to convert them into a format suitable for further processing by the earth station's channel unit. It is also assumed in the FIG. 3 configuration that only one channel unit is provided (per input circuit). However, those skilled in the art will understand that this is not a restrictive assumption under the configuration disclosed herein. Specifically, multichannel configurations are not expected to impact the protocols described herein.

Figure 4:
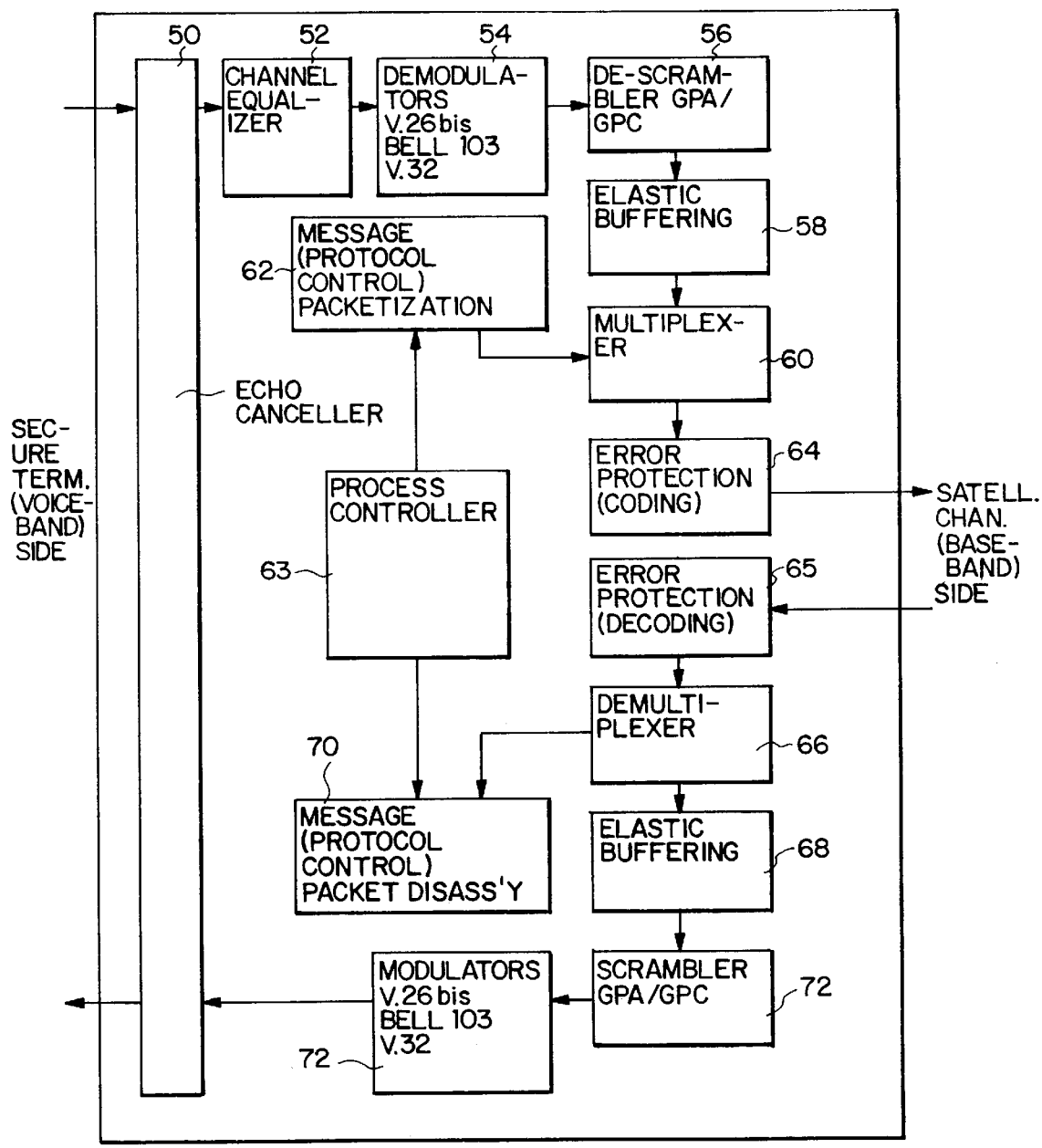
FIG. 4 is a block diagram of a Secure Interface Unit (SIU) according to an embodiment of the invention.

The central concept in the SIU architecture is the demodulation of signals in the secure terminal-to-satellite direction and the re-modulation of signals in the satellite-to-secure terminal direction. This is accomplished by a bank of modulators and demodulators, as illustrated in FIG. 4. Also included in the SIU function are the necessary GPA and GPC STU-III scramblers and descramblers (used during the V.26 modem training phase only), a process controller which provides for rate adaptation and protocol packetization, an error correcting process, and an elastic buffering process. Finally, an echo canceller is also provided to permit full-duplex communication to be accommodated over two-wire network access points.

Implementation of the SIU architecture relies heavily on the basic concepts used in modern modem technology. The digital output of a terminal equipment is modulated to form an analog signal for easier transmission over communication lines (such as the Public Switched Telephone Network or PSTN); conversely, an analog signal is demodulated to change it back to a digital signal. As an analog modem signal is transmitted over the PSTN, it often encounters imperfections within the network which often makes it difficult for the receiver to correctly decode the transmitted information. The imperfections which are most prevalent in the PSTN network are (1) envelope and delay distortion, (2) listener echo, (3) noise impairments such as phase jitters, frequency offset, phase hits and gain hits. In most high-performance modems, echo cancellers and channel equalizers are used to increase the data rate capacity of an analog telephone circuit by eliminating the noise added by the PSTN.

Referring to FIG. 4, the SIU includes an Echo Canceller 50 and a Channel Equalizer 52 to increase the data rate capacity and eliminate noise added by the PSTN. After the network's impairments have been removed from the analog signal, the Demodulators 54 convert the analog signal to a digital signal. After the analog signal has been demodulated, it is then processed by a De-Scrambler 56. Under normal usage, data processing equipment occasionally produces data patterns (like a long string of ones) that can cause the receiving modem problems (usually in the clocking circuitry). As the De-Scrambler 56 in the receiving modem changes the data back to its original pattern, Elastic Buffers 58 are used to absorb clock differences between the satellite channel and the secure end-user terminals received (or transmitted) over the telephone circuit. The receive side Multiplexer 60 is used to select whether the information is user data to be transmitted over the satellite channel or system control information from the Message (Protocol Control) Packetization process 62 provided by the process controller 63 to be transmitted over the satellite channel. Finally, Error Protection (Coding) 64 is applied to the data which is to be transmitted in order to protect it from satellite noise impairments.

The inverse operations of the Error Protection Coding 64, Packetization 62, Multiplexer 60, Elastic Buffering 58, De-Scrambler 56 and Demodulators 54 are provided by the Error Decoding 65, Packet Disassembly 70, Demultiplexer 66, Elastic Buffering 68, Scrambler 72 and Modulators 72, respectively.

It is noted that the traffic supported by the system shown in FIG. 4 is neither decrypted, nor descrambled (with the exception of certain modem training segments), nor source decoded. Consequently, the encryption, decryption and STU-III voice coding functions are notably and intentionally absent from the SIU shown in FIG. 4.

Not shown in FIG. 4 is a BCH decoder which may have to be implemented if call interruptions are handled using the optional Message Identifier (MID) interpretation procedures addressed below.

According to the embodiments disclosed herein, unless otherwise specified, the SIU performance characteristics comply with those applicable to STU-III terminals, as specified in FSVS specifications 210 and 220 cited above. For example, SIU echo canceller specifications, transmit signal levels and receive signal operating characteristics comply with FSVS 210 and 220, unless indicated otherwise.

Secure Call Transport Channel

For practical reasons it is desirable to employ the same type of channel transport mechanism for both voice and secure traffic. This approach was adopted because it facilitates the use of multiple in-call modification requests which may be initiated by the end-user, or dictated by the characteristics of the channel, such as when:

A user requests a return to the clear (POT) mode of communication;

A severe fade causes modem training to fail thus requiring a return to the clear mode followed by modem retraining;

A severe fade causes a burst of uncorrectable errors, eventually leading to loss in cryptographic synchronization; and A data channel synchronization discrepancy (slip) causes cryptographic synchronization loss.

If the voice channel can be used for both voice and secure transmissions, this will also imply that signaling units need not be employed. This permits the following advantage to be realized:

The channel's full-duplex continuous availability can be guaranteed. This is because the channel unavailability associated with signaling unit channel-type modifications is no longer relevant (which can be longer than 500 ms). This makes it both possible and very convenient to convert from voice to secure transmissions and vice versa, at any time during a secure call.

As set forth below an error correcting code is defined for interoperable mode transmission of secure traffic at an end-user signaling rate of 2.4 kbit/s. As also set forth below, error correcting codes (including a rate ¾ error correcting code) is defined for alternate mode transmission of secure traffic at an end-user signaling rate of 4.8 kbit/s. Error correcting is applied upon entering phase ST-C (as defined in FIG. 2 and also addressed later).

Error Coding for 2.4 kbit/s Secure Traffic

The general characteristics of the error correcting code to be applied to the 2.4 kbit/s end-user traffic during the interoperable mode of communication are as follows (see FIG. 5(*a*)):

Code rate=⅜;

Channel bit-rate=6400 bit/s;

Code Type=Augmented convolutional;

Constraint length K=7;

Code generator polynomials=133, 171 (octal);

Phase ambiguity resolution=Unique word (e.g., as defined in Inmarsat-M SDM, Section 3.2.2.9);

Modulation method=Offset QPSK;

Modem filter=60% Rolloff;

Demodulator detection=8 level (3 bits) soft decision; and

Code flushing bits=6 "zeros" following last bit of data fed into the encoder (e.g., as defined in Inmarsat-M SDM, Section 3.2.2.10)

It is noted that this error correcting code is also applied to the secure protocol control packets exchanged between SIUs (defined later).

The following sets forth another embodiment for error coding for 2.4 kbit/s secure traffic.

Figure 5A:
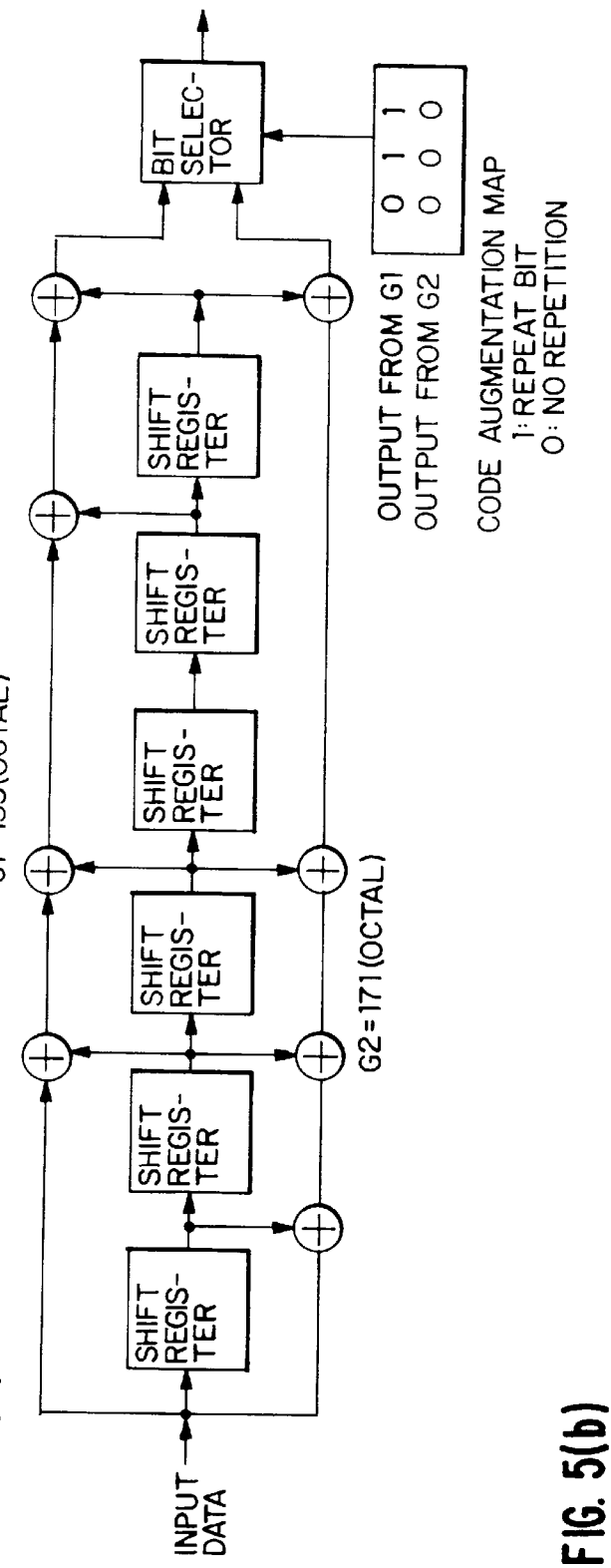
FIG. 5(a) is a circuit diagram of a Rate ⅜ Augmented Convolutional Code Generator of the invention.
Figure 5B:
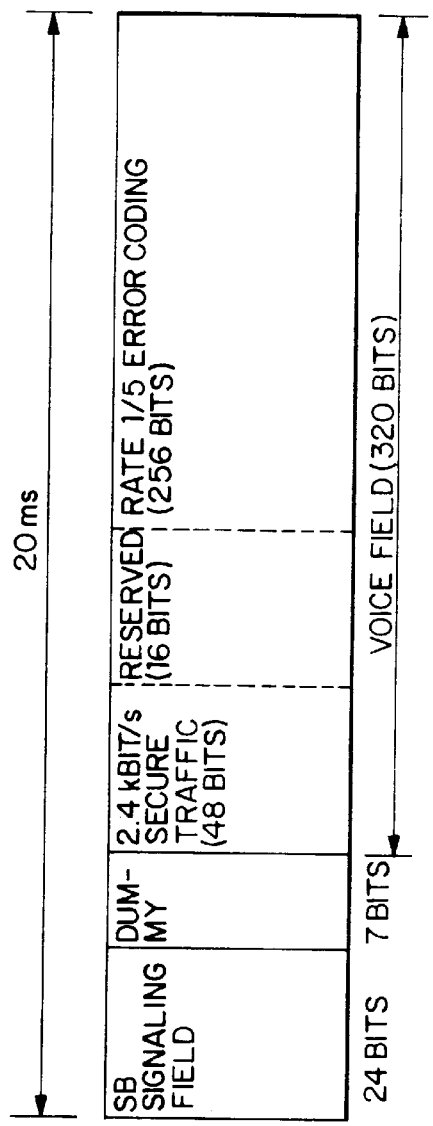
FIG. 5(b) is a diagram for illustrating the composition of voice and associated fields during 2400 bit/s secure communication.

Before 2.4 kbit/s secure traffic can be channel (error) encoded, it is rate-adapted to 3.2 kbit/s as follows:

Referring to FIG. 5(*b*), each voice field, which consists of 320 bits, shall be partitioned into 3 sub-fields as follows. The first sub-field, comprising 48 bits, shall be occupied by the demodulated, 2.4 kbit/s secure traffic. The first bit in this sub-field that follows the last bit of the 7 bit dummy field shall correspond to the first bit received over the incoming telephone channel. The second sub-field, comprising 16 bits, shall be filled by a reserved data pattern. The third sub-field, comprising 256 bits, shall be used by the rate ⅕ error code defined below. It is noted that the first two sub-fields, comprising 48+16=64 bits, correspond to a net transmission rate of 3.2 kbit/s.

It is noted that only one of the four voice fields (and pertinent sub-band signaling and dummy fields) associated with a signal unit is shown in this figure. It is also noted that the 16 bits in the second sub-field shall be filled by zeros. This pattern applies to this version of the protocol only. In future protocol versions, this sub-field may be utilized for enhanced services.

The generator polynomials for the diffused self-orthogonal error correcting code of rate ⅕ to be applied to the 2.4 kbit/s end-user traffic during the interoperable mode of communication are as follows:

$G_1(D)=1$
$G_2(D)=1+D^\lambda+D^{10\lambda+3}+D^{12\lambda+4}$
$G_3(D)=1+D^{2\lambda}+D^{13\lambda+5}+D^{14\lambda+7}$
$G_4(D)=1+D^{3\lambda}+D^{7\lambda}+D^{16\lambda+8}$
$G_5(D)=1+D^{5\lambda}+D^{8\lambda+1}+D^{9\lambda+2}$ Code rate=⅕, Channel bit-rate=16000 bit/s, Code Type Diffuse Self-Orthogonal, Code Interleaving Degree (λ)=12, Processing Delay=16.7 ms.

It is noted that this error correcting code is also applied to the secure protocol control packets exchanged between SIUs.

Error Coding for 4.8 kbit/s Secure Traffic

Figure 6A:
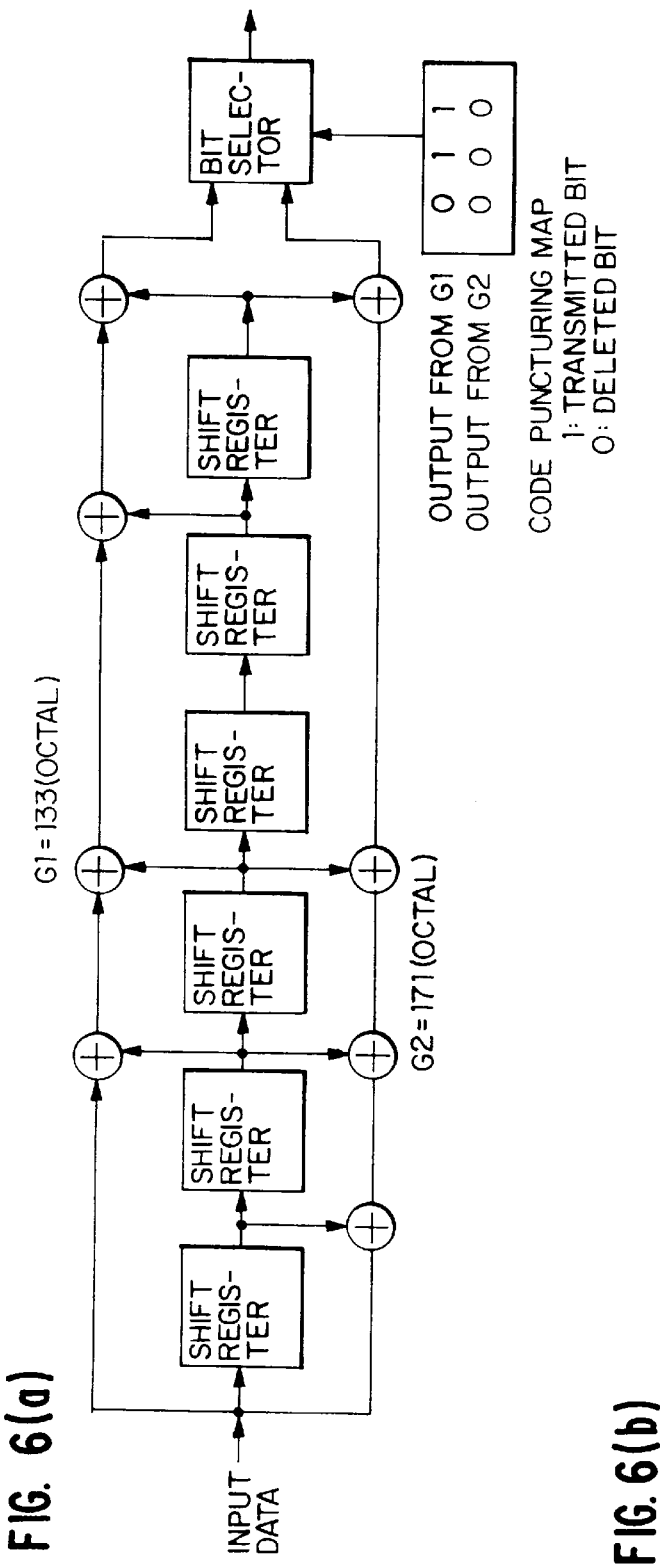
FIG. 6(a) is a circuit diagram of a Rate ¾ Punctured Convolutional Code Generator according to embodiment of the invention.

The general characteristics of the error correcting code to be applied to the 4.8 kbit/s end-user traffic during the alternate mode of communication according to one embodiment are as follows (see FIG. 6(A)).

Code Rate=¾

Channel Bit-Rate=6400 bit/s

Code Type=Punctured Convolutional,

Constraint Length K=7; and

Code generator polynomials 133, 171 (octal);

Phase ambiguity resolution=Unique word (e.g. as defined in Inmarsat-M SDM, Section 3.2.2.9);

Modulation method=Offset QPSK;

Modem filter=60% Rolloff;

Demodulator detection=8 level (3 bits) soft decision; and

Code flushing bits=6 "zeros" following last bit of data fed into the encoder (e.g., as defined in Inmarsat-M SDM, Section 3.2.2.10)

Convolutional codes are used to protect digital data from satellite channel errors, as previously mentioned. FIGS. 5(A) and 6(A) show shift-register circuits which generate a rate ⅜ convolutional code and ¾ convolutional code, respectively. Input bits are clocked into the respective circuits from the left. After each input is applied the coder output is generated by sampling and routing the outputs of the two modulo-2 adders (exclusive-OR). A convolutional code is defined by the number of stages in the shift register, the number of outputs (i.e., the number of modulo-2 adders), and the connections between the shift register and the modulo-2 adders. The state of the encoder is defined to be the contents of the shift register and is completely determined by the previous information bit inputs.

The output of the upper modulo-2 adder is the product of the degree-2 polynomial $G1(D)$ $1+D^2+D^3+D^5+D^6$ and the lower modulo-2 adder is the product of the degree-2 polynomial $G2(D)$ $1+D+D^2+D^3+D^6$ (FIG. 5(A)). A similar analysis can be performed on the upper and lower degree-2 polynomials of FIG. 6(A). For a given clock period, one bit of input will generate two bits of output. For the rate ⅜ augmented convolutional coder generator certain designated coder output bits will be repeated to generate the desired output rate, as indicated in FIG. 5(A). For the rate ¾ punctured convolutional code generator, certain designated coder output bits will be deleted to generate the desired output rate, as indicated in FIG. 6(A).

The following sets forth an additional embodiment for error coding for 4.8 kbit/s secure traffic.

Figure 6B:
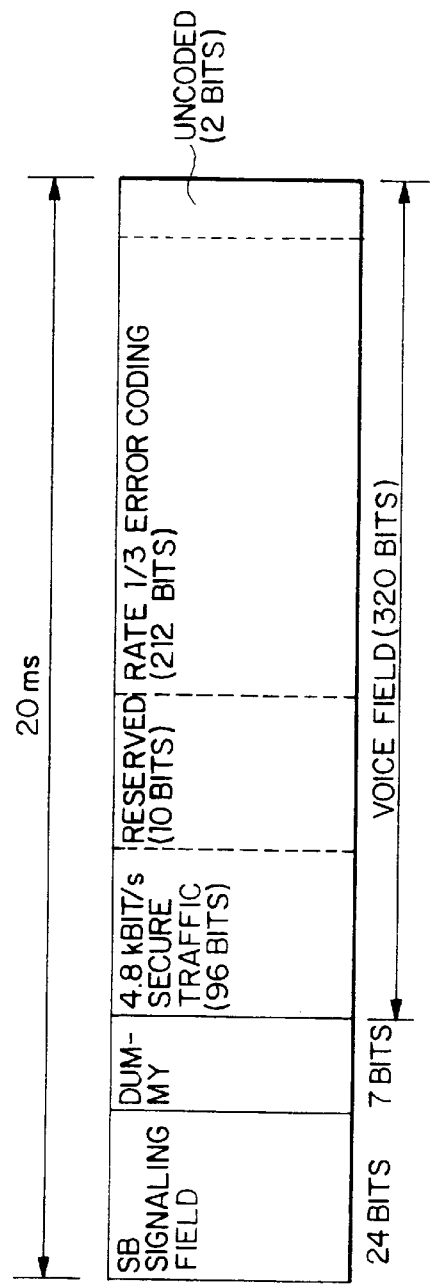
FIG. 6(b) is a diagram for illustrating the composition of voice and associated fields during 4800 bit/s secure communication.

Before 4.8 kbit/s secure traffic is channel (error) encoded, it is rate-adapted to 5.3 kbit/s as follows:

Referring to FIG. 6($b$), each voice field, which consists of 320 bits, is partitioned into 4 sub-fields as follows. The first sub-field, comprising 96 bits, is occupied by the demodulated, 4.8 kbit/s secure traffic. The first bit in this sub-field that follows the last bit of the 7 bit dummy field shall correspond to the first bit received over the incoming telephone channel. The second sub-field, comprising 10 bits, shall be filled by a reserved data pattern. The third sub-field, comprising 212 bits, shall be used by the rate ⅓ error code defined below. It is noted that the first two sub-fields, comprising 96+10=106 bits, correspond to a net transmission rate of 5.3 kbit/s. The final field is uncoded and is used only to fill the remaining 2 bits of the voice field.

It is noted that only one of the four voice fields (and pertinent sub-band signaling and dummy fields) associated with a signal unit is shown in this figure. It is also noted that the 10 bits in the second sub-field shall be filled with zeros. This pattern applies to this version of the protocol only. In future protocol versions, this sub-field may be utilized for enhanced services.

The generator polynomials for the diffused self-orthogonal error correcting code of rate ⅓ to be applied to the 4.8 kbit/s end-user secure traffic during the interoperable mode of communication are as follows:

$G_1(D)=1$ $G_2(D)=1+D+D^{\lambda+2}+D^{4\lambda+4}+D^{8\lambda+5}+D^{10\lambda+10}$ $G_3(D)=1+D^2+D^{2\lambda+2}+D^{6\lambda+4}+D^{7\lambda+4}+D^{9\lambda+7}$ Code rate=⅓, Channel bit-rate=16000 bit/s Code Type Diffuse Self-Orthogonal, Code Interleaving Degree $(\lambda)=15$ Processing Delay=11.1 ms.

Call Discrimination

In identifying a secure call, a two layered process needs to be considered. First, the calls are grouped into voice and non-voice. Subsequently, non-voice calls are characterized as either facsimile or secure.

Voice/Non-Voice Call Discrimination

Voice/non-voice call discrimination is accomplished by the call-type discriminator 35 (FIG. 3) which monitors the type of waveform activity presented on each direction of signal transmission. Two types of signals (signal_types) can be used to assist the call-type discrimination process:

signal_type-V: characterized by wideband non-uniform frequency spectra, non-stationarity, and low transmission levels. This signal type corresponds to the spectral, energy and temporal characteristics of speech signals.

signal_type-N: characterized by narrowband frequency spectra, stationarity, and high signal transmission levels. This signal type corresponds to the spectral, energy and temporal characteristics of the following three single-frequency tones: 1100 Hz, 1800 Hz, and 2100 Hz.

Figure 7:
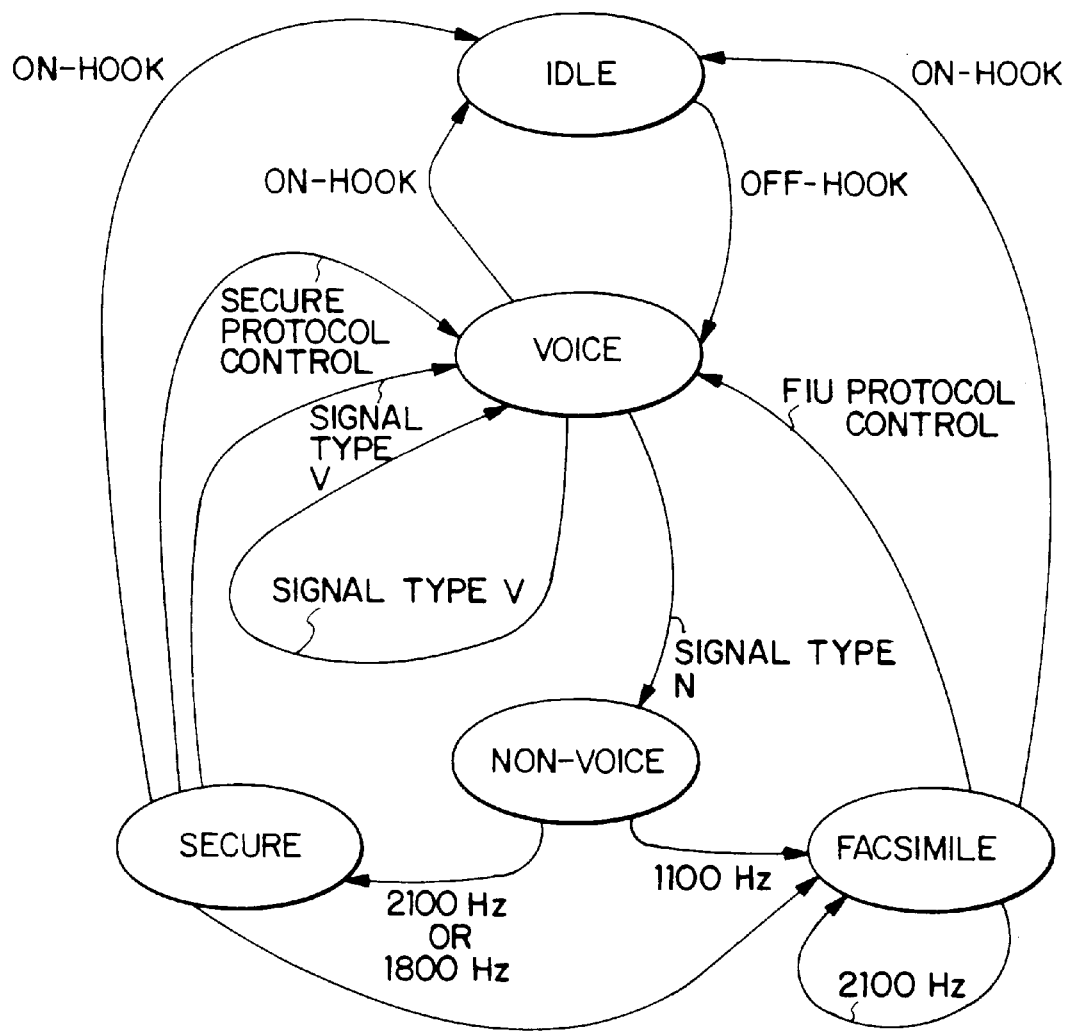
FIG. 7 is a state diagram for Voice-Non-Voice Call Discrimination according to the invention.

A state diagram of the possible call-type transitions is shown in FIG. 7. As noted above, the call-type discriminator (CTD) 35 always functions in parallel with the voice codec, facsimile, or secure interface unit so that the transition from voice to non-voice call processing can be initiated at any time during a call in-progress. Once the non-voice state has been entered, return to the voice state is under the non-voice coding unit (FIU or SIU) control, or extended presence of signal_type-V.

In particular, for secure transmissions, return to the voice mode is under secure protocol control, or invoked by the detection of extended periods of signal_type-V activity (which includes idle, or no signal energy, on the telephone line) as will be discussed later. For facsimile transmissions, return to the voice mode is under protocol control.

Non-Voice/Secure Call Discrimination

Figure 8:
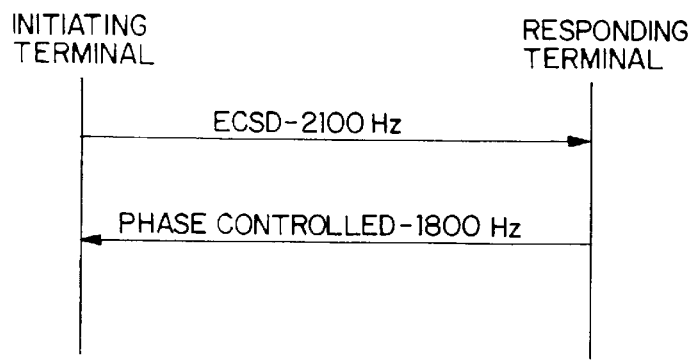
FIG. 8 is a diagram for illustrating secure Voice Call Establishment over the PSTN (full-duplex) according to the invention.

Full-duplex secure calls are always initiated by transmission of an echo canceller or echo suppressor disabling (ECSD/ESD) 2100 Hz tone (thereafter referred to for simplicity as ECSD, unless otherwise necessary). The full-duplex secure call establishment process over the Public Switched Telephone Network (PSTN) is illustrated in FIG. 8.

Half-duplex secure calls are always initiated by the transmission of a pseudo 1800 Hz tone (often denoted as P1800 Hz, or simply P1800) in the initiator-to-responder direction. The half-duplex secure call establishment process is illustrated in FIG. 9.

When group 3 facsimile terminals are configured in the automatic mode of communication, calls are always initiated by transmission of an 1100 Hz calling tone (CNG) and then followed by a 2100 Hz called station identification signal (CED) in the reverse direction of transmission. Facsimile terminals are considered to be in the automatic mode when the destination address is dialed directly from the key-pad of the end-user facsimile terminal. When dialing from a facsimile terminal is done using a separate telephone set, non-automatic call establishment occurs. In this case the use of CNG is optional, although all modern facsimile terminals appear to be using the CNG tone even when not dialing automatically.

Figure 10:
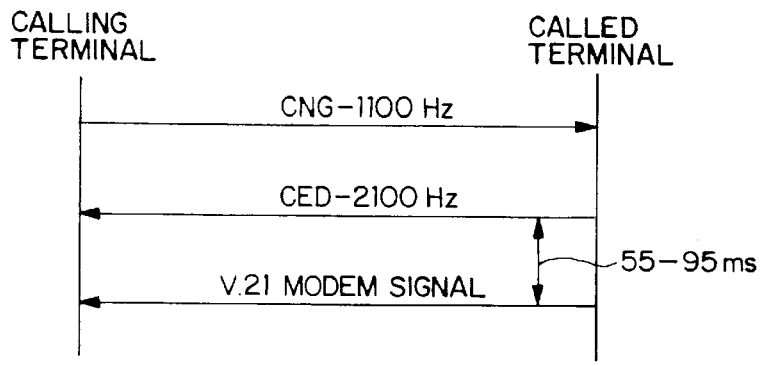
FIG. 10 is a diagram for illustrating Facsimile Call Establishment over the PSTN according to the invention.

The basic protocol for the establishment of facsimile calls over the PSTN is shown in FIG. 10.

Figure 9:
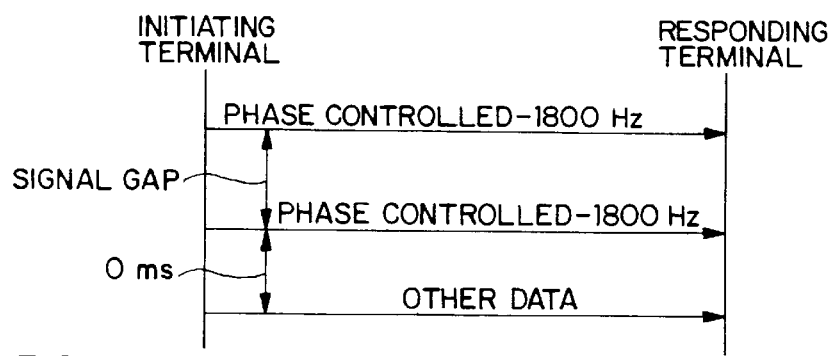
FIG. 9 is a diagram for illustrating Secure Voice Call Establishment over the PSTN (half-duplex) according to the invention.

From FIGS. 8–10 it can be seen that when an 1100 Hz tone is detected, a transition from the voice codec unit to the facsimile interface unit can be initiated. Alternatively, when the 2100 Hz tone is detected (which has not been immediately preceded by an 1100 Hz tone) or the 1800 Hz tone is detected, a transition from the voice codec unit to the secure interface unit can be initiated. This is shown by the state transition diagram shown in the lower part of FIG. 7.

Secure/Facsimile Call Fall-Back

In order to accommodate the possible incorrect call routing that may arise if older group 3 facsimile terminals (not employing 1100 Hz CNG transmission) are mistaken for secure terminals, an escape mechanism has been provided as set forth below so that a call can be converted from secure to facsimile if signal_type_A condition is present: signal_type-A:

Characterized by 2100 Hz activity, followed within 55 to 95 ms by V.21 (1750 Hz) carrier activity (in the same direction of transmission) without any activity being present in the return direction of transmission for the duration of the 2100 Hz and V.21 signals.

The implication of this service-mode conversion is that the first facsimile terminal-originated CED/DIS signal pair will be corrupted and a second signal pair will be transmitted from the called terminal after approximately 3 seconds. After the second CED/DIS pair has been transmitted it can be expected that facsimile call establishment will progress satisfactorily through phases A and B of the CCITT Recommendation T. 30 protocol as described in CCITT Recommendation V.32, "Procedures for Document Facsimile Transmission in the General Switched Telephone Network", Blue Book, Melbourne, November 1988.

Call Establishment

The establishment of secure voice calls addressed below, and its interaction with voice and non-voice call set-up procedures is identified.

Call establishment in three different cases is addressed. These cases are: full-duplex interoperable, full-duplex alternate, and half-duplex interoperable.

Full-Duplex Interoperable

As indicated above, upon detection of a 2100 Hz tone, the transition from the POT voice to the secure mode can, and must, be initiated. This transition must satisfy the following requirements:

The 2100 Hz ECSD tone (as seen by the responding secure end-user terminal) must not be disrupted severely by the transition process;

The channel connectivity, on an end-to-end basis, must be maintained during the CCCU (central call coding unit) transition process so that signal activity following the ECSD tone can be transmitted uninterrupted; and The transition must be completed within 1 second of the initiation of the ECSD tone so that the next signal (phase modulated 1800 Hz) can be correctly handled by the SIU; and Finally, the transition must be completed quickly after the establishment of the ECSD tone (i.e. within 400 ms), so that any phase changes can be reliably conveyed on an end-to-end basis to network equipment located in the proximity of the responding end-user secure terminal.

Figure 11:
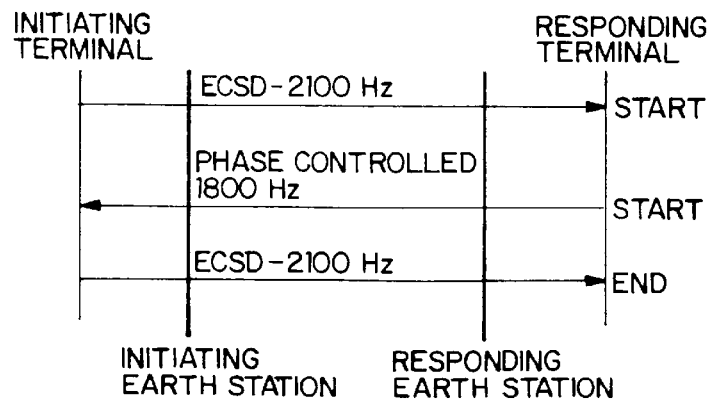
FIG. 11 is a diagram for illustrating Secure Call Establishment (full-duplex) according to the invention.
Figure 12:
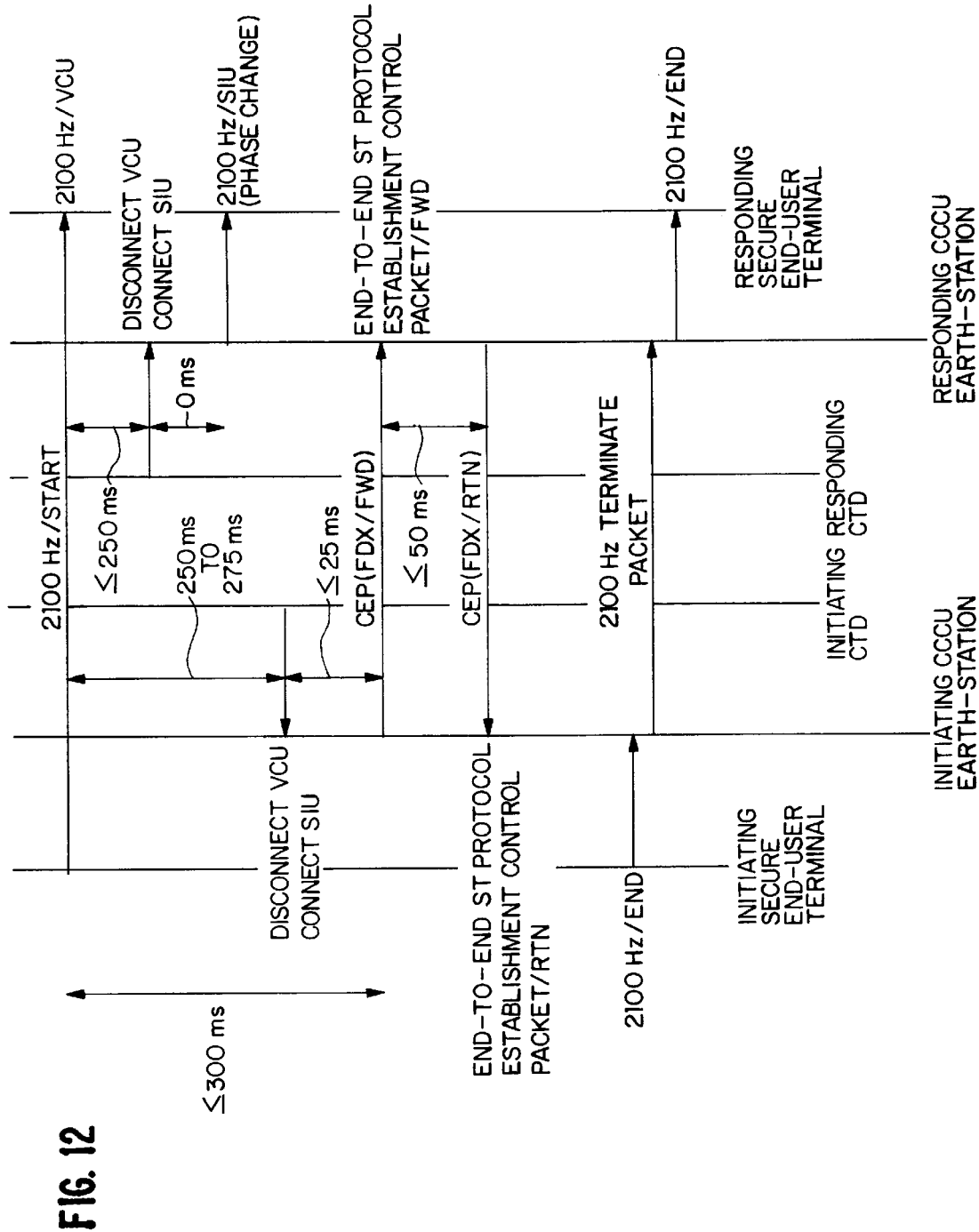
FIG. 12 is a diagram for illustrating Secure (full-duplex) Call Establishment Process according to the invention.

The call set-up approach (refer to FIG. 11 for end-to-end PSTN protocol and to FIG. 12 for end-to-end protocol in the presence of Inmarsat-B earth-station equipment,) that can satisfy these requirements, and does not require the VCU to reliably preserve ECSD phase transitions is the following:

Upon detection of the ECSD tone, the responding earth station's call-type discriminator recognizes signal_type_N activity followed by 2100 Hz activity associated with the initiation of a secure call and invokes the secure interface unit.

The SIU process is commenced by logically disconnecting the voice codec unit (VCU) from the end-to-end path by instructing the secure interface unit (SIU) to commence transmission of the 2100 Hz tone. In this manner transmission of the 2100 Hz tone to the responding end-user secure terminal continues without a gap in signal energy (although with the possible introduction of a single phase change due to the transition process).

Coincident with this transition from the VCU to the SIU, the Secure Transmission (ST) Protocol at the responding earth station (forward direction) takes over. At this time the 6400 bit/s or 16k bit/s channel continues to employ the voice codec in the return responder SIU-to-initiating SIU (return) direction.

Once the forward ST protocol takes over, all further initiating earth station-to-responding earth station communication is conducted in-band, by means of packets. In particular, the transmission of the non-phase reversed 2100 Hz tone from the responding SIU to the responding secure terminal continues until instructed otherwise from the initiating earth station end by means of an appropriate packet. Shortly after the responding earth station call-type discriminator forced the VCU-to-SIU transition, the initiating earth station's call-type discriminator requests the initiating VCU to be logically disconnected and the initiating SIU to be logically inserted into the channel.

The initiating SIU becomes operational and sends an in-band control packet to the responding earth station thus confirming that the ST protocol has now been fully established on an end-to-end basis in the forward direction. On completion of the last bit of this packet, one of the error correcting codes defined above is applied to all data sent in the initiating SIU-to-responding SIU direction.

Within 50 ms of the reception of the (forward) end-to-end ST protocol establishment packet from the initiating SIU, the responding earth station will logically disconnect the VCU and connect the SIU in the return direction. This is followed by the transmission of an end-to-end ST protocol establishment packet in the channel thus confirming that the return ST protocol has now been fully established on an end-to-end basis in the return direction. On completion of the last bit of this packet, one of the error correction codes defined above is applied to all data sent in the responding SIU-to-initiating SIU direction.

To ensure that the ST protocol is set-up before the initiator's 2100 Hz phase transitions and/or the responder's 1800 Hz tone are transmitted, the VCU-to-SIU transition process shall be completed in accordance with the following call set-up timers:

Disconnection of the VCU and connection of the SIU at the responding earth station in the forward (outgoing) direction: Within 250 ms from detection of the ECSD tone (at the responding earth station);

Disconnection of the VCU and connection of the SIU at the initiating earth station both in the forward and return (incoming and outgoing) directions: Within 275 ms (but no earlier than 250 ms) from detection of ECSD tone (at the initiating earth station);

Transmission of the End-to-End ST Protocol Establishment Control Packet in the forward direction, denoted by CEP(FDX/fwd): Within 25 ms from the disconnection of the VCU and connection of the SIU (at initiating earth station).

Disconnection of the VCU and connection of the SIU at the responding earth station in the return (incoming) direction: Within 50 ms of receipt of last bit of CEP (FDX/fwd) at the responding earth station;

Transmission of the End-to-End ST Protocol Establishment Control Packet in the return direction, denoted by CEP(FDX/rtn) : Within 25 ms from the disconnection of the VCU and connection of the SJU in the responding earth station's return direction.

A few items should be noted:

First, it should be noted that the secure call can be established by either land, or mobile earth stations.

Second, since the entire process is initiated by the detection of in-band signals, the secure voice transmission phase can be entered without interfering with Inmarsat's access control and signaling equipment (ACSE) protocols. In addition the transmission of channel-type conversion signaling units (as defined in Inmarsat's System Definition Manuals) is not required. Thus, secure call establishment can be made transparent to the Inmarsat system, provided that both land and mobile earth station equipment implement the SIU and CTD functional blocks.

Following the VCU-to-SIU change, and while the ECSD tone is being transmitted from the initiating terminal, the 2400 bit/s data channel shall be filled with zeros. The responding earth-station will automatically regenerate a 2100 HZ tone with phase reversals as designated in the ISVS specification until a subsequent secure protocol packet has been received indicating regeneration of another signal.

It is noted that when no signal energy is detected, the 2400 bit/s data channel (prior to coding and rate adaptation) shall be filled-in with the 00 di-bit sequence. In particular, this implies that this sequence shall be transmitted from the responder's SIU to the initiator's SIU upon completion of the CEP(FDX/rtn) until signal activity (P1800 Hz) is detected in the responder-to-initiator direction.

Full-Duplex Alternate

No additional considerations apply. Call establishment and transition to the secure protocol communication mode is identical with the full-duplex interoperable mode.

Half-Duplex Interoperable

As indicated above, upon detection of the pseudo 1800 Hz (P1800) tone the voice-to-half-duplex secure mode of communication transition must be initiated. This transition must satisfy the following requirement:

The P1800 Hz tone (as seen by the responding secure end-user terminal) must not be disrupted severely by the transition process; and The transition must be completed quickly after the establishment of the P1800 Hz tone, so that follow-on P1800 Hz signal activity can be reliably conveyed (regenerated) by the responding secure terminal.

Figure 13:
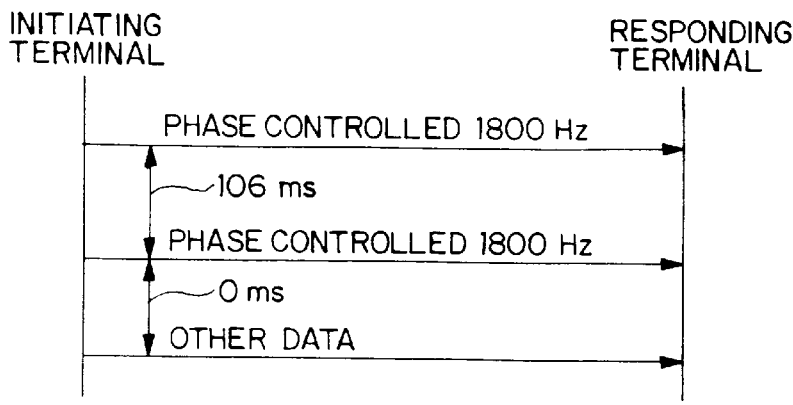
FIG. 13 is a diagram for illustrating the Secure Call Establishment (half-duplex) according to the invention.
Figure 14:
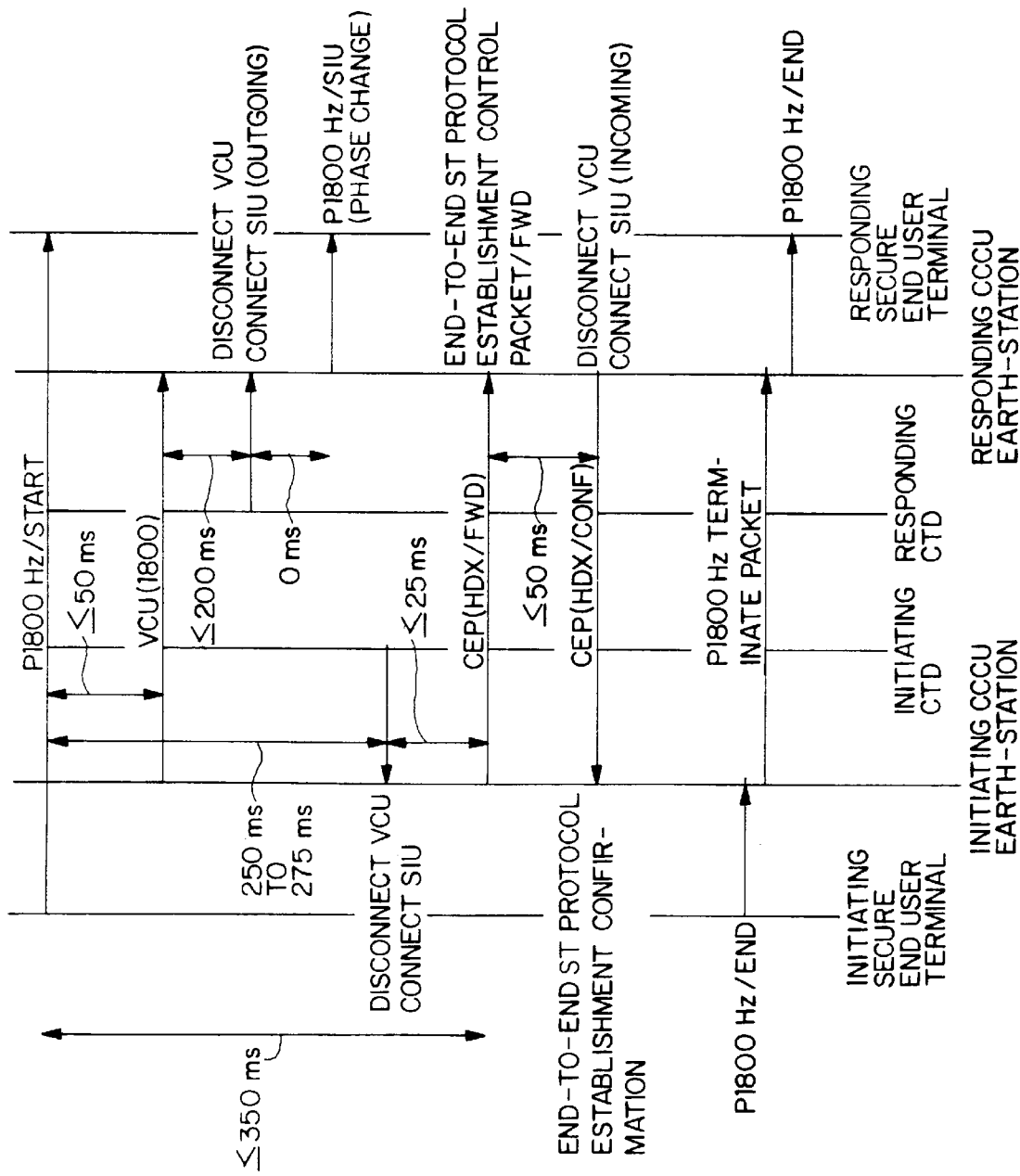
FIG. 14 is a diagram for illustrating Secure (half-duplex) Call Establish Process according to the invention.

One call set-up approach (refer to FIG. 13 for end-to-end PSTN protocol and to FIG. 14 for end-to-end protocol in the presence of Inmarsat-M or Inmarsat-B earth-station equipment) that can satisfy these requirements is the following:

Upon detection of the P1800 Hz tone, the responding earth station's call-type discriminator recognizes signal_type_N activity followed by (1800 Hz) narrowband activity which is associated with the initiation of a secure call and invokes the secure interface unit.

The secure interface unit (SIU) process is commenced by logically disconnecting the voice codec unit from the end-to-end path and by instructing the SIU to commence transmission of the P1800 Hz tone. In this manner transmission of the P1800 Hz tone to the responding end-user secure terminal continues without a gap in signal energy (although with the possible introduction of a single phase change due to the transition process).

Coincident with this transition from the VCU to the SIU, the Secure Transmission (ST) Protocol at the responding earth station takes over. At this time the 6400 or 16K bit/s channel continues to employ the voice codec in the return responder SIU-to-initiating SIU (return) direction. Once the ST protocol takes over, all further initiating earth station-to-responder earth station communication is conducted in-band, by means of packets. In particular, the transmission of the P1800 Hz tone from the responding SIU to the responding secure terminal continues until instructed otherwise from the initiating earth station end by means of an appropriate packet. Shortly after the responding call-type discriminator has forced the VCU-to-SIU transition, the initiating earth station's call-type discriminator requests the initiating VCU to be logically disconnected and the initiating SIU to be logically inserted into the channel.

The initiating SIU becomes operational and sends an in-band control packet to the responding earth station thus confirming that the ST protocol has now been fully established on an end-to-end basis in the forward direction. On completion of the last bit of this packet, one of the error correcting codes defined above shall be applied to all data (after adaptation) sent in the initiating SIU-to-responding SIU direction.

Within 50 ms of the reception of the (forward) end-to-end (half-duplex) ST protocol establishment packet from the initiating SIU, the responding earth station will logically disconnect the VCU and connect the SIU in the return direction. This shall be followed by the transmission of a message receipt confirmation in the return direction.

The VCU-to-SIU transition process shall be completed within 300 ms of the onset of the P1800 Hz tone. In particular the following call set-up timers apply:

Disconnection of the VCU and connection of the SIU at the responding earth station in the forward (outgoing) direction: Within 250 ms from detection of the first bit of the P1800 Hz tone at the responding earth station;

Disconnection of the VCU and connection of the SIU at the initiating earth station in the forward and return (incoming and outgoing) directions: Within 275 ms (but no earlier than 250 ms) from the detection of the P1800 Hz tone (at the initiating earth station);

Transmission of the End-to-End ST Protocol Establishment Control Packet, denoted by CEP(HDX/fwd): Within 25 ms from the disconnection of the VCU and connection of the SIU (at initiating earth station). Upon completion of the last bit of the CEP(HDX/fwd) packet, the 2400 bit/s data channel (prior to coding and rate adaptation) in the forward direction shall be filled with repetitive transmission of the 02 di-bit sequence.

Disconnection of the VCU and connection of the SIU at the responding earth station in the return (incoming) direction: Within 50 ms of receipt of last bit of CEP(HDX/fwd) at the responding earth station;

Transmission of a Half-Duplex Protocol Establishment Confirmation Control Packet in the return direction, denoted by CEP(HDX/conf): Immediately upon the disconnection of the VCU and connection of the SIU in the responding earth station's return direction. On completion of the last bit of this packet, the 16000 bit/s channel shall be filled with an all binary "zero" sequence in the responder-to-initiator direction.

Earth Station-to-Earth Station Control

Once the system is in the Secure Transmission (ST) protocol mode, communication between the land and mobile CCCU is accomplished by means of secure protocol control (SPC) packets.

Secure control packets are required in order to identify:
Idle state (termination of signal activity);
The start of specific phases of modem training (several controls);
The start of the secure message phase; and
Other types of activity (supervisory or otherwise).

The following characteristics of line control packets are explicitly or implicitly addressed below:
The type and number of different line control states;
The signal buffering which is needed in order to determine the type of packet to be generated;
The structure of different packets;
Packet encoding and insertion in the satellite channel;
The packet detection criteria;
Packet decoding and removal prior to transmission to the secure terminal over the telephone line; and
The modes of line control detection failure and associated call consequences.

Packet Types

Two types of packets are employed. These are used for call establishment (denoted by CEP) and Secure Protocol Control (denoted by SPC) Each packet is associated with a field, whose contents indicate the specific use of the packet. For example, for the forward full-duplex (FDX) call initiation, the abbreviated packet designation is: CEP(FDX/fwd).

The following packets are defined, as shown in the table of FIGS. 15 (A) and 15(B). To eliminate future extensions in packet length resulting from the need to support additional secure terminal features, a number of spare packets are also defined. These 31 packets are associated with numbers 32 to 63.

Packet Structure

As indicated in the table of FIGS. 15(A) and 15(B), there are two types of packets: call establishment packets (CEP types) and secure protocol control packets (SPC types)—numbers 0 to 63). These are addressed below.

FDX/HDX Call Establishment Packet Generation

Packets used to establish a secure call (CEP types in the table of FIGS. 15 (A) and 15(B) ) are comprised of a three field or part structure which is directly associated with two sub-frames in the 6.4 kbit/s baseband channel.

Figure 16A:
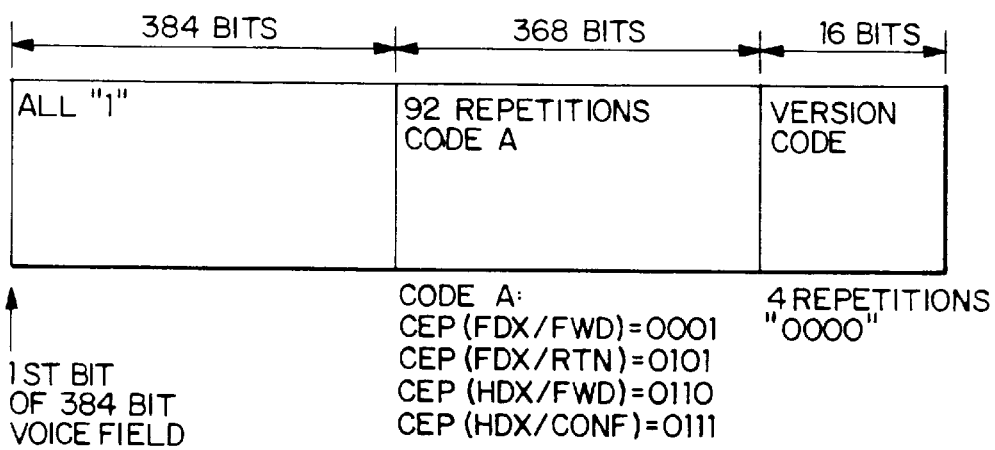
FIG. 16(A) is a diagram for explaining the structure of Secure Call Channel Establishment Packets according to an embodiment of the invention.

Referring to the embodiment of FIG. 16(A), the first field of the four possible call establishment special packets comprises 384 repetitions of a binary "one". The second field comprises 92 repetitions of one of the following 4-bit sequences (depending on the nature of the packet):
CEP(FDX/fwd)0001
CEP(FDX/rtn)0101
CEP(HDX/fwd)0110
CEP(HDX/Conf)0111.

The third field comprises 4 repetitions of a 4-bit SIU architecture version code. The version applicable to this specification is 0000. Note that the first bit of each field of the call establishment packets is always aligned with the first bit of the 384-bit voice sub-field.

Figure 16B:
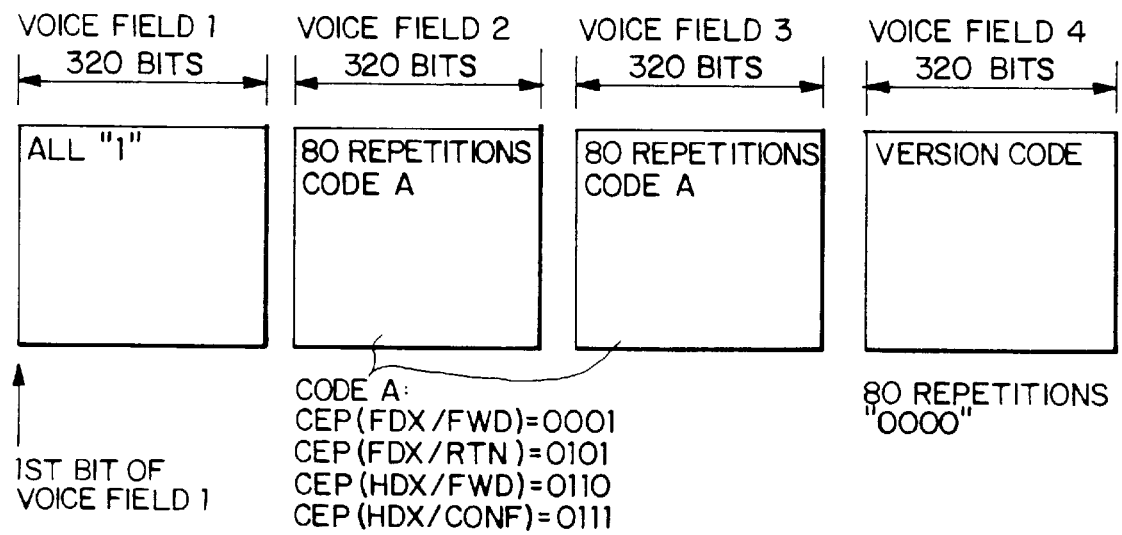
FIG. 16(b) is a diagram for explaining the structure of Secure Call Channel Establishment Packets according to another embodiment of the invention.

According to another embodiment of the invention shown in FIG. 16(b), packets used to establish a secure call (CEP types in FIGS. 15(A)–15(B) are comprised of a three part structure which is directly associated with four voice fields in the 16 kbit/s baseband channel (see FIG. 16(B).

The first part of the four possible call establishment special packets comprises 320 repetitions of a binary "one" and is always associated with the 320 bit voice field 1. The second part comprises 640 repetitions of one of the following 4-bit sequences (depending on the nature of the packet):

- CEP(FDX/fwd)   0001
- CEP(FDX/rtn)   0101
- CEP(HDX/fwd)   0110
- CEP(HDX/Conf)  0111.

This part is always associated with voice fields 2 and 3, which together comprise the 640 bits required by the second part of the CEP structure. The third part comprises 80 repetitions of a 4-bit SIU architecture version code. The version applicable to this specification is 0000

Note that the first bit of each call establishment packet is always aligned with the first bit voice field 1

SPC Packet Generation

Secure protocol control packets (SPC numbers 0 to 63, including spares) are encoded differently from the call establishment packets. These packets comprise a four field structure which includes a leading flag field, an information field, a frame check sequence field, and an ending octet (flush) field. Each of these fields is encoded as follows:

Leading Flag: Binary 01111110
Information Field: 8-Bit Binary Representation of the Packet Number Listed in column 1 of FIG. 15(B).
Frame Check Sequence: A 16-bit cyclic redundancy check sequence defined below.
Ending Octet (Flush): Binary 00000000

Figure 17A:
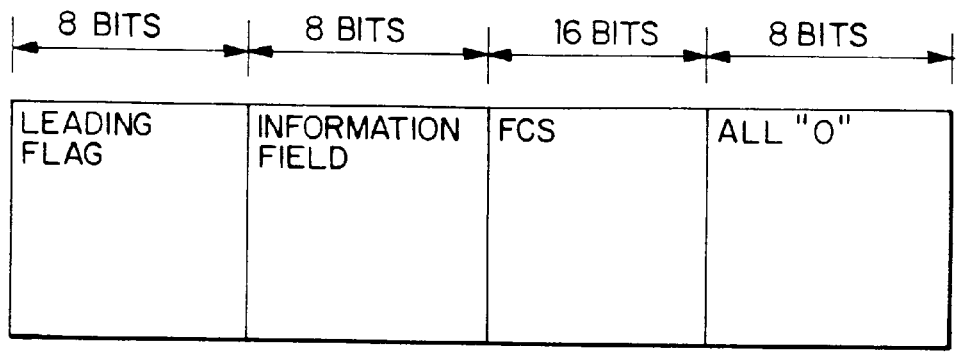
FIG. 17(A) is a diagram for explaining the structure of secure Protocol Control Packets according to an embodiment of the invention.
Figure 17B:
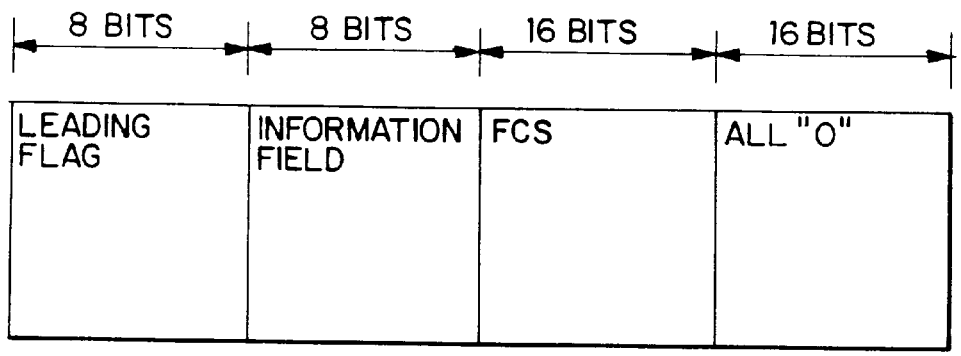
FIG. 17(B) is a diagram for explaining the structure of secure Protocol Control Packets according to another embodiment of the invention.

A first embodiment of the packet structure is illustrated in FIG. 17(A) and a second embodiment of the packet structure is illustrated in FIG. 17(B). Note that the packets are generated at a rate of 2400 bit/s and then encoded at a channel rate of 6400 bit/s (FIG. 17(A)) or 16000 bit/s (FIG. 17(B)). Consequently, packets are always treated in the same way as 2400 bit/s secure traffic, that is, they are inserted in the first 48 bits of a voice field (FIG. 17(B) embodiment) In this scheme, the packet's duration, which impacts the additional delay introduced in the end-to-end communication path due to this protocol, is equal to 16.6 ms (approximately) (FIG. 17(A)) or 20 ms (FIG. 17(B)).

Control Packet Information Field

Figure 17C:
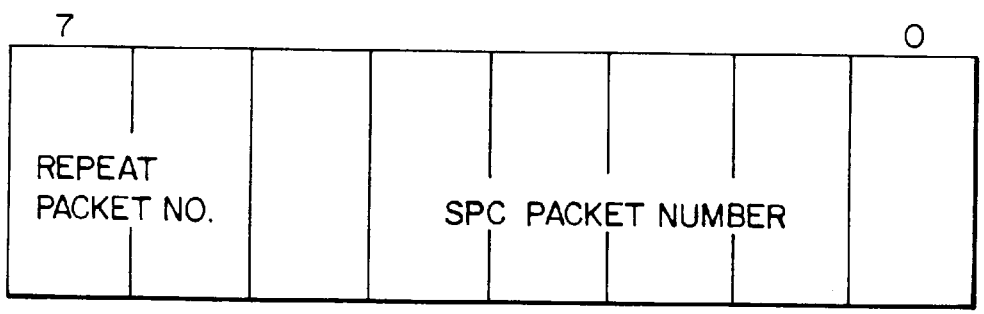
FIG. 17(C) is a diagram for explaining the structure of secure Protocol Control Information field according to an embodiment of the invention.
Figure 23A:
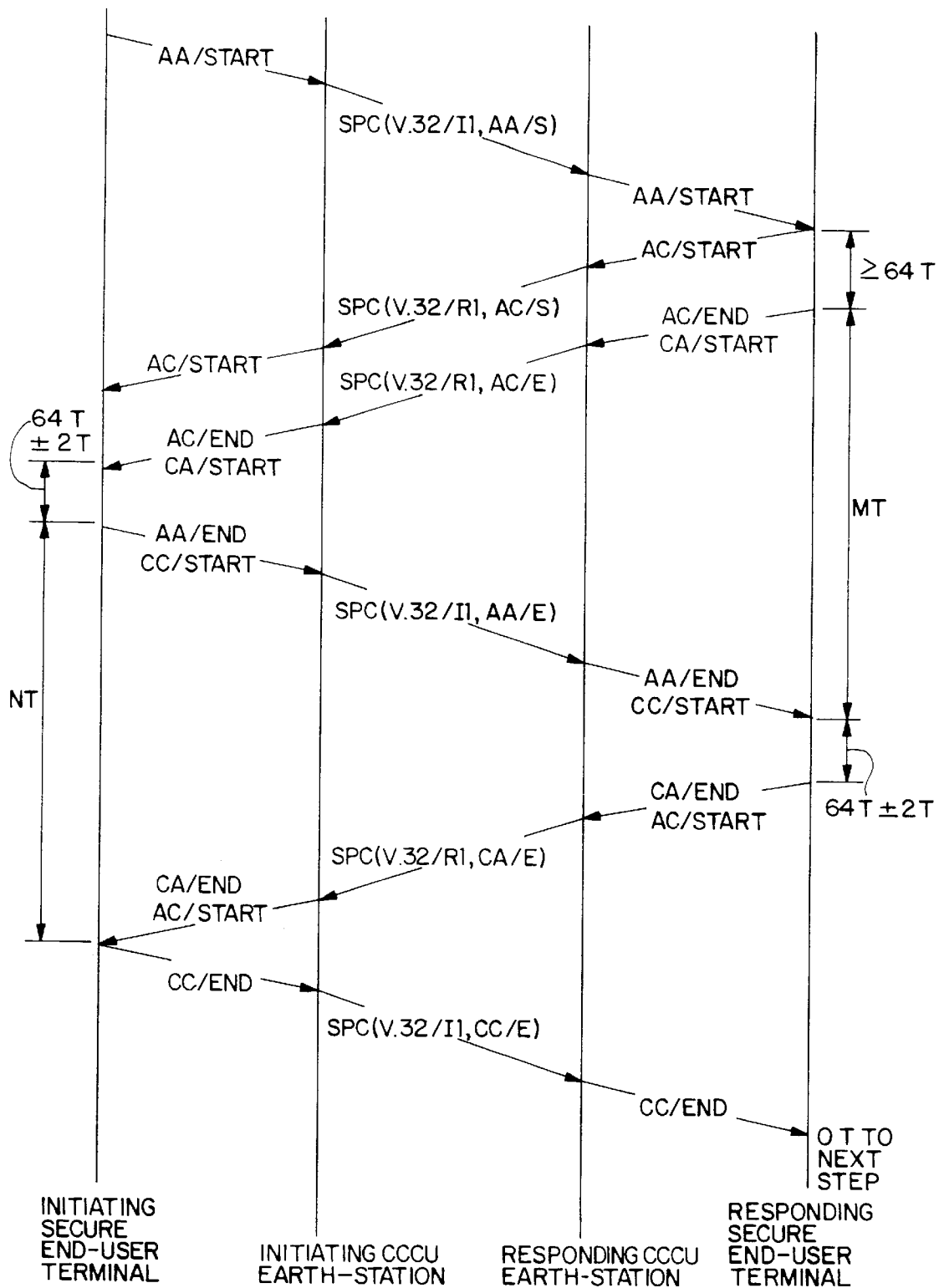
FIGS. 23(a)–23(d) are diagrams for explaining the Generation of a Training Sequence according to the invention.
Figure 23B:
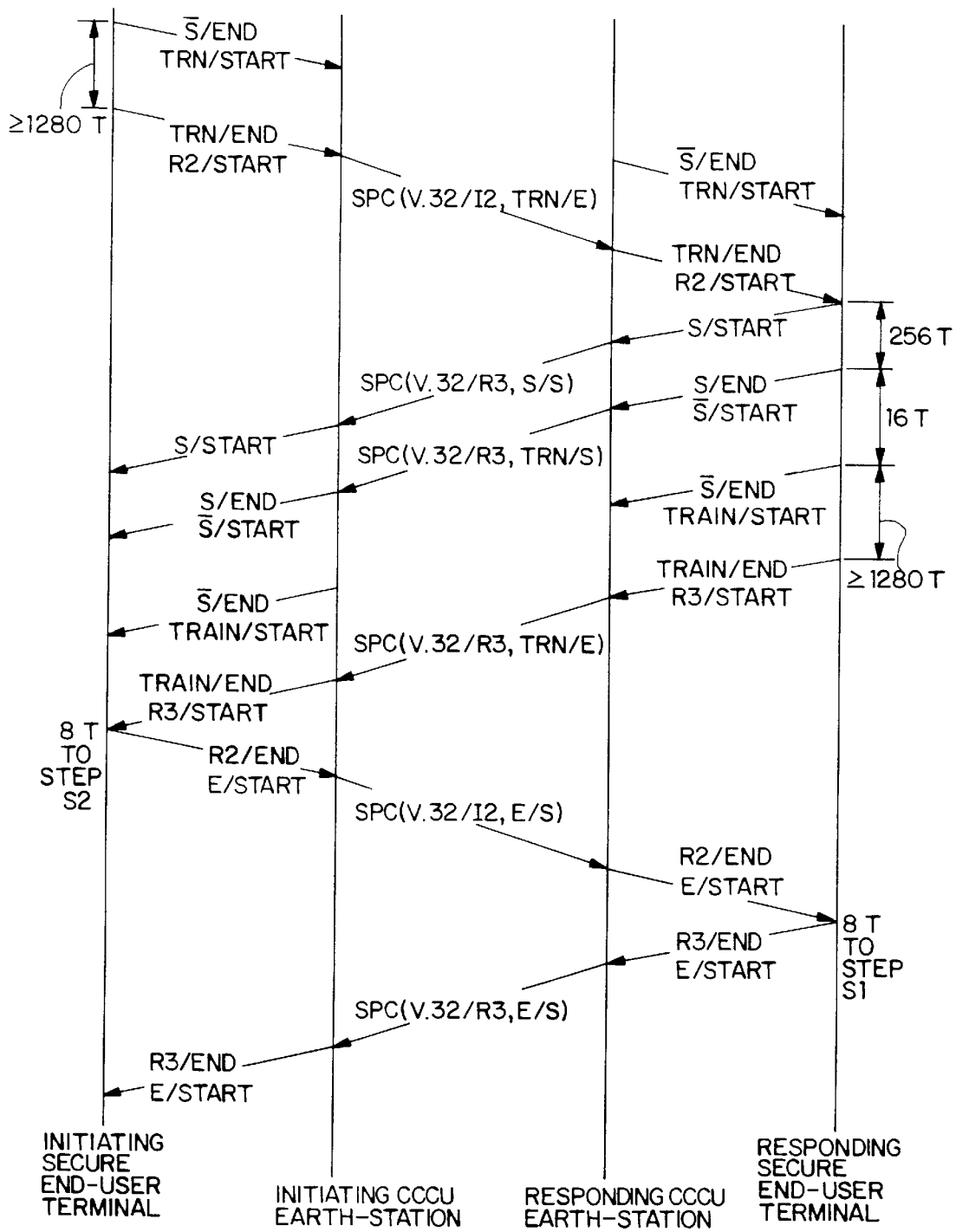
Figure 23C:
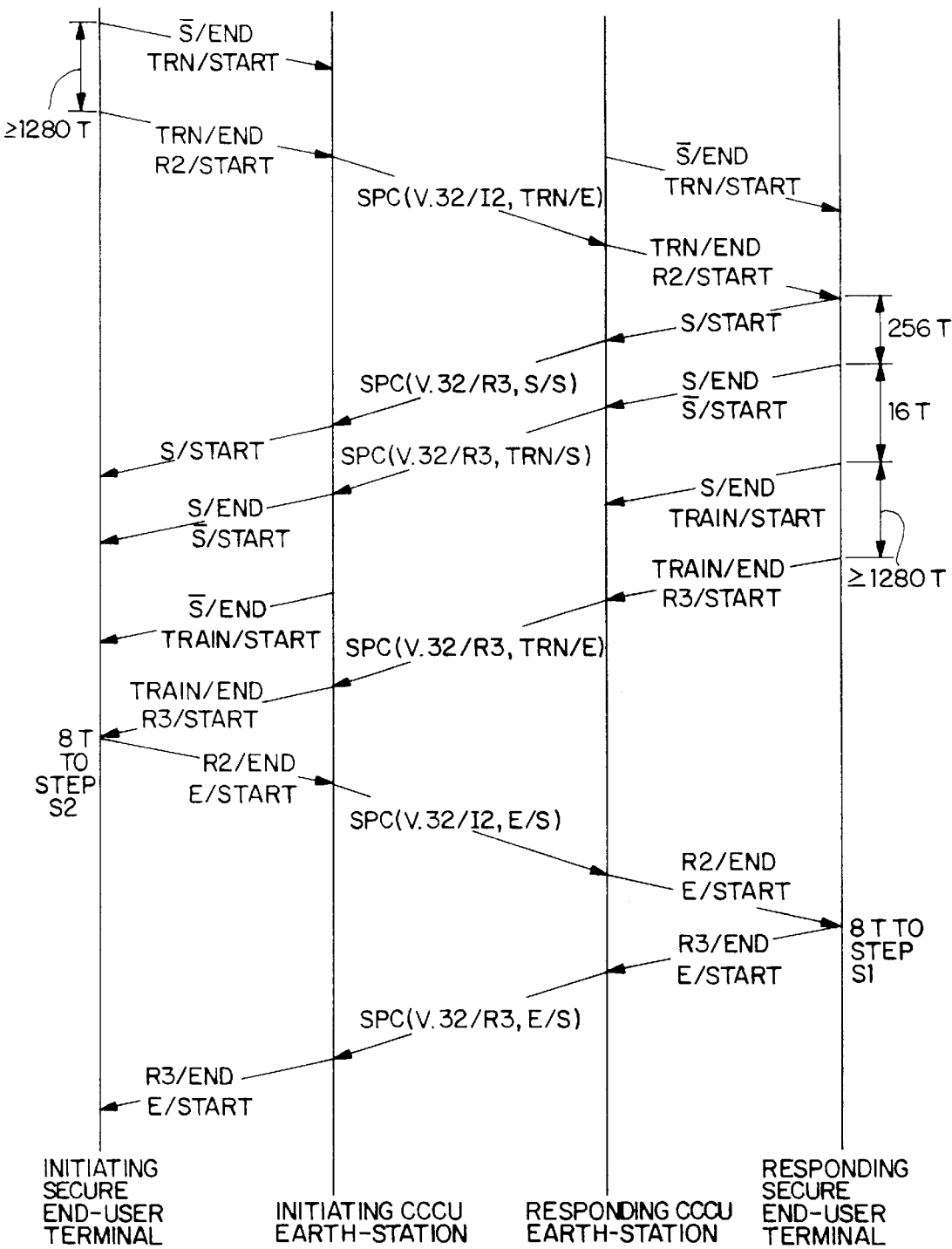
Figure 23D:
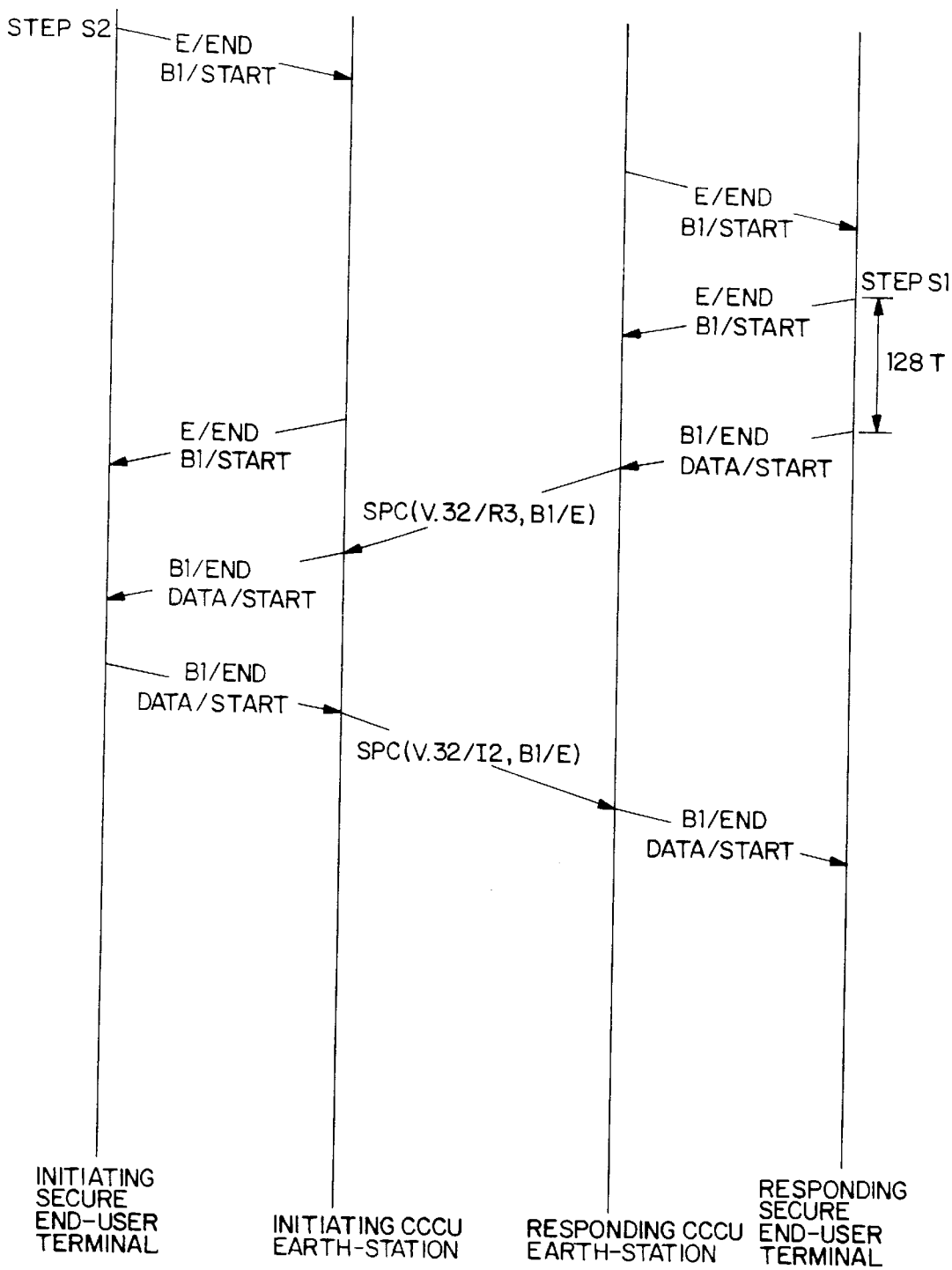

Although it has not been explicitly shown in the secure transmission protocol processing diagrams, all SPC packets are transmitted in triplicate for reliability. After re-transmitting the third packet, the channel will be immediately followed by either data or zeros depending upon the SPC packet type. The Repeat Packet Number which appears in the SPC Information Field indicates the sequence of the repeated packet. The SPC repeat packet "count down" begins at number 3 and is terminated by repeat packet number 1. The bit structure is illustrated in FIG. 17(C).

Control Packet Frame Check Sequence

The FCS sequence is the same as the sequence used in Group 3 facsimile communication (CCITT Recommendation, SS 5.3.7). The FCS shall be a 16 bit sequence. It shall be the 1s complement of the sum (modulo 2) of:

the remainder of $x^8(x^{15}+x^{14}+x^{13}+ \ldots +x^2+x+1)$ divided (modulo 2) by the generator polynomial $X^{16}+X^{12}+x^5+1$, and the remainder after multiplication by $x^{16}$ and then division (modulo 2) by the generator polynomial $x^{16}+x^{12}+X^5+1$ of the content of the frame.

As a typical implementation, at the transmitter, the initial remainder of the division is preset to all binary "1" and is then modified by division by the generator polynomial (as described above) on the information field; the is complement of the resulting remainder is transmitted as the 16-bit FCS sequence. At the receiver, the initial remainder is preset to all 1s and the serial incoming protected bits and the FCS,1 when divided by the generator polynomial, will result in a remainder of 0001110100001111 ($X^{15}$ through $X^0$, respectively) in the absence of transmission errors.

The FCS shall be transmitted to the line commencing with the coefficient of the highest term.

Packet Encoding and Insertion in the Satellite Channel

As indicated above, the CEP call establishment packets (special numbers s1 to s4) are inserted into the satellite channel coincidentally with the first bit of the 384 bit voice field or the voice field 1. This constraint does not apply to the SPC packets (numbers 0 to 63) which can be inserted into coincidentally with the first bit of any voice field.

The 768- or 1280-bit call establishment packets are generated at a 6.4 or 16 kbit/s rate and are not error protected. The secure protocol control packets are generated at a rate of 2400 bit/s and then encoded in accordance to the rate ⅜ augmented convolutional code defined above or encoded in accordance with the ⅕ code defined above.

Signal Buffering

The use of packets involves the introduction of delay in the end-to-end communication system. During the generation of the call establishment packets the incoming signal (over the telephone line) shall not be buffered. This does not apply to the generation of the 40- or 48-bit secure protocol control packets which are ultimately associated with the onset of end-user data transmission.

Packet Detection Criteria

Two sets of rules apply depending on the type of packet being addressed.

Call Establishment Packet Detection

For call establishment packets, these shall be considered to have been received successfully when the following criteria are met:

At least 368 of the 384 bits or 288 of the 320 bits found in the first field are all binary "ones"; and At least 88 of the 92 replicates of the 4-bit codes are identical or at least 576 of the 160 replicates of the 4-bit codes associated with parts 2 and 3 of these packets are identical; and At least 2 out of the 4 version codes are identical or at least 72 out of the 80 replicated version codes associated with part 4 of these packets are identical.

If these criteria are not met, the POT voice mode of operation shall be maintained. To avoid inadvertent misclassification of encoded voice frames as secure call establishment packets, the search for these packets shall only be undertaken when the CTD 35 (FIG. 3) has indicated that signal_type_N activity has been detected (i.e. only after a 2100 Hz or 1800 Hz tone has been detected).

SPC Packet Detection

As described above, secure protocol packets are used to convey information regarding the initiation of signal activity. For the secure protocol control packets, these shall be considered to have been received successfully when the FCS frame associated with the information field is correct. Since secure protocol packets are transmitted in triplicate, the receiving unit must successfully receive at least one of the three repeated secure protocol packets before interpreting the data within the information field. If the FCS frame is found to be in error in all three of the repeated packets, the receiving unit shall revert to the clear (POT) mode of voice communication.

Version Numbering

If during call establishment an SIU receives from another SIU a valid version code other than "0000" (that is, the 16-bit or 320-bit version field or part received contains at least 2, out of 4, or at least 72, out of 80, version codes other than "0000"), the unit shall ignore such other codes. It is the responsibility of the unit transmitting the code other than "0000" to revert to version "0000".

Secure Terminal Protocols

As indicated above, once the end-to-end ST protocol has been established communication between earth stations is accomplished by means of secure protocol control (SPC) packets and/or baseband in-band transmitted information, as appropriate.

Where appropriate, three variations of protocols are distinguished: full-duplex interoperable, full-duplex alternate, and half-duplex interoperable. However, the basic protocol is described in terms of full-duplex alternate negotiation, since the other two cases can generally be handled as sub-sets of this case.

Pseudo 1800 Hz

Shortly after transmission of the ECSD tone from the initiator, the P1800 Hz tone (modulated by a di-bit pattern) is transmitted from the responder. When the P1800 Hz tone is used to indicate only basic service capabilities (interoperable mode), it carries no phase reversals, in which case it can be considered to be modulated by di-bit pattern 02. When the P1800 Hz tone is used to indicate the availability of enhanced service capabilities by the responder secure terminal (alternate mode), three 180_phase reversals may be present near the beginning of this tone (modulation using di-bits 01). The P1800 Hz tone is processed by the SIU as follows:

Upon detection of P1800 Hz activity, the responder SIU will transmit to the initiator SIU a secure protocol control packet SPC(P1800/s) which will indicate to the initiator SIU that the 1800 Hz carrier must be turned on in the earth station-to-terminal direction.

Immediately after transmission of the SPC(P1800/s) packet, repeated transmission of the 02 di-bit pattern (which is encoded according to one of the codes defined above) is initiated.

When a phase change has been detected by the responder SIU, the di-bit defined above shall b& replaced by the 01 di-bit binary pattern which is encoded with one of the codes defined above prior to transmission over the 6400 or 16000 bit/s baseband channel.

These processes are shown in FIGS. 18(A) and 18(B).

Any other phase transitions (such as the 3202 di-bit pattern that characterizes the end of the P1800 Hz transmission) shall be similarly coded using one of the codes as defined above.

Note that an SPC packet indicating the termination of the P1800 Hz is not necessary in this case, as the P1800 Hz signal will be followed by a different type of signal with no interruption in signal energy.

It should be further noted that, during alternate mode transmissions signals transmitted in a direction opposite to that of the P1800 Hz may be present. For simplicity and clarity of presentation, these are not shown in FIGS. 18(A) –18(B).

Message A

Shortly after termination of the initiator's ECSD tone (within 85+/−10 ms), the initiator may transmit an enhanced capabilities 300 bit/s signal, denoted by MSG A, which is modulated in accordance to Bell Modem 103 (modified). This signal will contain a profile of initiator terminal capabilities including:

Capability for extended echo ranging process;
Capability to operate at 4800 bit/s; and
Capability to operate at 9600 bit/s.

The initiator SIU shall intercept and set to binary zero (if not already set) the bits indicated in FIGS. 19(a), 19(b) and 19(c) so as to disable certain non-supportable capabilities, such as extended echo ranging.

The ST protocol shall process the MSG A signal as follows:

Upon detection of MSG A signal activity, the initiating SIU shall transmit to the responding SIU a secure protocol control packet SPC(Bell 103/s) which will indicate to the responding SIU that the Bell 103 carrier must be turned on in the earth station-to-terminal direction.

Immediately after transmission of the SPC(Bell 103/s) packet, the initiating SIU shall transmit the associated baseband information at a rate of 2400 bit/s (prior to coding). The rate adaptation from 300 bit/s to 2400 bit/s is as follows. Every 300 bit/s binary bit transmitted from the secure terminal to the SIU shall be converted into the following set of 8-bits which are then encoded using one of the codes defined above for transmission over the 6.4 or 16 kbit/s satellite channel:

Binary Bit 0 converted to Set of 8-Bits: ["11101110"]
Binary Bit 1 converted to Set of 8-Bits: ["01010101"]

The baseband information shall be unmodified, with the possible exception of those bits indicated in the tables of FIGS. 19(a), 19(b) and 19(c).

When termination of MSG A occurs, the initiating SIU shall transmit to the responding SIU a secure protocol control packet SPC(Bell 103/e) which will indicate to the responding SIU that the Bell 103 carrier must be turned off in the earth station-to-terminal direction. The potential elimination of this type of packet is for further study.

These processes are shown in FIG. 20. Note that signals transmitted in a direction opposite to that of MSG A may be present, but for clarity and simplicity these are not shown in FIG. 20.

Message B

Immediately after termination of the responder's P1800 Hz signal, the responder may transmit an enhanced negotiated capabilities 300 bit/s signal, MSG B which is modulated in accordance to Bell Modem 103 (modified). This signal will contain the initiator's capabilities which were chosen by the responding secure terminal for the remainder of the call.

Unlike MSG A neither the responding nor the initiating SIU may modify the contents of this signal. The ST protocol shall process the MSG B signal as follows:

Upon detection of MSG B signal activity, the responding SIU shall transmit to the initiating SIU a secure protocol control packet SPC(Bell 103/s) which will indicate to the initiating SIU that its carrier in the earth station-to-terminal direction must be switched from 1800 Hz to the Bell 103 carrier.

Immediately after transmission of the SPC(Bell 103/s) packet, the responding SIU shall transmit the associated baseband information at a rate of 2400 bit/s (prior to coding). The rate adaptation from 300 bit/s to the 2400 bit/s is identical to that used for MSG A coding.

When termination of MSG B occurs, the responding SIU may transmit to the initiating SIU a secure protocol control packet SPC(Bell 103/e) which will indicate to the initiating SIU that the Bell 103 carrier must be turned off in the earth station-to-terminal direction. The potential elimination of this type of packet is for further study.

These processes are shown in FIG. 21. Note that if the alternate mode is not selected, it may not be necessary to explicitly indicate that the MSG B signal has terminated, since this will be immediately followed without any interruption in signal energy by the P1800 Hz tone the start of which will be signaled by means of the SPC(1800/s) packet.

However, because the alternate mode may be selected, an indication pertaining to the end of the Bell 103 transmission is required. (This is signaled by the transmission of the SPC (Bell 103/e) packet). it is also noted that the responder may implicitly derive the termination of the Bell 103 transmission through processing of the MSG B contents.

Following the termination of the MSG B signal, one of the following options may be invoked:

The call is set up in an alternate mode; or
The call is set up in the interoperable mode.

Alternate Mode

When a call is set-up in the alternate mode as a result of MSG A and MSG B negotiation, the modem training sequence defined in CCITT Recommendation V.32, "A Family of 2-Wire, Duplex Modems Operating at Data Signaling Rates of Up to 9600 bits/s for Use in the General Switched Telephone Network and on Leased Telephone-Type Lines", *Blue Book*, Facsimile VIII. 1. pp. 234–251, Melbourne, November 1988, SS 5.4.1 and SS 5.4.2 will be employed by the end-user secure terminals. 11 parts (segments) of the training sequence shall be regenerated by the SIU function in the satellite-to-secure terminal direction. Their regeneration, however, is controlled by the exchange of control packets so that the correct end-to-end timing relationship can be maintained (at the end-user secure terminals) in a transparent manner. For the purpose of simplifying references to the V.32 sequence in this document, the sequence is partitioned into five segments: three for the responder, designated as R1, R2 and R3 (not to be confused with the V.32 rate sequences which are denoted by R1 and R2) ; and two for the initiator, designated as I1 and I2. This notation is indicated in FIG. 22.

This notation is subsequently used to associate control packets with the type of training segment to which they relate.

With this definition in mind, a number of packets are exchanged between the two SIUs to specifically trigger initiation of different parts of each of the five training sequence segments. The exchange of packets and associated protocol is indicated in FIGS. 23(a)–23(d). Several items need to be noted from this set of figures:

First, the end-to-end delay, as well as the delay between each earth station and its near-side secure interface unit can be derived from this training procedure and particularly from the exchanges related to training segments I1 and R1.

Second, when the alternate mode is invoked a set of capabilities must be precluded from being invoked. To accomplish this, the initiating SIU must generate a predetermined rate sequence irrespective of the sequence generated from the responding secure terminal. This rate sequence is defined in the Table of FIG. 24.

Although not explicitly noted, the ending sequence E, shall also be encoded using the same profile of capabilities as those indicated in the Table of FIG. 24.

The optional extended echo control training sequence (which may be appended in front of training segment R2) is not supported.

The completion of the modem training sequence is defined when the last bit of the SPC(V.32/I2, Bl/e) and SPC(V.32/R3, Bl/e) packets has been transmitted for the initiating-to-responding (forward) and responding-to-initiating (return) directions, respectively.

Immediately upon completion of the modem training sequences" the Start of Message (SOM) which characterizes the onset of phase ST-D (defined in FIG. 2) shall be entered into. Coincidentally with the first bit of the SOM error code defined above shall be applied. This type of coding shall be applied for the remainder of the transmission while the call is in phases ST-D, ST-E, ST-F, and ST-G.

Interoperable Mode

As indicated above, it is possible that the interoperable mode is selected as a result of the MSG A and MSG B negotiation (FIGS. 2–5 of the PSVS-210 reference). In this case, the remainder of the call set-up (modem training) will proceed differently from that addressed in the alternate mode discussed above.

Responder's Scrambled ones (SCR 1)

Upon termination of the 1800 Hz (phase reversed) tone, the initiator's voiceband data modem is trained. This is accomplished by the initiator's transmission of a 4096-bit scrambling sequence (SCR1). The SCR 1 sequence always follows the 1800 Hz tone with 0 ms delay (i.e. no gap in signal energy). The last di-bit sequence of the P1800 Hz tone is not 0202, but rather 3202.

In the Inmarsat-M and Inmarsat-B secure transmission protocol the SCR 1 sequence is not sent across the satellite channel. Instead this will be regenerated by the initiating SIU on the basis of the SCR 1 packet, SPC(SCR1). The protocol to be used in this phase is as follows:

Upon detection of the 1800 Hz modulated 3202 di-bit pattern, the responding SIU is prepared to accept the SCR 1 sequence and start training its own modem. The di-bit 3202 sequence is transmitted across the channel followed by a SPC(SCR1) packet. The possible elimination of the SCR1 packet is for further study.

Upon completion of the SCR 1 sequence from the responding secure terminal, the responding SIU will send a secure protocol control SPC(Idle) packet to the initiating SIUII indicating the termination of voiceband data carrier on the telephone line. Implicit determination of signal termination is also possible on the basis of the number of SCR1 bits received (or regenerated).

The possible elimination of the SPC(Idle) packet is for further study.

Figure 25:
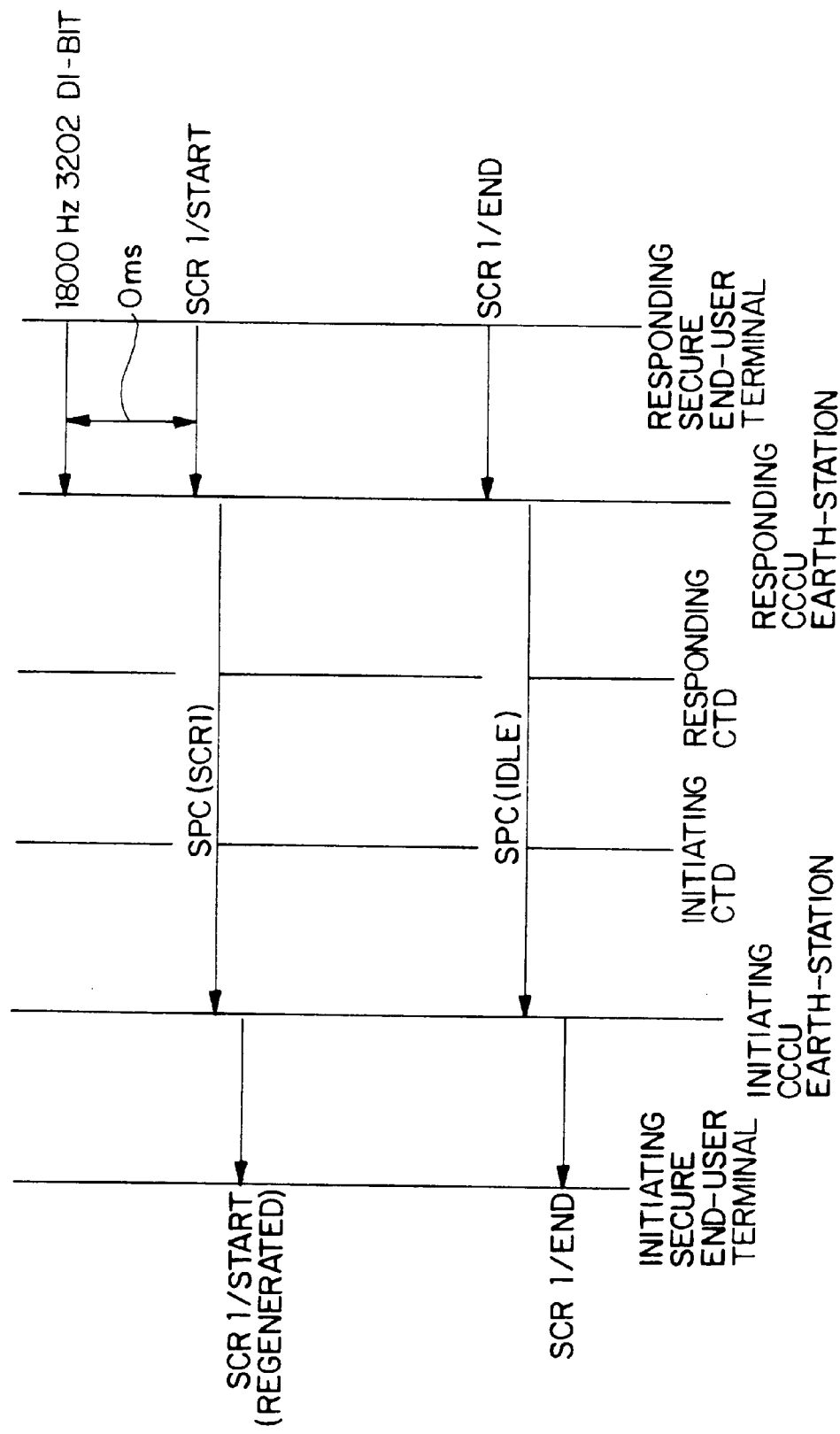
FIG. 25 is a diagram for explaining Secure Transmission Protocol Processing of a Responder's Signal according to the invention.

These processes are shown in FIG. 25.

Initiator's Scrambled Ones (SCR 1)

Upon completion of the responder's SCR 1 sequence, the initiating terminal will send a SCR 1 sequence to the responder's voiceband data modem so that its receiver can be appropriately trained. The initiator's SCR 1 sequence will always be preceded (with no interruption in signal energy) by a 2100 Hz ESD or ECSD tone (which may thus include 180_phase reversals). The treatment of the initiator's SCR 1 sequence is similar to that of the responder's SCR 1 sequence and is defined above with respect to the Responder's Scrambled Ones (SCR1).

The initiation of the 2100 Hz ECSD is conveyed by means of packet SPC(2100). Unlike the P1800 sequence, no di-bits are associated with the SPC(2100) packet to indicate phase shifts in the regenerated signal. The exact ST protocol is as follows:

After completion of the responder's SCR 1 the initiating SIU shall monitor the incoming telephone line in order to detect the onset of the 2100 Hz ECSD tone. When detected, the initiating SIU shall transmit to the responder's SIU a secure protocol control SPC(2100) packet which shall signal the responding SIU to turn the 2100 Hz tone on in the earth station-to-secure terminal direction.

Immediately upon completion of the SPC(2100) packet, the channel is filled with zeros. The earth-station that receives the PSC92100) packet will automatically regenerate a 2100 Hz tone with phase reversals as designated in the FSVS specification until a subsequent secure protocol packet has been received indicating regeneration of another signal. As with SCR1 sequence, the 2100 Hz tone with phase reversal is not explicitly sent across the satellite channel.

Instead, the signal is regenerated by the SIU receiving a SPC(2100) packet. In addition, it is assumed in the Inmarsat-M secure transmission protocol that a 2100 Hz tone with phase reversals has been detected.

Upon detection of the initiator's SCR 1 sequence, the initiating SIU shall prepare to accept the SCR 1 sequence and start training its own modem. The SPC(SCR1) packet shall then be transmitted across the channel to the responding SIU.

Upon completion of the SCR 1 sequence from the initiating secure terminal, the initiating SIU shall transmit a secure protocol control SPC(Data) packet to the initiating siu, indicating the end of the SCR 1 sequence and the start of secure traffic transmission. This determination is also possible on the basis of the number of SCRI bits received (or regenerated). The possible elimination of the SPC(Data) packet is for further study. Upon completion of the SPC (Data) packet, a 2.4 kbit/s digital data pipe (prior to coding) shall be established in a transparent manner for the initiator's terminal.

Figure 26:
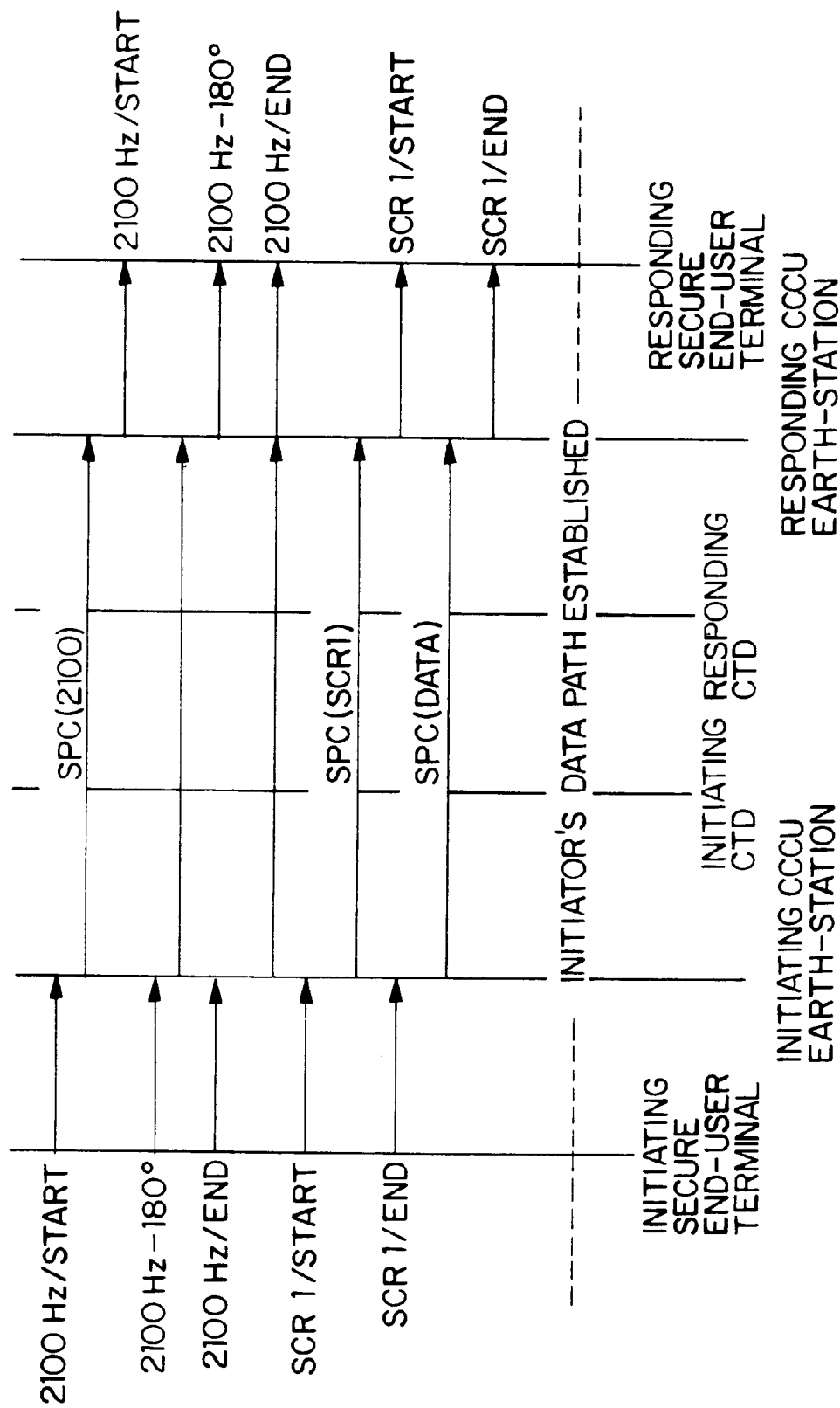
FIG. 26 is a diagram for explaining the Secure Transmission Protocol Processing of an Initiator's Signal according to the invention.

These processes are shown in FIG. 26.

Responder's Second Set of Scrambled Ones

Upon completion of the initiator's SCR 1 sequence, the responder terminal will send a shorter (704 bit) SCR 1 sequence to the initiator's voiceband data modem followed immediately by secure data. Unlike the responder's first SCR 1 sequence, this sequence will not be preceded by a 2100 Hz ESD or ECSD tone. The treatment of the second SCR I sequence is similar to that of that of the responder's first SCR 1 sequence. The exact ST protocol is as follows:

After completion of the initiator's SCR 1 the responding SIU shall monitor the incoming telephone line in order to detect the onset of the responder's shorter SCR 1 sequence. When detected, the responding SIU shall transmit to the initiating SIU a secure protocol control SPC(SCR1) packet which shall signal the initiating SIU to commence transmission of the shorter SCR 1 sequence (appropriately modulated) in the earth station-to-secure terminal direction.

Upon completion of the SCR I sequence from the responding secure terminal, the responding SIU shall transmit a secure protocol control SPC(Data) packet to the initiating siu, indicating the end of the SCR 1 sequence and the start of secure data transmission. This determination is also possible on the basis of the number of SCRI bits received (or regenerated). The possible elimination of the SPC(Data) packet is for further study. Upon completion of the SPC(Data) packet, a 2.4 kbit/s digital data pipe (prior to coding) shall be established in a transparent manner for the responder's terminal.

Other Modes

It is possible that a call can be established in other communication modes. For example, an interoperable mode (FIGS. 2–3 of the reference FSVS-210) can be established without use of the MSG A and MSG B signals. This case is merely a sub-set of the procedure defined previously as the control packets needed to fully describe the modem training process have been defined above.

Figure 27:
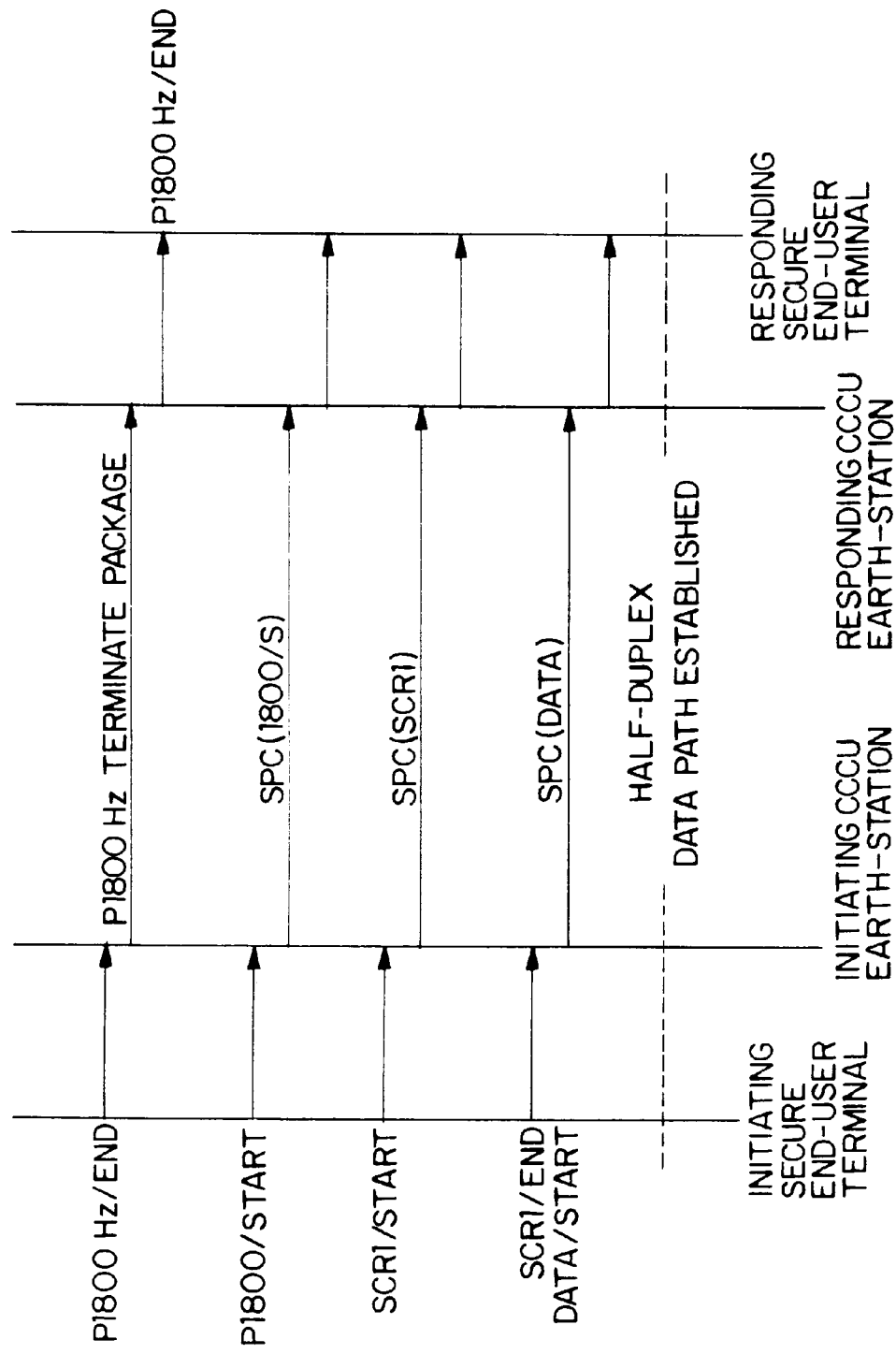
FIG. 27 is a diagram for explaining Modem Training according to a half-duplex mode of the invention.

This observation also applies to the case of half-duplex transmission, as illustrated in FIG. 27.

Call Failures & Clearing

Once a call has entered the secure transmission protocol phase ST-D the secure terminal data are no longer interpreted with the exception of certain non-data bearing messages. These messages, which are not encrypted, are the following:

Abort;
Release;
Failed Call;
Restart Failed Call;
Idle;
Retrain Request;
Retrain NACK; and
Retrain ACK.

These messages will be detected by the SIU function by confirming that they are preceded by the 256-bit "Escapell and 64-bit "Start of Message" non-encrypted segments.

Abort

When this signal is received (which can be assumed to be transmitted from the leader's to the follower's secure terminal) the earth station shall initiate the transition from secure to POT voice transmission (SIU-to-VCU). This transition shall be initiated following the last bit of the Message Identifier (MID) in the following manner:

For the leader's SIU in the leader-to-follower direction:
Within 25 Ms following the transmission of the last bit of the associated MID field;

For the follower's SIU in the leader-to-follower direction:
Within 135 ms following the reception of the last bit of the associated MID field;

For the follower's SIU in the follower-to-leader direction:
Within 165 ms following the reception of the last bit of the associated MID field; and For the leader's SIU in the follower-to-leader direction:
Within 800 ms (but no earlier than 700 Ms) following the transmission of the last bit of the associated MID field.

Figure 28:
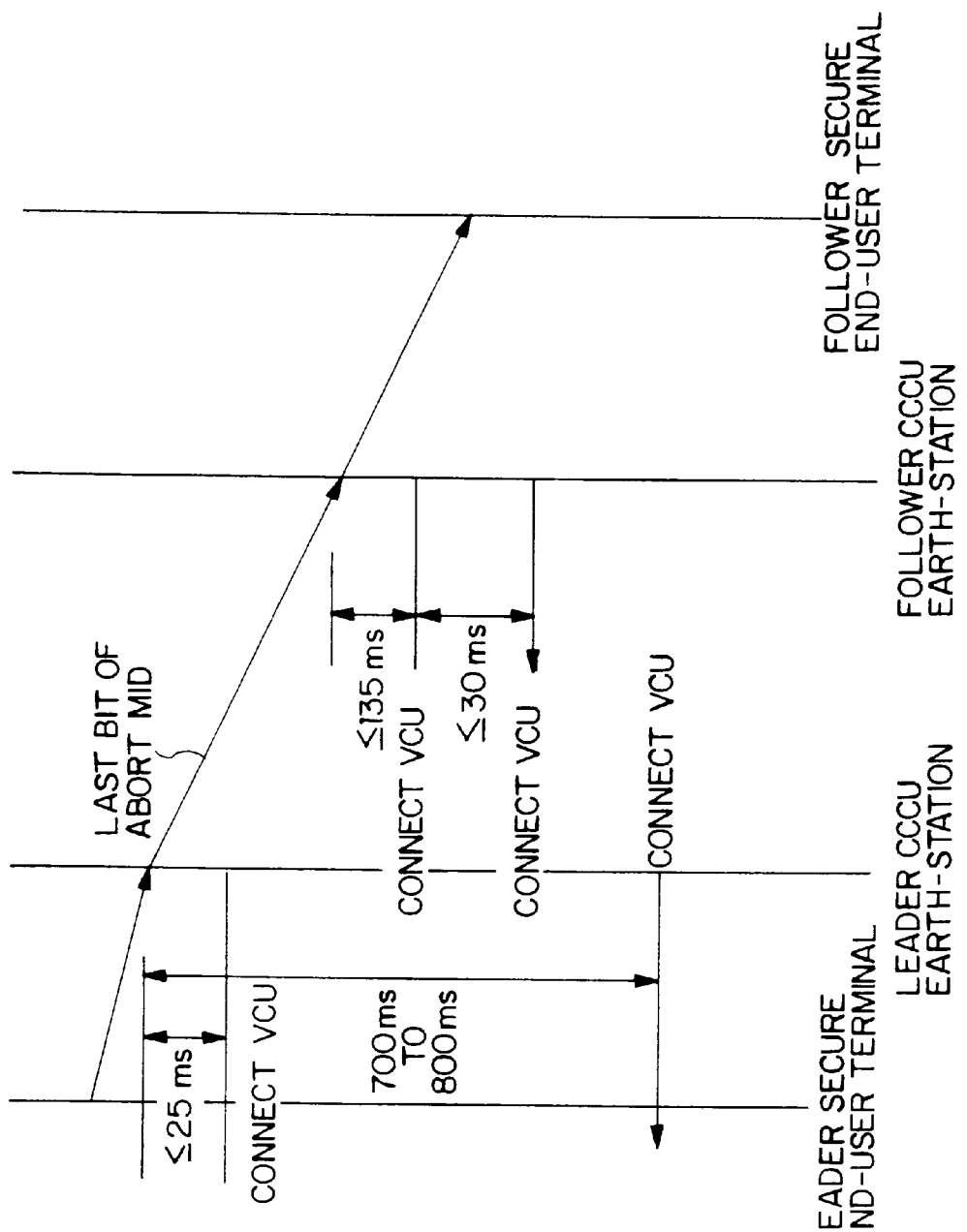
FIG. 28 is a diagram for explaining Transition Times for Abort Secure Call Conditions according to the invention.

The application of these rules is illustrated in FIG. 28.

Failed Call

When this signal is received (which can be assumed to be transmitted from the leader's to the follower's secure terminal) the earth station shall initiate the transition from secure to POT voice transmission (SIU-to-VCU). This transition shall be initiated following the last bit of the Message Identifier (MID) associated with a failed call and shall be accomplished in the exact same manner which is described above for the Abort condition.

Release

When this signal is received (which can be assumed to be transmitted from the leader's to the follower's secure terminal) the earth station shall initiate the call clear-down procedures. This will be accomplished by first initiating the POT voice codec unit (SIU-to-VCU transition or release/1) and then by clearing the channel as a normal voice call (release/2).

The transition from the SIU to the VCU shall be initiated following the last bit of the Message Identifier (MID) associated with a release request and shall be accomplished in the exact same manner which is described above for the Abort condition. The channel release procedures shall be fully compliant with Inmarsat's voice call clearing procedures.

EOM

When this signal is received (which is associated with half-duplex calls and can be assumed to be transmitted from the initiator's secure terminal to the responder's secure terminal) the earth station shall initiate the transition from secure to POT voice transmission (SIU-to-VCU). This transition shall be initiated following the last bit of the Message Identifier (MID) associated with an end of message status and shall be accomplished in the exact same manner which is described above for the Abort condition. In this case it is noted that the voice channel is being established in both directions of transmission (full-duplex).

Figure 29:
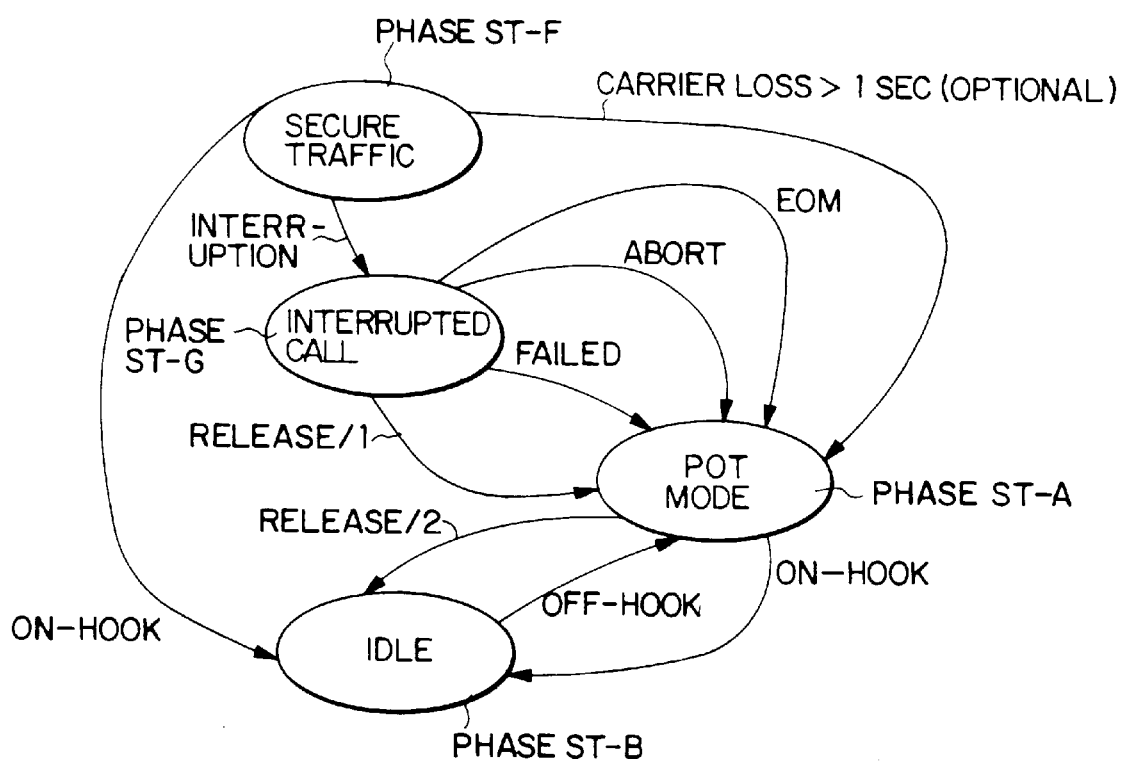
FIG. 29 is a state diagram for explaining Call Interruption Conditions according to the invention.

The support of the above non-data bearing messages is illustrated in the state diagram shown in FIG. 29.

Idle

This message is related to half-duplex transmission when communicating with the Key Management Center (KMC).

Retraining Messages

A series of messages such as Retrain Request, Retrain NACK, and Retrain ACK are related to retraining of modems.

Carrier Loss

If modem carrier is lost in either direction of transmission during phases ST-D, ST-E, ST-F, and ST-G (FIG. 2), the secure to POT voice transmission procedures applicable to EOM shall be followed. This requirement does not apply if carrier is lost (or absent) for less than 1 second, or if the carrier is absent in the return direction of a call established in the half-duplex mode of communication.

The procedures defined in the previous paragraphs may optionally be by-passed by monitoring the presence or absence of modem carrier in order to revert to the POT mode of operation. in particular, transition from the secure (Phase ST-F) to the POT mode of operation may be made, if loss of carrier is detected in either direction (full-duplex case) or in the forward direction (half-duplex case) for more than 1 second.

When the call is in the modem training (ST-C) phase, the above requirements are modified so that the pertinent timer is increased from 1 to 4 seconds.

Echo Control

Secure terminals incorporate the ability to determine path length (round-trip transmission delay) through the use of a ranging process. Since this determination is made at the beginning of the call, care must be taken to ensure that this determination is not made over the voice path. This is because upon call routing to secure demodulating facilities the path-delay characteristics will change significantly, and the delay measured over the voice path will no longer be applicable.

With regard to echo control, the following considerations apply (FIG. 30 establishes the echo control reference framework).

First, for the end-user secure terminals there is no far-end echo path established since the end-to-end transmission of secure data will be accomplished by regeneration of the voiceband data signal by the far-end earth station. It is noted that upon establishment of the demodulating facilities the echo path will exhibit an echo loss discontinuity, assuming network stability.

As a result, there is no need for far-end cancellation and associated echo-ranging for either near-end (E/C 1) or far-end (E/C 4) secure terminal cancellers. For this reason, the echo-ranging option is disabled by the intervening earth-station network discussed above. This delegates the secure terminal cancellers to canceling near-end echoes only.

With regard to the two earth-station echo cancellers, different considerations apply in each case.

First, the near-end mobile earth station canceller (E/C 2) will be looking into the near-end secure terminal over a very short delay path (<1 ms). Second, it can be assumed that since the earth station will be permanently connected to a 4-to-2 wire terminating equipment (or private branch exchange), the termination's balancing characteristics can be adjusted sufficiently well so as to minimize the need for echo control. It is anticipated that a return loss of 25 dB can both be easily achieved may also be acceptable for satisfactory voiceband data performance.

If this performance cannot be guaranteed, then an 8-tap echo canceller able to deliver an echo return loss of [25 dB) should be implemented within the MES earth station.

With regard to the far-end land earth station canceller (E/C 3), this will be looking into the far-end secure terminal over a longer delay path (−5 to 400 ms). Unlike the mobile-side equipment, it can no longer be assumed that the earth station will be permanently connected to a 4-to-2 wire terminating equipment and, thus, the termination's balancing characteristics will vary from call-to-call. Echo control will thus certainly be required at the land earth station.

This echo canceller must provision for near end echoes (echo paths with round-trip delays of up to 12 Ms) and far end echoes echo paths with round-trip delays of up to 400 ms).

The echo return loss performance requirement and convergence time for this canceller must meet the requirements applicable to the STU-III terminals themselves (as discussed in the FSVS-220 reference cited above).

Delay Path Estimation

As indicated above, the extended echo path ranging process is disabled by the SIU. Since, however, the far-end LES-based SIU needs to accommodate long echo paths, a method is required to permit the far-end echo canceller (E/C 3) to estimate the length or delay of the echo path between the LES and the PSTN-based secure terminal. This can be accomplished in a number of ways. For interoperable as well as alternate modes of operation, the echo associated with the onset of the 2100 Hz ECSD tone at the beginning of the call can be used for this purpose (for mobile originated calls only). In addition, for interoperable calls (only), the delay between the end of the responder's SCR1 sequence and the onset of the initiator's ECSD tone can be used to provide another path-delay estimate. (The delay between the end of the initiator's SCR1 sequence and the onset of the initiator's SCR1 sequence can provide yet another estimate).

For alternate calls (only), the echo path delay can be estimated directly from the modem training sequence during segments I1 and R1. These segments are specifically designed to permit this delay to be derived; and the use of packets to trigger the onset of specific segments of modem training is one of the reasons for exercising the packetized approach on an end-to-end, rather than local-to-local, modem training basis.

Elastic Buffering

In order to compensate for the interruption in synchronicity of the end-to-end data path arising from the demodulation-remodulation process, a signal buffering process is defined. Through this process the secure interface units (SIUS) absorb clock differences between the satellite channel and the secure end-user terminals received (or transmitted) over the telephone circuit by means of slip control (i.e., loss or duplication of data) using an elastic buffer 58,68 (FIG. 4).

The elastic buffer used for slip control shall have a capacity of 576 bits (which is equivalent to 120 ms at a 4800 bit/s transmission rate assuming an end-user clock accuracy of 10−4.

When the demodulating SIU commences transmission of the demodulated data stream to the remodulating SIU, the read pointer of the elastic buffer shall be reset to the following position in relation to the write pointer:

For 2.4 kbit/s transmissions 144 bits behind
For 4.8 kbit/s transmissions 288 bits behind This implies that the demodulating SIU will add a nominal 60 ms delay at beginning of such transmissions, in addition to any other delay (such as processing). Care must be exercised to ensure that during interoperable/alternate mode establishment an appropriate amount of delay is introduced to the secure protocol control packets associated with the initiation of the end-users' data.

If the read pointer reaches the write pointer during the transmission of a signal (as a result of the end-user terminal clock rate being lower than the satellite channel clock rate), a slip operation shall be performed by shifting the read pointer back (i.e. duplication of data), so as to set the read pointer behind the write pointer by the same amount as that specified above (as appropriate to each of the two end-user signaling rates).

If the read pointer becomes twice as many bits behind as that specified above (as appropriate to each of the two end-user signaling rates a slip operation shall be performed by shifting the read pointer ahead by the same amount as that specified above (i.e. loss of data), so as to set the read pointer behind the write pointer by the same amount as that specified above. This case arises when the end-user terminal clock rate is higher than the satellite clock rate.

Whenever the transmission of a signal on the satellite channel (by the demodulating SIU) is referred to in the above paragraphs, it shall be interpreted as the input of the data to the elastic buffer of the demodulating SIU prior to error coding, and not the actual transmission to the satellite channel.

The above requirements do not apply to the re-modulating SIUS. At the re-modulating SIU, synchronicity shall be maintained by driving the transmit direction of the modem (outgoing telephone circuit direction) with the clock associated with the receipt of data from the satellite channel.

Maximum Allowable Processing Delays

In the process of providing elastic buffering, signal packetization, and other types of processing, the SIUs will introduce additional delays in the end to end communication path. The maximum allowable delays are as follows:

| Demodulating SIU Side: | |
| --- | --- |
| Packet Assembly | 20.0 ms |
| Elastic Buffering | 60.0 ms |
| Processing Delay | 20.0 ms |
| Total Delay | 100.0 ms |
| Remodulating SIU Side: | |
| Packet Disassembly | 40.0 ms |
| Processing Delay | 20.0 ms |
| Elastic Buffering | 60.0 ms |
| Total Delay | 120.0 ms |

It is noted that the current elastic delay specification permits approximately 10 minutes of slip-free operation to be supported.

Special Voice Frames

In order to permit the voice encoded channel to support narrowband signals, such as the 2100 Hz and 1800 Hz tones used in secure (and other) communications, an enhancement to the utilization of voice frames is defined below.

The Inmarsat-M voice coding algorithm transmits 128 bits of information with every 20 ms frame. Each 128 bit frame is divided among 8 code vectors which in the Inmarsat-M SDM are denoted as co to C7- Each of these code vectors is generated by error encoding of a corresponding data vector which is denoted by U0 to U7. In the Tables of FIGS. 31(a), 31(b) and 31(c), the format of these vectors are defined.

The remaining seven bits in the 20 ms frame comprising data vector U7 are set to binary Ilzeroll.

It is noted that due to physical limits imposed on the value which the speech fundamental frequency can attain, the first six bits of vector UO will never equal the decimal value of 48 under error-free conditions. This observation is exploited to indicate to an enhanced voice decoder that a special signal has been detected. It also noted that if this frame is received by a receiver not capable of secure operation, the correct action will be a frame repeat of the most recently received valid voice encoded frame.

The gain index GD used in the tables of FIGS. 31 is a number in the range of 0 to 256 decimal which corresponds to the level of the received tone as follows:

Tone Level=(O–0.17 GD ) dBmO

It is noted that a value of GD=0 corresponds to a signal level of 0 dBmO and a value of GD=256 corresponds to a signal level of –43.52 dBmO.

The four-bit "Tone Index" T, which is used above are defined as the Table of FIG. 32.

Tone Detection Requirements

The following requirements apply to the detection of 1800 Hz and 2100 Hz tones.

Maximum voice/tone index transition: 25 ms Upon detection of the onset of a valid 1800 Hz or 2100 Hz tone, no more that 25 ms of tone shall be encoded and transmitted in the voice mode.

Maximum false alarm rate: 2×10–5

For any non-1800 Hz or 2100 Hz tonal input, the fractional number of 20 ms frames transmitted in the tonal index mode shall not exceed the number given above.

Other requirements, such as input dynamic range, input signal to noise ratio, frequency tolerances, and amplitude accuracies are to be compliant with the relevant FSVS specifications.

Tone Generation Requirements

The relevant FSVS specifications define requirements that apply to the generation of 1800 Hz and 2100 Hz tones. Such requirements include, for example, the tones' output dynamic range, signal-to-noise ratio, frequency accuracy, and amplitude accuracy.

Having described the invention in detail, those skilled in the art will appreciate that numerous modifications may be made of the invention without departing from its spirit. Therefore, it is not intended that the scope of this invention be limited to the specific embodiments illustrated and described. Rather, it is intended that the scope of the invention be determined by the appended claims and their equivalents.

What is claimed is:

1. A communication system, comprising:
   a first communication terminal for providing interchangeably both secure and non-secure information carried by analog voiceband signals;
   a first processing circuit connected to receive analog voiceband signal(s) from the first communication terminal and for converting the received analog voiceband signal(s) into digital baseband data, said first processing circuit operating interchangeably and automatically on secure and non-secure informatation carried by analog voiceband signals as a user of the first communication terminal changes between secure and non-secure information, and said first processing circuit providing the digital baseband data for transmission;
   a second processing circuit connected to receive the transmitted digital baseband data from the first processing circuit, and for converting the received digital baseband data into analog voiceband signal(s), said second processing circuit operating interchangeably and automatically on the received digital baseband data to convert said data to analog voiceband signals carrying the secure or non-secure information provided to the first processing circuit;
   a second communication terminal for receiving the analog voiceband signal(s) from said second processing circuit; and
   a satellite communication link,
   wherein said digital baseband data is transmitted from said first processing circuit via said satellite communication link.

2. The communication system as defined in claim 1, wherein said digital baseband data has a nominal rate of 9.6 kbit/s or less.

3. The communication system as defined in claim 1, wherein said digital baseband data has a nominal rate of 4.8 kbit/s.

4. The communication system as defined in claim 1, wherein said digital baseband data has a nominal rate of 2.4 kbit/s.

5. A communication unit comprising:
   a communication terminal for providing and receiving interchangeably both secure and non-secure information carried by analog voiceband signal(s);
   a processing circuit connected to receive the analog voiceband signal(s) from said communication terminal and for converting the received analog voiceband signal(s) into digital baseband data, said processing circuit operating interchangeably and automatically on secure and non-secure information carried by analog voiceband signals as a user of the communication terminal chances between secure and non-secure information, said processing circuit providing the digital baseband data for transmission, said processing circuit also receiving transmitted digital baseband data and converting the received digital baseband data into analog voiceband signal(s), said processing circuit operating interchangeably and automatically on the received transmitted digital baseband data to convert said data to analog voiceband signals carrying secure and non-secure information;
   wherein said processing circuit includes a signal detector for distinguishing between secure and non-secure information received from said communication terminal.

6. The communication unit as defined in claim 5, wherein said communication terminal includes a STU-III terminal.

7. The communication unit as defined in claim 5, wherein said digital baseband data has a nominal rate of 9.6 kbit/s or less.

8. The communication unit as defined in claim 7, wherein said digital baseband data has a nominal rate of 4.8 kbit/s.

9. The communication unit as defined in claim 7, wherein said digital baseband data has a nominal rate of 2.4 kbit/s.

10. A method for providing communications between STU-III terminals over narrow bandwidth digital circuits, comprising:

providing secure and non-secure information carried by analog voiceband signals from a first STU-III terminal;

receiving the provided information carried by analog voiceband signal(s) from the first STU-III terminal and distinguishing between secure and non-secure information carried by the received analog voiceband signals;

converting the analog voiceband signals into digital baseband data;

transmitting the digital baseband data;

receiving the transmitted digital baseband data;

converting the received digital baseband data into analog voiceband signals carrying the secure and non-secure information provided by the first STU-III terminal; and providing the analog voiceband signals to a second STU-III terminal.

11. The method of claim 10, wherein said digital baseband data is transmitted at a nominal rate of 9.6 kbit/s or less.

12. The method of claim 11, wherein said transmitted digital baseband data has a nominal rate of 4.8 kbit/s.

13. The method of claim 11, wherein said transmitted digital baseband data has a nominal rate of 2.4 kbit/s.

14. The method of claim 10, wherein said transmitting step is performed via a communication satellite link.

15. The method of claim 14, wherein said digital baseband data is transmitted over said satellite link at a nominal rate of 9.6 kbit/s or less.

16. The method of claim 14, wherein said digital baseband data has a nominal rate of 4.8 kbit/s.

17. The method of claim 14, wherein said digital baseband data has a nominal rate of 2.4 kbit/s.

18. A method of establishing secure communication between a first STU-III terminal system and a second STU-III terminal system, each of the first and second STU-III terminal systems includes a digital voice codec for transmitting/receiving telephone signals, and a secure interface unit for transmitting/receiving secure telephone signals, the method comprising:

transmitting from the first STU-III terminal system a predetermined tone signal;

receiving by the second STU-III terminal system the predetermined tone signal; and disconnecting the digital voice codec and connecting the secure interface unit of the second STU-III terminal system in response to receiving the transmitted predetermined tone.

19. The method as defined in claim 18, wherein the predetermined tone signal is one of a 2100 Hz and a pseudo 1800 Hz tone signal.

20. The method as defined in claim 18, further comprising disconnecting the digital voice codec and connecting the secure interface unit of the first STU-III terminal system within a predetermined time from the transmission of the predetermined tone signal.

21. The method as defined in claim 18, further comprising transmitting from the first STU-III terminal system a first control packet confirming that a secure protocol has been established by the first STU-III terminal system.

22. The method as defined in claim 21, further comprising transmitting from the second STU-III terminal system a second control packet confirming that a secure protocol has been established by the second STU-III terminal system.

23. The method as defined in claim 22, wherein communication between the first and second STU-III terminal systems is by a satellite communication link.

24. The method as defined in claim 23, wherein the second control packet is transmitted within 50 ms after the first control packet is received by the second STU-III terminal system.

25. The method as defined in claim 23, further comprising transmitting from the first STU-III terminal system a secure protocol control packet for initiating secure data transmission.

26. The method as defined in claim 18, further comprising transmitting by the second STU-III terminal system a secure protocol control packet indicating the capabilities of the second STU-III terminal system.

27. A method of establishing a secure protocol in a STU-III terminal system, the STU-III terminal system including a digital voice codec for transmitting/receiving telephone signals, and a secure interface unit for transmitting/receiving secure telephone signals, the method comprising:

receiving a predetermined tone signal; and disconnecting the digital voice codec and connecting the secure interface unit in response to receiving the predetermined tone signal.

28. The method as defined in claim 27, wherein the predetermined tone signal is one of a 2100 Hz and a pseudo 1800 Hz tone signal.

29. The method as defined in claim 27, wherein the digital voice codec is disconnected and the secure interface unit is connected within a predetermined time period from receiving the predetermined tone signal.

30. The method as defined in claim 29, wherein the predetermined time period is 250 ms.

31. The method as defined in claim 27, further comprising receiving a first control packet confirming that a secure protocol has been established in an external STU-III terminal system.

32. The method as defined in claim 31, further comprising transmitting a second control packet confirming that a secure protocol has been established in the STU-III terminal system.

33. The method as defined in claim 32, wherein the second control packet is transmitted within a predetermined time period from receiving the first control packet.

34. The method as defined in claim 33, further comprising again receiving the predetermined tone signal.

35. The method as defined in claim 32, wherein the predetermined time period is 50 ms.

36. The method as defined in claim 31, further comprising receiving a secure protocol control packet for initiating secure data transmission with the STU-III terminal system.

37. The method as defined in claim 27, wherein the predetermined tone signal is received via a satellite link.

38. The method as defined in claim 27, further comprising transmitting a secure protocol control packet indicating the capabilities of the STU-III terminal system.

39. A communication system, comprising:

a first secure communication terminal for providing analog voiceband data;

a first processing circuit connected to receive the analog voiceband data from the first secure communication terminal and for converting the received analog voiceband data into secure baseband data, said first processing circuit transmitting the secure baseband data;

a second processing circuit connected to receive the transmitted secure baseband data from the first processing circuit, and for converting the received secure baseband data into analog voiceband data;

a second secure communication terminal for receiving the analog voiceband data from said second processing circuit; and a satellite communication link;

wherein said secure baseband data is transmitted from said first processing circuit via said satellite communication link, and wherein at least one of said first and second secure communication terminals is a STU-III terminal.

40. The communication system as defined in claim 39, wherein said first and second secure communication terminals are each a STU-III terminal.

41. The communication system as defined in claim 39, wherein said second processing circuit is disposed in a mobile earth station.

42. A communication system, comprising:

a first secure communication terminal for providing interchangeably both secure and non-secure information carried by analog voiceband signal(s);

a first processing circuit connected to receive the analog voiceband signal(s) from the first communication terminal and for converting the received analog voiceband signal(s) into digital baseband data having a nominal rate of 9.6 kbit/s or less, said first, processing circuit operating interchangeably and automatically on secure and non-secure information carried by analog voiceband signals as a user of the first communication terminal chances between secure and non-secure information, and said first processing circuit providing the digital baseband data for transmission;

a second processing circuit connected to receive the transmitted digital baseband data, and for converting the received digital baseband data into analog voiceband signal(s), said second processing circuit operating interchangeably and automatically on the received secure and non-secure information corresponding to the secure and non-secure information, respectively, provided to the first processing circuit; and a second secure communication terminal for receiving the analog voiceband signal(s) from said second processing circuit;

wherein said first processing circuit includes a signal discriminator for distinguishing between secure and non-secure information carried by analog voiceband signal(s) received from said first secure communication terminal.

43. The communication system of claim 42, wherein said digital baseband data has a nominal rate of 4.8 kbit/s.

44. The communication system of claim 42, wherein said digital baseband data has a nominal rate of 2.4 kbit/s.

45. A communication system, comprising:

a first secure communication terminal for providing interchangeably both secure and non-secure information carried by analog voiceband signal(s);

a first processing circuit connected to receive the analog voiceband signal(s) from the first secure communication terminal and for converting the received analog voiceband signal(s) into digital baseband data, said first processing circuit operating interchangeably and automatically on secure and non-secure information carried by analog voiceband signals as a user of the first communication terminal changes between secure and non-secure information, and said first processing circuit providing the digital baseband data for transmission;

a satellite communication link;

a second processing circuit connected to receive the transmitted digital baseband data, and for converting the received digital baseband data into analog voiceband signal(s), said second processing circuit operating interchanqeably and automatically on the received secure and non-secure information corresponding to the secure and non-secure information, respectively, provided to the first processing circuit; and a second secure communication terminal for receiving the analog voiceband signal(s) from said second processing circuit;

wherein said first processing circuit includes a signal discriminator for distinguishing between secure and non-secure information carried by analog voiceband signal(s) received from said first secure communication terminal, and wherein said digital baseband data is provided from said first processing circuit to said second processing circuit via said satellite communication link.

46. The communication system of claim 45, wherein said digital baseband data has a nominal rate of 9.6 kbit/s or less.

47. The communication system of claim 46, wherein said digital baseband data has a nominal rate of 4.8 kbit/s.

48. The communication system of claim 46, wherein said digital baseband data has a nominal rate of 2.4 kbit/s.

49. A communication unit comprising:

a secure communication terminal operable to perform at least one of (1) providing secure information carried by analog voiceband signal(s); (2) receiving secure information carried by analog voiceband signals(s); (3) providing non-secure information carried by analog voicebind signals(s); and (4) receiving non-secure information carried by analog voiceband signal(s); and a processing circuit operable to perform interchangeably and automatically a first, second, third and fourth function, wherein said first function comprises: receiving secure information carried by analog voiceband signal(s) output by the secure communication terminal, converting the received voiceband signal(s) carrying the secure information into digital baseband data having a nominal rate of 9.6 kbit/s or less, and providing the digital baseband data for transmission, wherein said second function comprises: receiving transmitted secure information carried by digital baseband data having a nominal rate of 9.6 kbit/s or less and converting the received digital baseband data into analog voiceband signal(s) carrying secure information to be output to the secure communication terminal, wherein said third function comprises receiving transmitted digital baseband data containing non-secure information and having a nominal rate of 9.6 kbit/s or less and converting the received digital baseband data into analog voiceband signal(s) carrying non-secure information to be output to the secure communication terminal; and wherein said fourth function comprises receiving non-secure analog voiceband signal(s) carrying non-secure information output by the secure communication terminal and converting the received voiceband signal(s) carrying non-secure information into digital baseband data having a nominal rate of 9.6 kbit/s or less, and providing the digital baseband data for transmission.

50. The communication unit of claim 49, wherein said secure and non-secure digital baseband data has a nominal rate of 4.8 kbit/s.

51. The communication unit of claim 49, wherein said secure and non-secure digital baseband data has a nominal rate of 2.4 kbit/s.

52. The communication unit of claim 49, further comprising a satellite communication link, wherein the secure and non-secure digital baseband data is transmitted via said satellite communication link.

53. The communication unit of claim 52, wherein said secure and non-secure digital baseband data has a nominal rate of 4.8 kbit/s.

54. The communication unit of claim 52, wherein said secure and non-secure digital baseband data has a nominal rate of 2.4 kbit/s.

55. The communication unit of claim 49, wherein said processing circuit further comprises a signal discriminator for distinguishing between secure and non-secure analog voiceband signal(s) received from said secure communication terminal.

56. The communication unit of claim 55, wherein said secure and non-secure digital baseband data has a nominal rate of 4.8 kbit/s.

57. The communication unit of claim 55, wherein said secure and non-secure digital baseband data has a nominal rate of 2.4 kbit/s.

58. The communication unit of claim 49, further comprising a satellite communication link, and wherein said processing circuit comprises a signal discriminator for distinguishing between secure and non-secure analog voiceband signal(s) received from said secure communication terminal, wherein the secure and non-secure digital baseband data is transmitted via said satellite communication link.

59. The communication unit of claim 58, wherein said secure and non-secure digital baseband data has a nominal rate of 4.8 kbit/s.

60. The communication unit of claim 58, wherein said secure and non-secure digital baseband data has a nominal rate of 2.4 kbit/s.

61. A communication method from a STU-III terminal over narrowband digital circuits, comprising:

providing, from said STU-III terminal, secure and non-secure information carried by analog voiceband signals;

distinguishing between the provided secure and non-secure information carried by analog voiceband signals automatically and interchangeably;

receiving the analog voiceband signal(s) and converting the received analog voiceband signal(s) into digital baseband data; and transmitting the digital baseband data.

62. The method of claim 61, wherein said digital baseband data is transmitted at a nominal rate of 9.6 kbit/s or less.

63. The method of claim 62, wherein said transmitted digital baseband data has a nominal rate of 4.8 kbit/s.

64. The method of claim 62, wherein said transmitted digital baseband data has a nominal rate of 2.4 kbit/s.

65. The method of claim 61, wherein said transmitting operation is performed via a communication satellite link.

66. The method of claim 65, wherein said digital baseband data is transmitted over said satellite link at a nominal rate of 9.6 kbit/s or less.

67. The method of claim 66, wherein said digital baseband data has a nominal rate of 4.8 kbit/s.

68. The method of claim 66, wherein said digital baseband data has a nominal rate of 2.4 kbit/s.

* * * * *

UNITED STATES PATENT AND TRADEMARK OFFICE
CERTIFICATE OF CORRECTION

PATENT NO. : 5,963,621
DATED : October 5, 1999
INVENTOR(S) : Spiros Dimolitsas, Roderick James Ragland, and Farhad Hemmati It is certified that error appears in the above-identified patent and that said Letters Patent is hereby corrected as shown below:

Claim 1, column 30,
Line 2, "informatation" should be -- information --.

Claim 5, column 30,
Line 43, "chances" should be -- changes --.

Claim 42, column 33,
Line 26, "chances" should be -- changes --.

Signed and Sealed this

Twenty-third Day of October, 2001

Attest:

NICHOLAS P. GODICI
Attesting Officer    Acting Director of the United States Patent and Trademark Office